(12) United States Patent
Nakamura et al.

(10) Patent No.: US 7,023,416 B1
(45) Date of Patent: Apr. 4, 2006

(54) DRIVING TECHNIQUE FOR ACTIVATING LIQUID CRYSTAL DEVICE

(75) Inventors: Mika Nakamura, Hirakata (JP);
Katsumi Adachi, Kashiba (JP);
Kiyohiro Kawasaki, Hirakata (JP);
Katsuji Hattori, Takarazuka (JP)

(73) Assignee: Matsushita Electric Industrial Co., LTD, (JP)

( * ) Notice: Subject to any disclaimer, the term of this patent is extended or adjusted under 35 U.S.C. 154(b) by 426 days.

(21) Appl. No.: 09/868,184

(22) PCT Filed: Oct. 19, 2000

(86) PCT No.: PCT/JP00/07291

§ 371 (c)(1),
(2), (4) Date: Jun. 15, 2001

(87) PCT Pub. No.: WO01/29612

PCT Pub. Date: Apr. 26, 2001

(30) Foreign Application Priority Data

| Oct. 19, 1999 | (JP) | ................................. 11-296329 |
| Dec. 3, 1999 | (JP) | ................................. 11-344477 |
| Feb. 8, 2000 | (JP) | ................................. 2000-030046 |
| Apr. 17, 2000 | (JP) | ................................. 2000-114870 |
| Apr. 28, 2000 | (JP) | ................................. 2000-129146 |

(51) Int. Cl.
*G09G 3/36* (2006.01)

(52) U.S. Cl. ............................. 345/99; 345/94; 345/95

(58) Field of Classification Search ................ 345/94, 345/95, 98, 99, 100, 87
See application file for complete search history.

(56) References Cited

U.S. PATENT DOCUMENTS

| 6,005,646 A | * | 12/1999 | Nakamura et al. ............ 349/33 |
| 6,069,620 A | * | 5/2000 | Nakamura et al. .......... 345/214 |
| 6,221,444 B1 | * | 4/2001 | Okada et al. .............. 428/1.25 |
| 6,473,077 B1 | * | 10/2002 | Takenaka et al. ........... 345/209 |

FOREIGN PATENT DOCUMENTS

| JP | 09-138421 | 5/1997 |
| JP | 09-138421 A | 5/1997 |
| JP | 09-185037 | 7/1997 |
| JP | 09-185037 A | 7/1997 |
| JP | 10-206822 | 8/1998 |
| JP | 10-206822 A | 8/1998 |

* cited by examiner

*Primary Examiner*—Kent Chang
(74) *Attorney, Agent, or Firm*—Steptoe & Johnson LLP

(57) ABSTRACT

To provide a high-response and wide-viewing-angle liquid crystal panel capable of causing a transition of liquid crystal, which is called the OCB mode, into a bend configuration in a short time, there is provided a period in which a potential difference higher than that in a normal image display period is continuously applied between gate lines and opposing electrodes or between pixel electrodes and the opposing electrodes of the liquid crystal panel.

Also, ingenuities are exercised on the period in which the potential difference is continuously applied between them and on the structure of picture elements.

47 Claims, 38 Drawing Sheets

Fig. 2
(1)
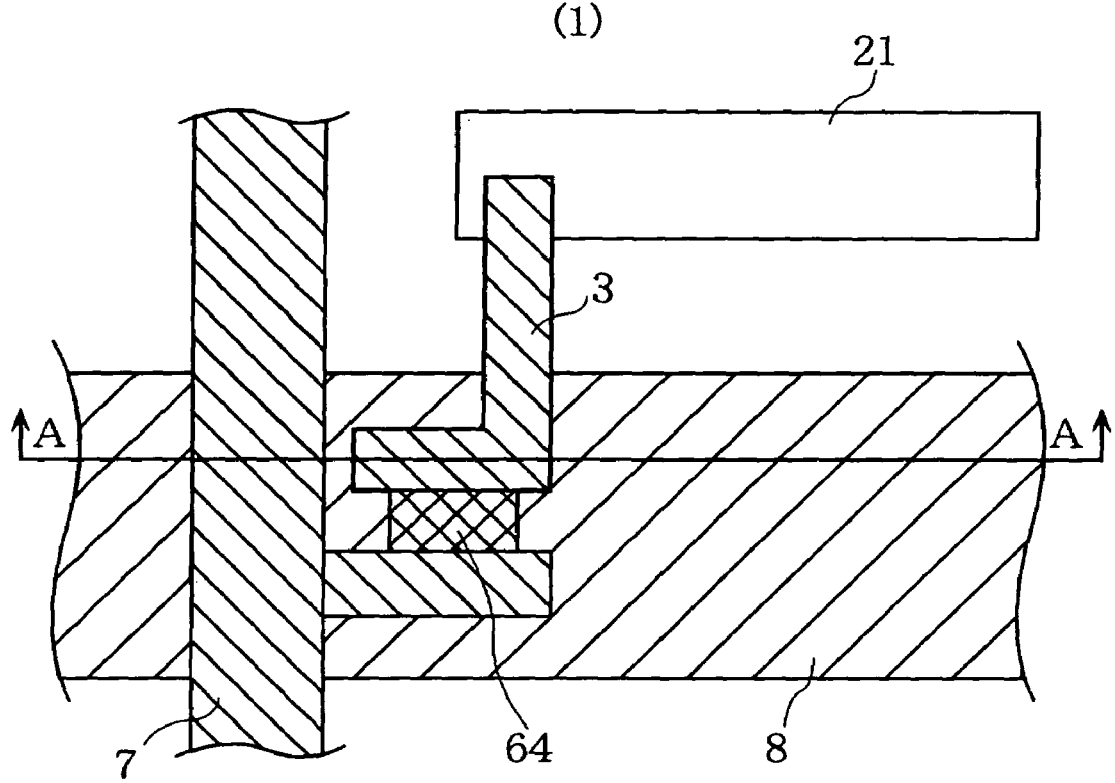
(2)
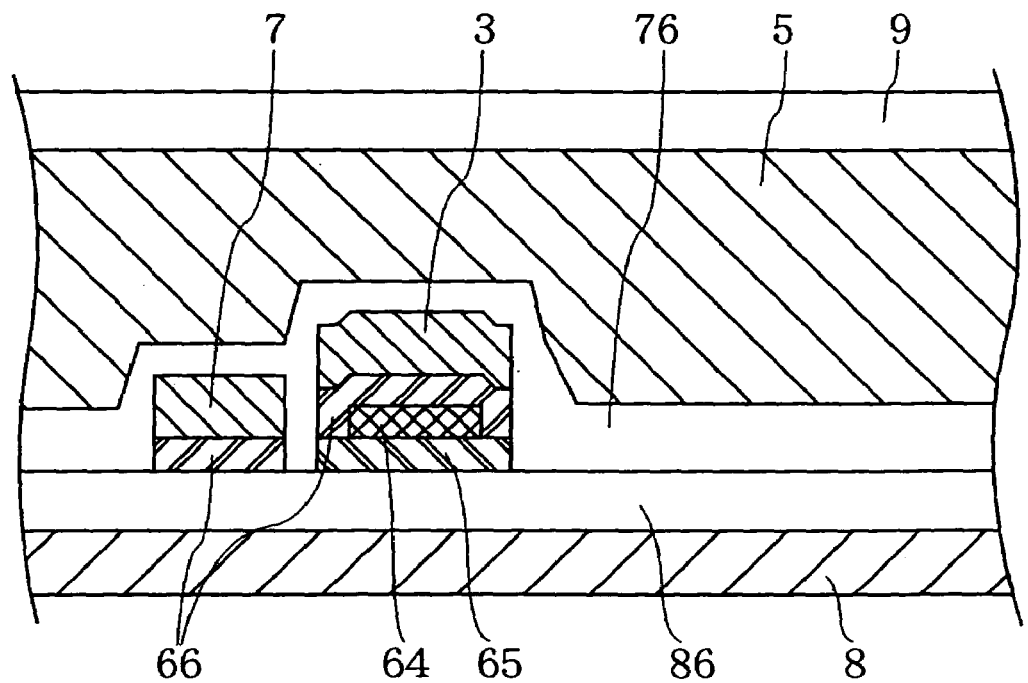

Fig. 4
(1)
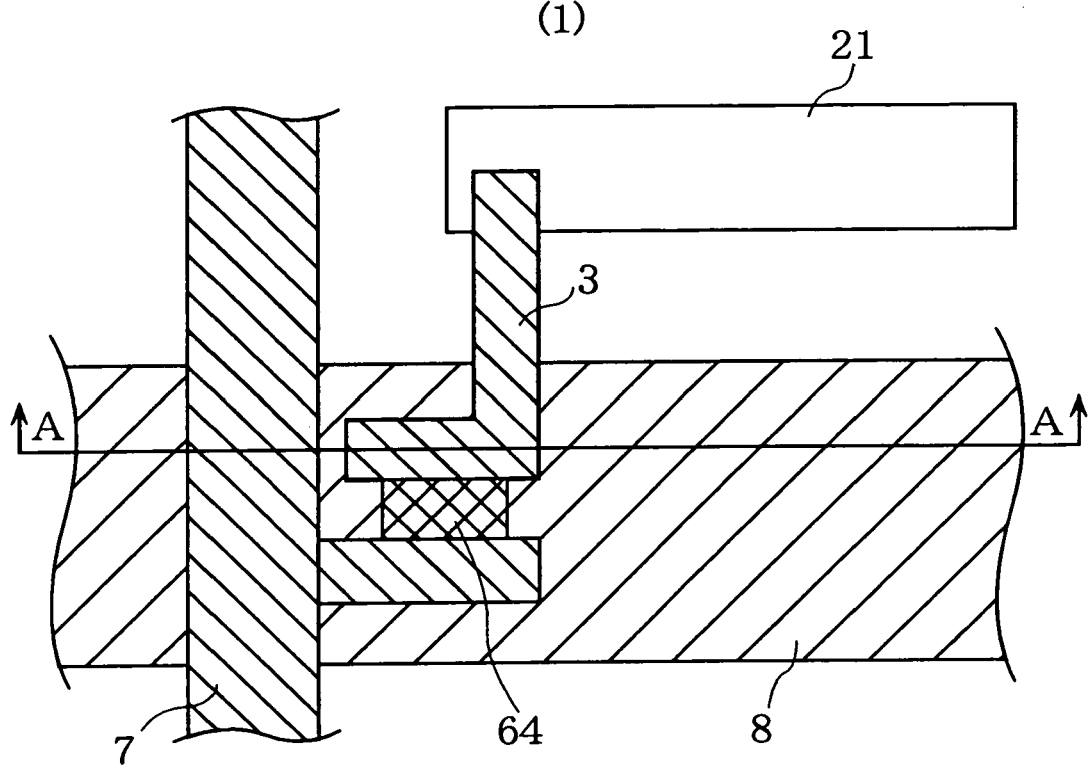
(2)
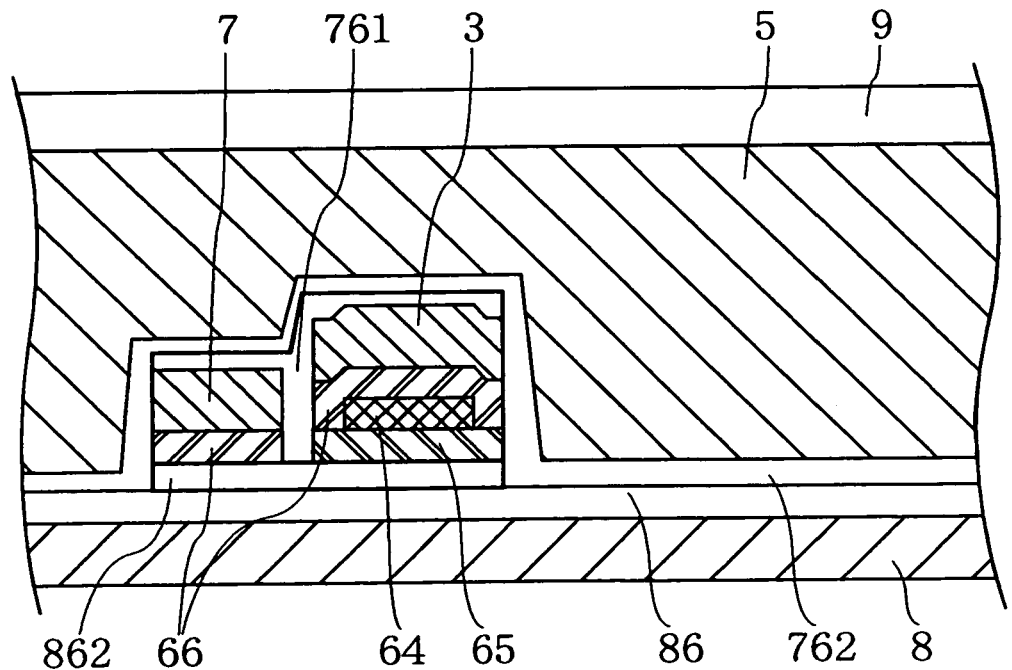

Fig. 5
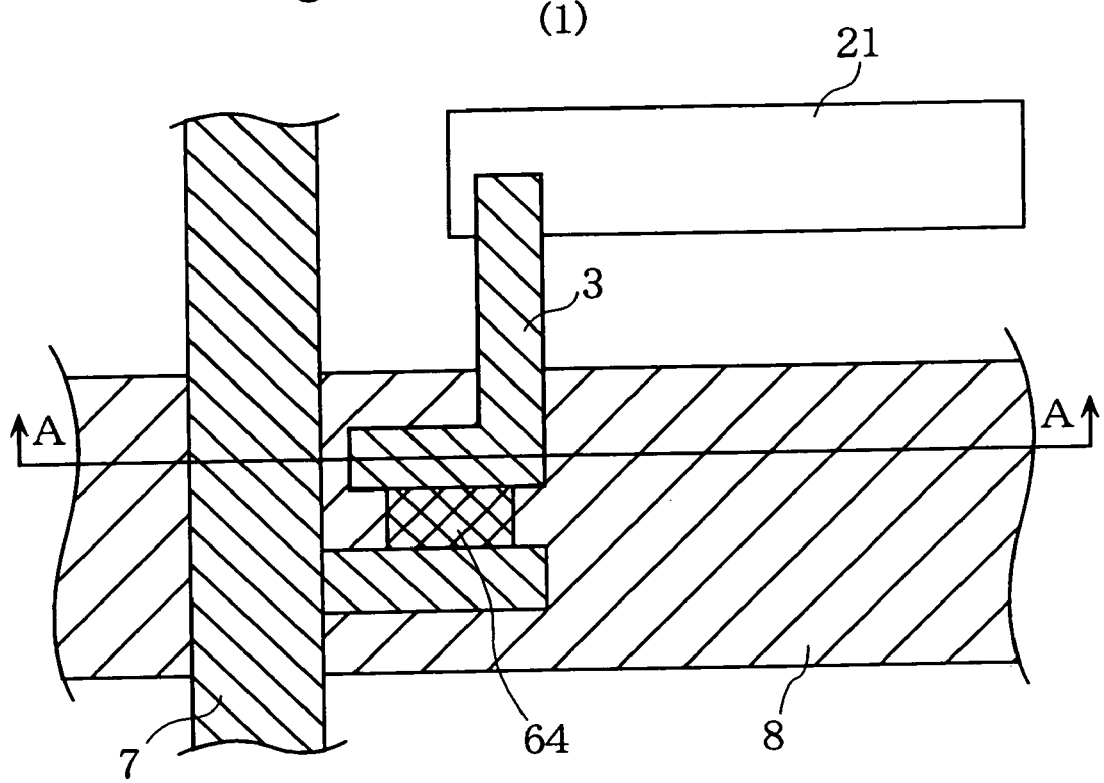
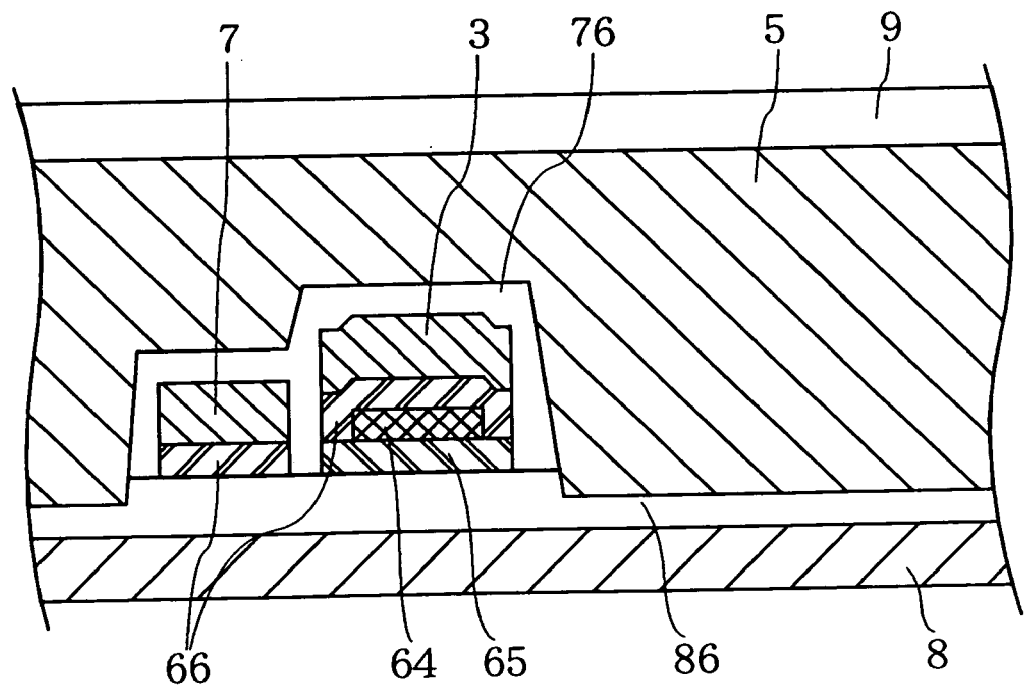

Fig. 6
(1)
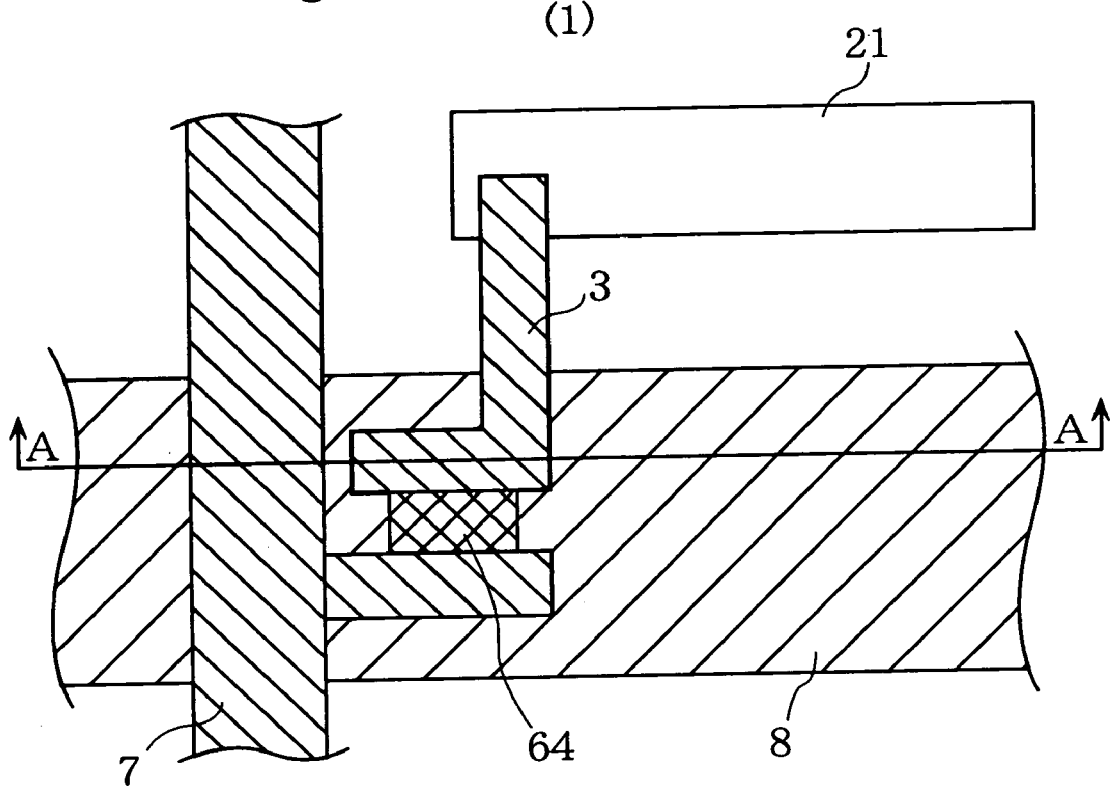
(2)
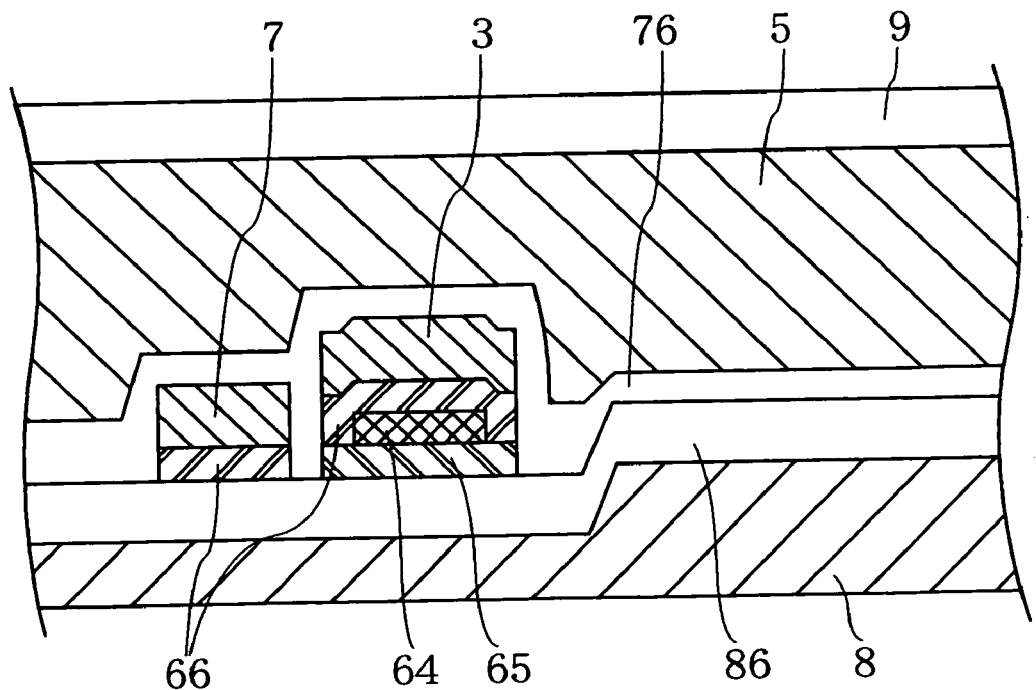

Fig. 7
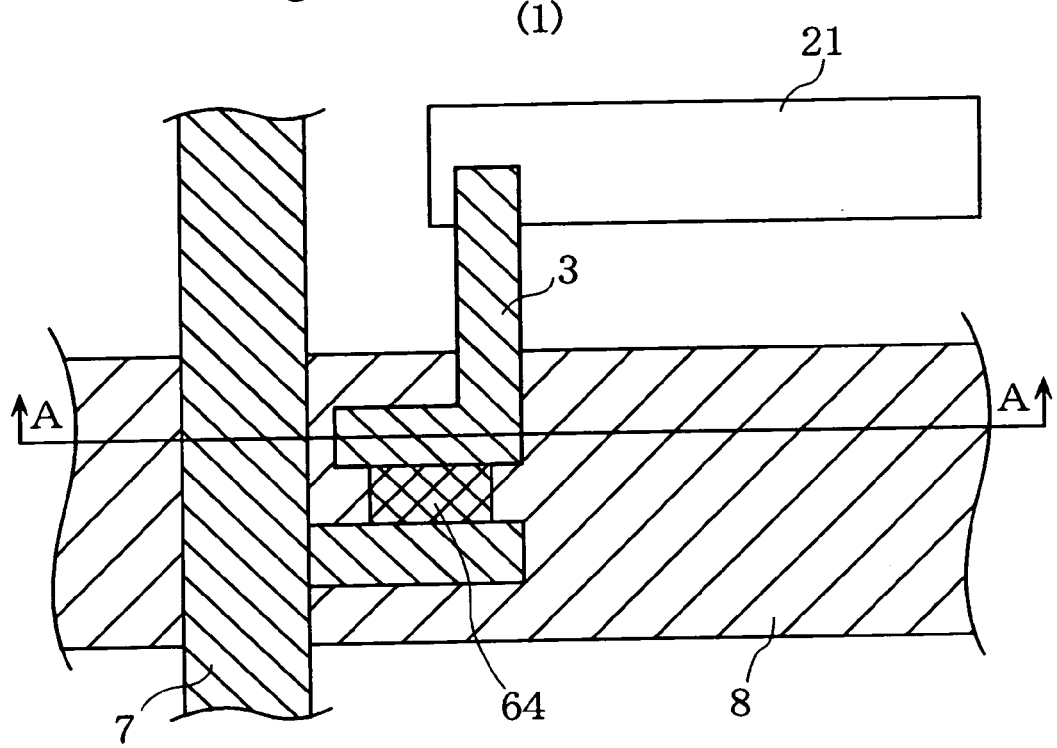
(1)
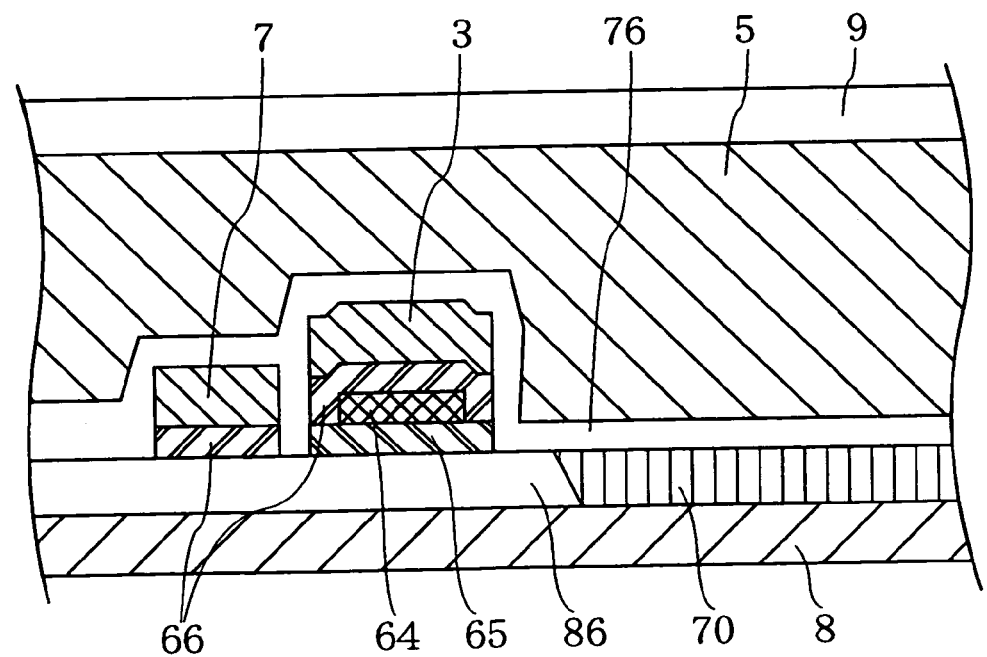
(2)

Fig. 8
(1)
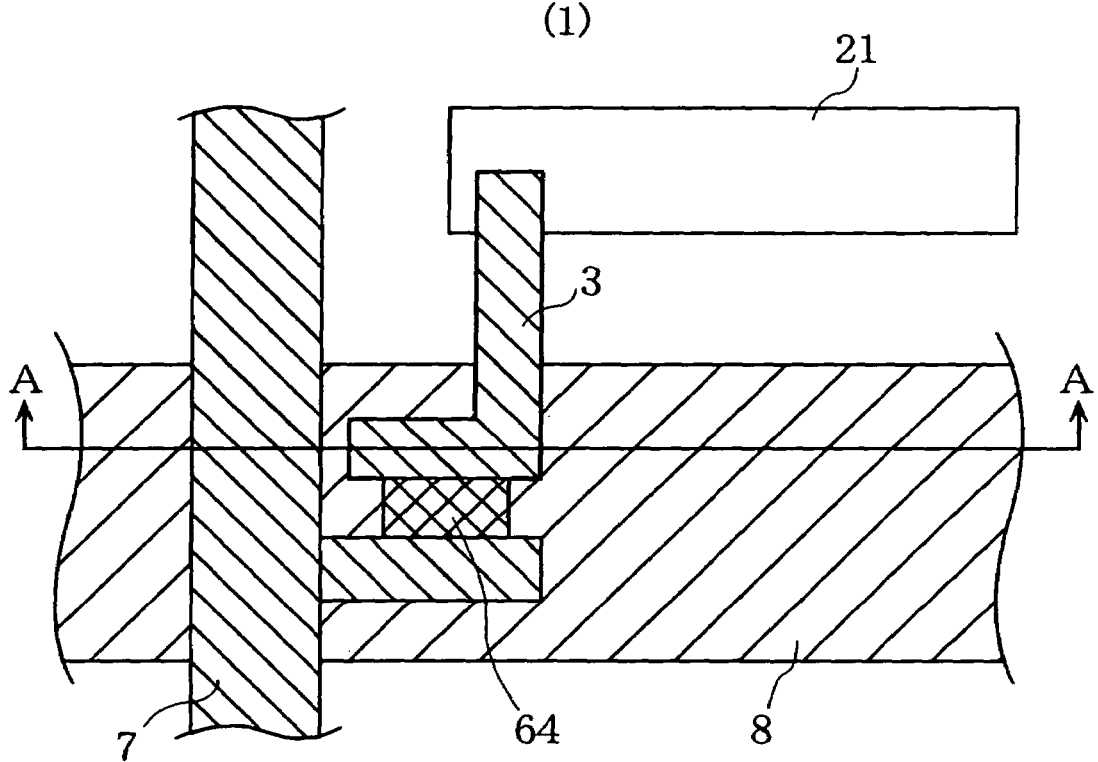
(2)
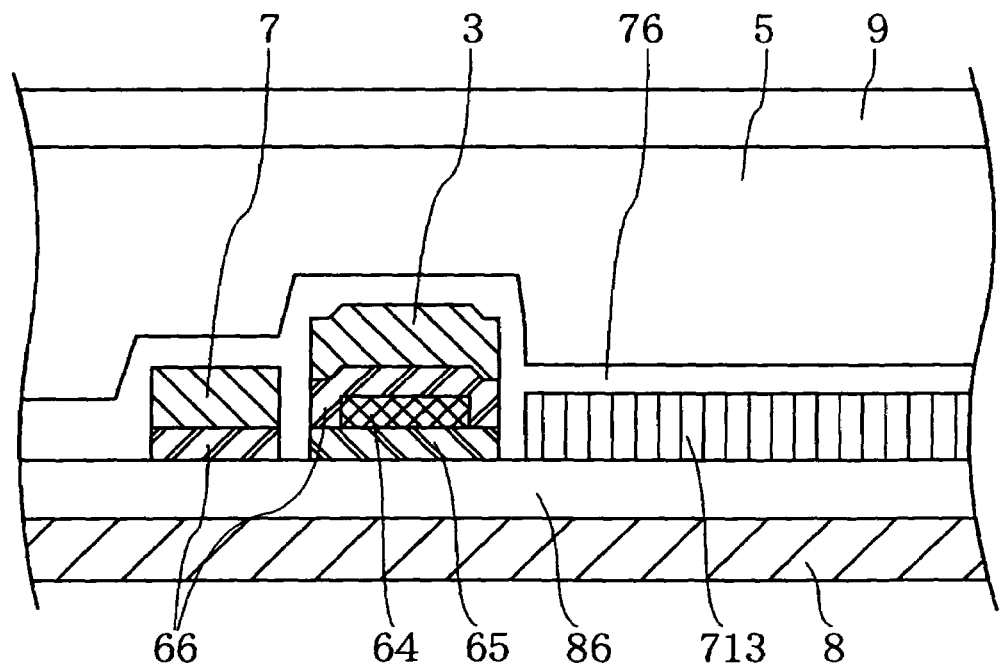

Fig. 14
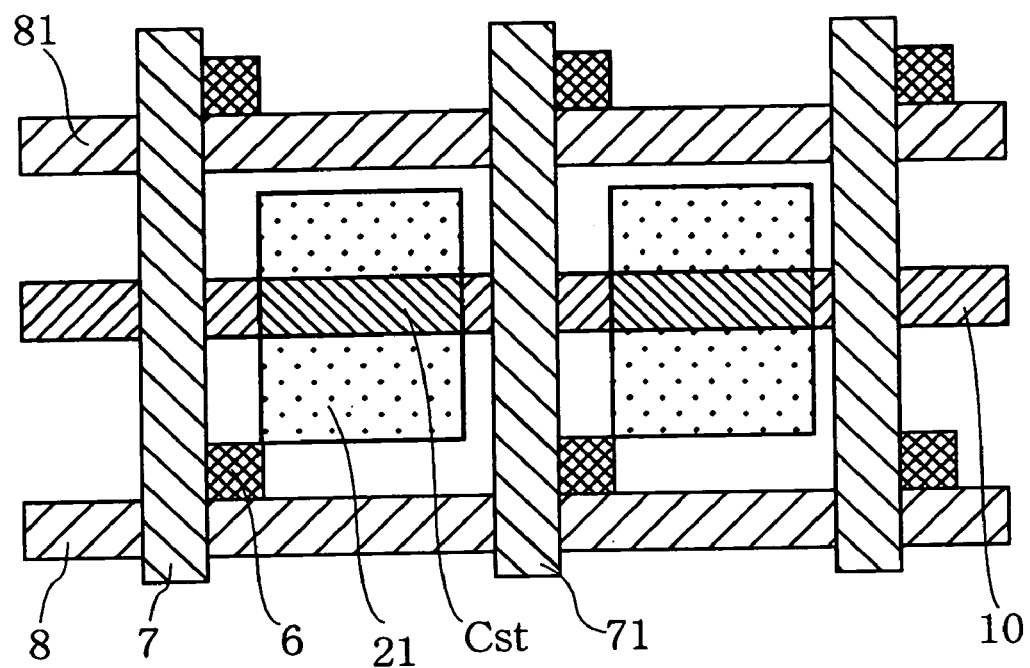
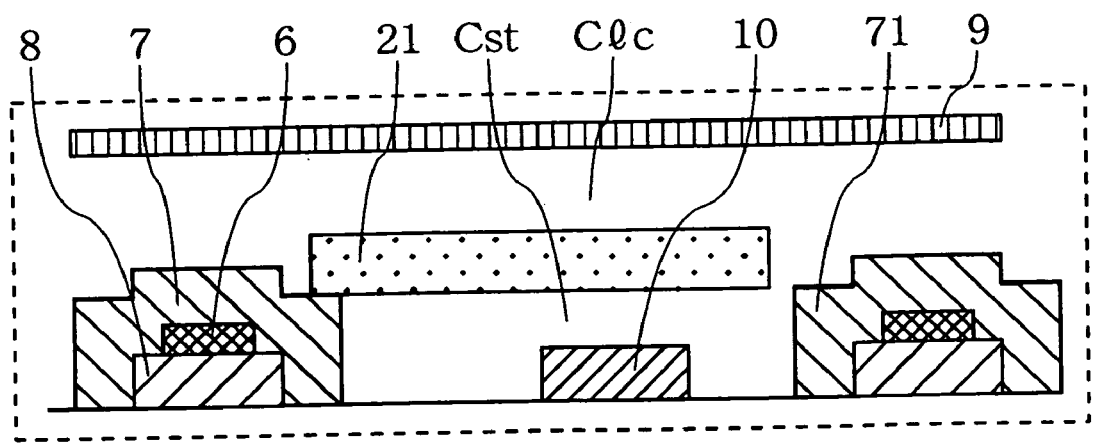

Fig. 25
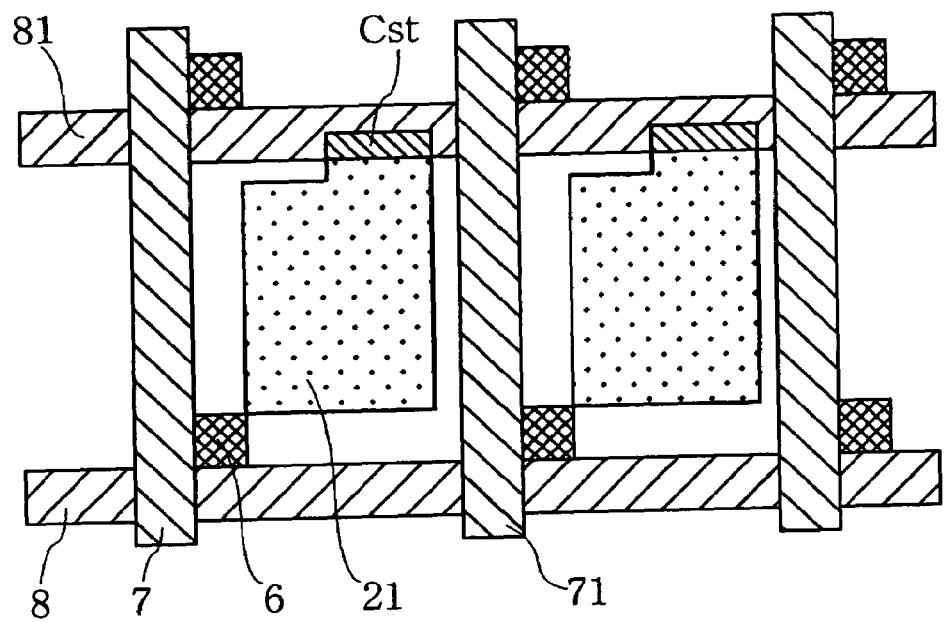
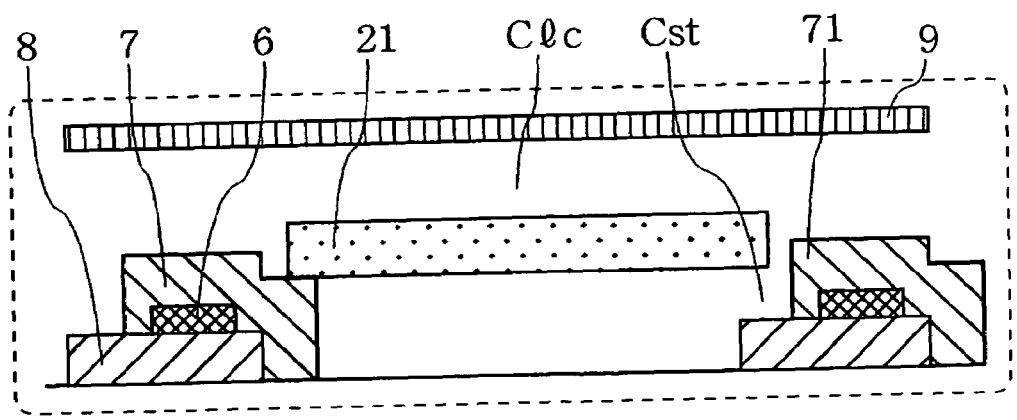

DRIVING TECHNIQUE FOR ACTIVATING LIQUID CRYSTAL DEVICE

TECHNICAL FIELD

The present invention relates to a liquid crystal device and, more particularly, to an activating technique for driving liquid crystal device in which a liquid crystal layer takes a splay configuration when no voltage is applied and takes a bend configuration when it fulfills its function such as a display.

BACKGROUND ART (General Background Art)

Liquid crystal device takes the holding mode in which when brightened or darkened, each picture element is held in its brightened state or in its darkened state in each display period by electric operation of liquid crystal element. Accordingly, the liquid crystal device produces a static image of little flickering, as compared with a cathode ray tube that is brightened only for a further shortened time in each display period, which is one of the characteristic features of the liquid crystal device.

In recent years, with increased speed and capacities of CPU and memory, personal computers have come to be able to perform the moving image processing with ease. Under these circumstances, improvement in image quality of the moving image displayed in the liquid crystal display device is now being desired.

The screen of a TV receiver as a broadcasting receiver is becoming bigger. In the cathode ray tube, with an enlarged area of the screen, the depth thereof increases to a degree, in terms of which the cathode ray tube is not desirable for the demand for a thin-profile TV. The liquid crystal display device is being thought of as an answer to the demand.

The current TN aligned liquid crystal device that is a mainstream of the liquid crystal device is slow in response time. Also, in contrast to the cathode ray tube in which each picture element emits instantaneously for a very short time in each display period, the liquid crystal device takes the holding mode in which for example when the liquid crystal device is in the ON mode (opens and emits), each picture element is kept on emitting light in each display period. This can cause distortion of the moving image produced, such as appearing to leave traces when a moving image is displayed. Thus, the liquid crystal device is inferior to the cathode ray tube in image quality.

The liquid crystal having the bend configuration, which is called the OCB mode (type) as disclosed, for example, by Japanese Laid-open (unexamined) Patent Publication No. Sho 61-116329 or No. Hei 7-84254, contributes to the solving this problem. The OCB mode can satisfactorily meet the demands for the moving image to be displayed at a high-speed response and at a wide viewing angle and the demands for the enlargement of screen, to provide a big screen display with thin-profile and low power consumption, as compared with the cathode ray tube.

The devices using the liquid crystals have begun to be applied to displays for liquid crystal plasma displays, circuits and devices using light logic devices, as well as to displays for word processors, personal computers and receivers of TVs. For these applications as well, the OCB mode of liquid crystal has been marked, from the viewpoints of good display performance and high-speed response.

(Background Art as Viewed from the Aspect of the Problem to be Solved by the Invention)

However, in this mode of liquid crystal, the transition of the liquid crystals from the splay configuration 51 as shown in FIGS. 1 (1) and (2) to the bend configuration as shown in FIG. 1 (3) requires to keep on applying a high potential difference to a liquid crystal layer for a specified time or more. The application of such a high voltage to the liquid crystal layer, however, imposes burden on transistor elements and wirings and leads to cost increase. The technique of enabling the transition of the liquid crystals into the bend configuration in an easy and reliable manner through the application of a possible voltage and current to the elements and wirings that are now in wide use has not yet successively been realized. As a result of this, this mode of the liquid crystal has not yet gone far enough to be universally used at this state.

Thus, in the OCB mode of liquid crystal device or driving circuit thereof, development of the low-cost technique is now being desired of enabling the transition of the liquid crystal layer into the bend configuration in a reliable manner in a short time without imposing any burden on the currently presented hardware, such as transistor elements and wirings.

Likewise, the technique of activating the liquid crystal device reliably and easily even when applied for another intended applications is now being desired.

DISCLOSURE OF THE INVENTION

The present invention has been made with the aim of solving the above-mentioned problems. According to the present invention, ingenuities are exercised on the structure of each element of the device using the liquid crystals. Likewise, ingenuities are exercised on the way of applying a highest possible voltage for the activation and on the timing when the voltage is applied. To be more specific, ingenuities are exercised on the following.

According to the invention of the first inventive group, ingenuities are exercised on the structure of the liquid crystal display device of the OCB mode and the like. As a result of this, electric field intensity higher than that in a normal (plain) image display period is applied to a liquid crystal layer between gate lines on a first substrate and an opposing electrode on the second substrate at a startup to thereby produce a transition of that part of the liquid crystal layer into the bend configuration. With this as a nucleus (seed), the transition grows and extends over the whole area of the liquid crystal layer, which is an intended aim of the invention. In this case, since the gate lines that are driven at high voltage as compared with the other parts in the liquid crystal panel are used, high field intensity can be applied to the liquid crystal layer without imposing burden on source line driven IC and pixel transistors.

In order to apply higher field intensity to the liquid crystal layer, an insulating layer on the gate line is reduced in thickness to increase the capacity of the insulating layer, so that a ratio of partial pressure between the gate line and the opposing electrode is varied.

Likewise, the insulating layer on the gate line is formed of material of high specific inductive capacity to increase the capacity of the insulating layer, so that a ratio of partial pressure between the liquid crystal layer between the opposing electrode and the insulating layer is varied.

Likewise, a gate line forming metal is increased in thickness at a portion where no other metal layer or no semiconductor layer is present between the gate line and the liquid crystal layer, whereby the liquid crystal layer on the gate line is reduced in thickness by the order of 0.5–1.5 μm.

Likewise, the source line forming metal is laminated on the gate line in electric contact therewith at a portion where no other metal layer or no semiconductor layer is present between the gate line and the liquid crystal layer, whereby the thickness of the gate line is increased and thereby the thickness of the liquid crystal layer on the gate line is reduced.

Likewise, the source line forming metal is laminated on the gate line not in electric contact therewith at a portion where no other metal layer or no semiconductor layer is present between the gate line and the liquid crystal layer, whereby the thickness of the liquid crystal layer on the gate line is reduced.

Likewise, the opposing electrode on the second substrate is divided into a part confronting the gate line on the first substrate and the remaining part, and a higher voltage is applied to the opposing electrode at the part confronting the gate line than at the remaining part.

Likewise, a color filter forming resin is laminated on the second substrate at a portion confronting the gate line on the first substrate, to reduce the thickness of the liquid crystal layer on the gate line.

Likewise, a pillar-shaped spacer is formed on the second substrate at a portion confronting the gate line on the first substrate, so that the opposing electrode is formed between the pillar-shaped spacer and the liquid crystal layer, to reduce the thickness of the liquid crystal layer on the gate line.

According to the second inventive group, ingenuities are exercised on the activating circuits and the like of the liquid crystal device, such that potential difference higher than that in the normal image display period is continuously applied between the pixel electrode of the first substrate and the opposing electrode of the second substrate in accordance with prescribed orders and rules.

This can make variation of the opposing electrodes available. The transition to the bending alignment is accelerated by the change in scan timing and potential difference applied and the control of the change.

Likewise, there is provided a period in which a primary potential difference different from that in the normal image display period is continuously applied between pixel electrode of the first substrate and the opposing electrode of the second substrate, whereby the potential difference is increased to be applied to a broadest possible area of the liquid crystal layer. This produces increased nuclei for the transition to the bend configuration to accelerate enlargement of the bend region, so that the transition into the bend configuration is performed in a short time.

Likewise, in the driving mode in which a primary potential difference application step of applying a primary potential difference, different from that in the normal image display period, between the pixel electrode on the first substrate and the opposing electrode on the second substrate; a secondary potential difference application step for applying a secondary potential difference smaller than the primary potential difference are alternately controlled at least once for each step in a repeat control step, the time range of from 50% to 95% of each repeated period of the application is controlled in the primary potential difference application step, and the primary potential difference application step of producing the nuclei for the bend configuration and enlarging the bend region and the secondary potential difference application step of re-arranging the liquid crystal layer in a part thereof where no nucleus for the bend configuration was produced or no enlargement of the bend region was provided are alternately performed, whereby the transition to the bend configuration is accelerated over the whole area of the panel.

Likewise, there is provided a charging sub-step of applying to source lines a potential in which a pixel electrode potential variation is reflected in the opposing electrode potential, the pixel electrode potential variation being induced by the potential variation of the gate lines when the pixel transistor is switched to OFF from ON in the secondary potential difference application step, to charge the pixel electrodes.

Also, in the primary potential difference application step, the potential of the source line is modulated to a potential different from that in the secondary potential application step so that the primary potential difference can be increased. Thus, the production of the nuclei for the bend configuration and the enlargement of the bend region are further accelerated, so that the transition to the bend configuration is accelerated over the whole area of the panel.

Likewise, the period in which the drive for causing the transition of the liquid crystal layer to the bend configuration is initiated from the secondary potential difference so that the liquid crystal layer can be re-arranged, first. This provides the result that in the primary potential difference application step of applying the primary potential difference between the pixel electrode and the opposing electrode, the production of the nuclei for the bend configuration and the enlargement of the bend region are further accelerated, so that the transition to the bend configuration is accelerated over the whole area of the panel.

Likewise, in the driving mode in which the primary potential difference application step of applying the primary potential difference between the pixel electrode and the opposing electrode and the secondary potential difference application step of modulating the potential difference between the pixel electrode and the opposing electrode to the secondary potential difference smaller than the primary potential difference are alternately provided at one time for each to cause the transition of the liquid crystal layer to the bend configuration, image information large in potential difference applied to the liquid crystal layer is displayed at least one field during a period from after completion of the primary difference application step or the secondary potential difference application step until the shift to the normal image information display period, whereby the transition to the bend configuration is accelerated over the whole area of the panel.

The third inventive group is intended for stabilization of the liquid crystal layer at a startup. Accordingly, ingenuities are exercised on the way of turning the power on and the like.

BRIEF DESCRIPTION OF THE DRAWINGS

FIG. 2 shows a plan view and a sectional view of a principal part of the structure for a single picture element of a conventional liquid crystal panel;

FIG. 4 shows diagrams of a constitution for one picture element of the liquid crystal panel of Embodiment 1-1;

FIG. 5 shows diagrams of a constitution for one picture element of the liquid crystal panel of Embodiment 1-2;

FIG. 6 shows diagrams of a constitution for one picture element of the liquid crystal panel of Embodiment 1-3;

FIG. 7 shows diagrams of a constitution for one picture element of the liquid crystal panel of Embodiment 1-4;

FIG. 8 shows diagrams of a constitution for one picture element of the liquid crystal panel of Embodiment 1-5;

FIG. 14 shows diagrams illustrating the structure of the picture element of the same;

FIG. 25 shows diagrams illustrating the structure of the picture element of the embodiment above;

DESCRIPTION OF REFERENCE NUMERALS

1 First substrate;
2 Second substrate;
3 Pixel electrode;
21 Transparent pixel electrode;
5 Liquid crystal layer;
6 Pixel transistor;
7 Source line, Source line electrode;
70 Source line forming metallic coating;
71 Source line;
8 Gate line, Gate line electrode;
81 Former gate line;
9 Opposing electrode;
10 Common electrode;
11 Black matrix;
12 Color filter;
64 Channel protecting layer;
65 a-Si layer;
66 n+a-Si layer;
76 Insulating layer between source line electrode and liquid crystal layer;
86 Insulating layer between gate line electrode and a-Si layer;
87 Insulating layer;
Vcc Potential of common electrode;
Vc Potential of opposing electrode;
Vg Potential of gate line;
Vs Potential of source line
Vp Potential of pixel electrode;
Vpc Potential difference between pixel electrode and opposing electrode;
Tc Plain image display period;
Cgd Capacity between gate line and pixel electrode;
Cst Storage capacity between pixel electrode and common electrode;
Clc Liquid crystal capacity between pixel electrode and opposing electrode;
Cgs Capacity between gate line and source line;
204 Liquid crystal panel controller; and
205 Liquid crystal panel

DESCRIPTION OF THE PREFERRED EMBODIMENTS

In the following, the present invention will be described on the basis of the embodiments.

First Inventive Group

The first inventive group is mainly characterized in that the structure of an insulating layer of pixel elements is so designed that a high voltage can be applied to a liquid crystal layer for transition thereof.

In the following, the first inventive group will be described on the basis of the embodiments.

Embodiment 1-1

"Embodiment 1-1" means "a first embodiment of the first inventive group". It follows that "a second embodiment of the first inventive group" is presented as "Embodiment 1-2". The same applies to the other inventive group.

Picture elements having circuitry are, in practical, formed on a substrate to be arranged vertically, horizontally, in rows and in columns, and further in layers in some cases. Such is, however, the obvious matter, so that illustration thereof is omitted for avoidance of botheration. The same applies to the other inventive group and other embodiments.

FIG. 2 (1) shows a plan view of the structure of a conventional liquid crystal panel for each picture element and FIG. 2 (2) shows a sectional view of a part of transistor element taken along line of A—A. In this diagram, 21 denotes a transparent pixel electrode. 3 denotes an pixel electrode. 5 denotes a liquid crystal layer. 64 denotes a channel protecting layer. 65 denotes a a-Si (amorphous silicone) layer. 66 denotes a n+a-Si layer. 7 denotes a source line electrode. 76 denotes an insulating layer between the source line electrode and the liquid crystal layer. 8 denotes a gate line electrode. 86 denotes an insulating layer between the gate line electrode and the a-Si layer. 9 denotes an opposing electrode.

Figure 1:
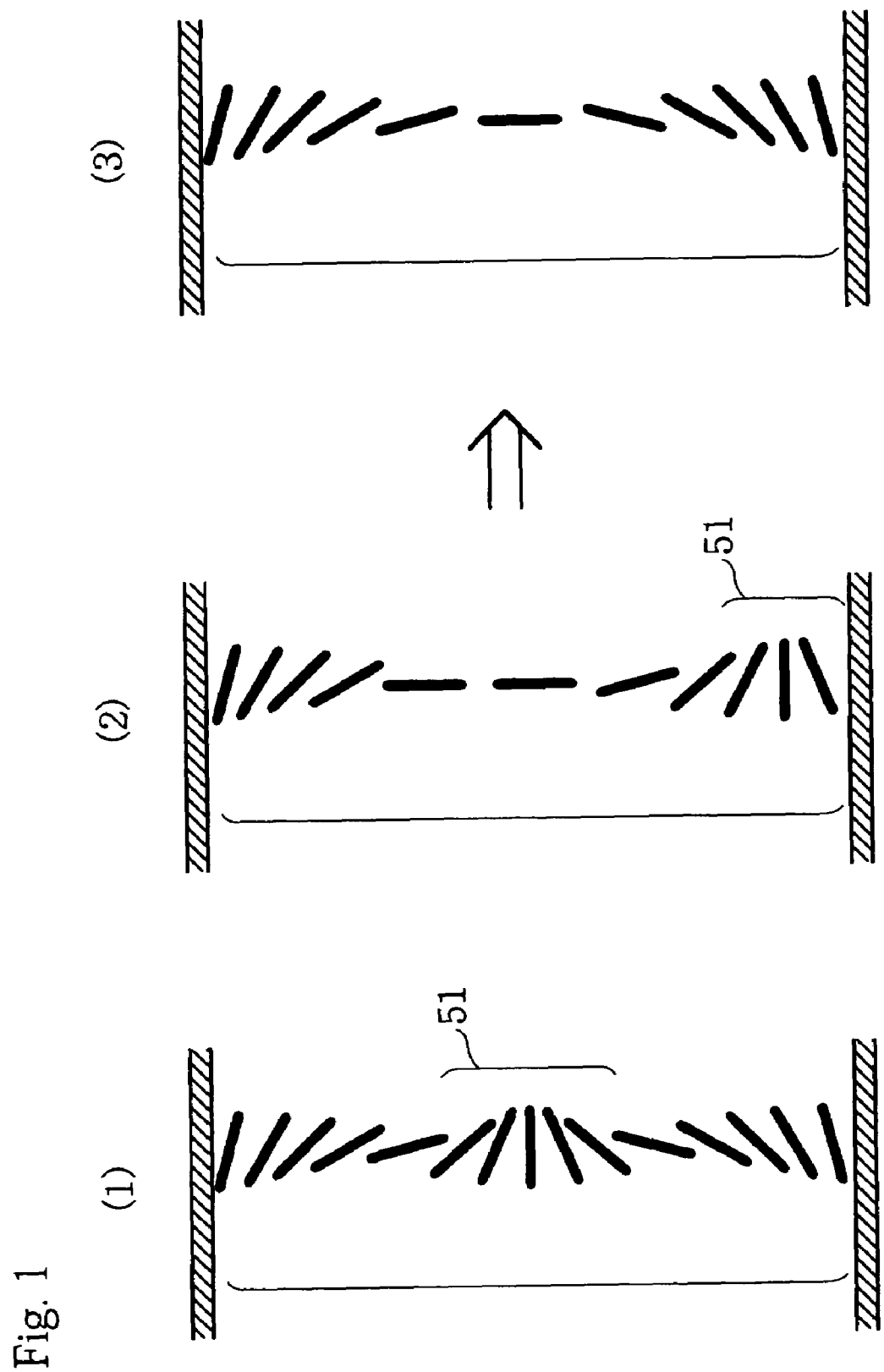
FIG. 1 shows diagrams illustrating the condition of splay configurations (1) and (2) of liquid crystal elements and the condition of bend configuration (3)
Figure 3:
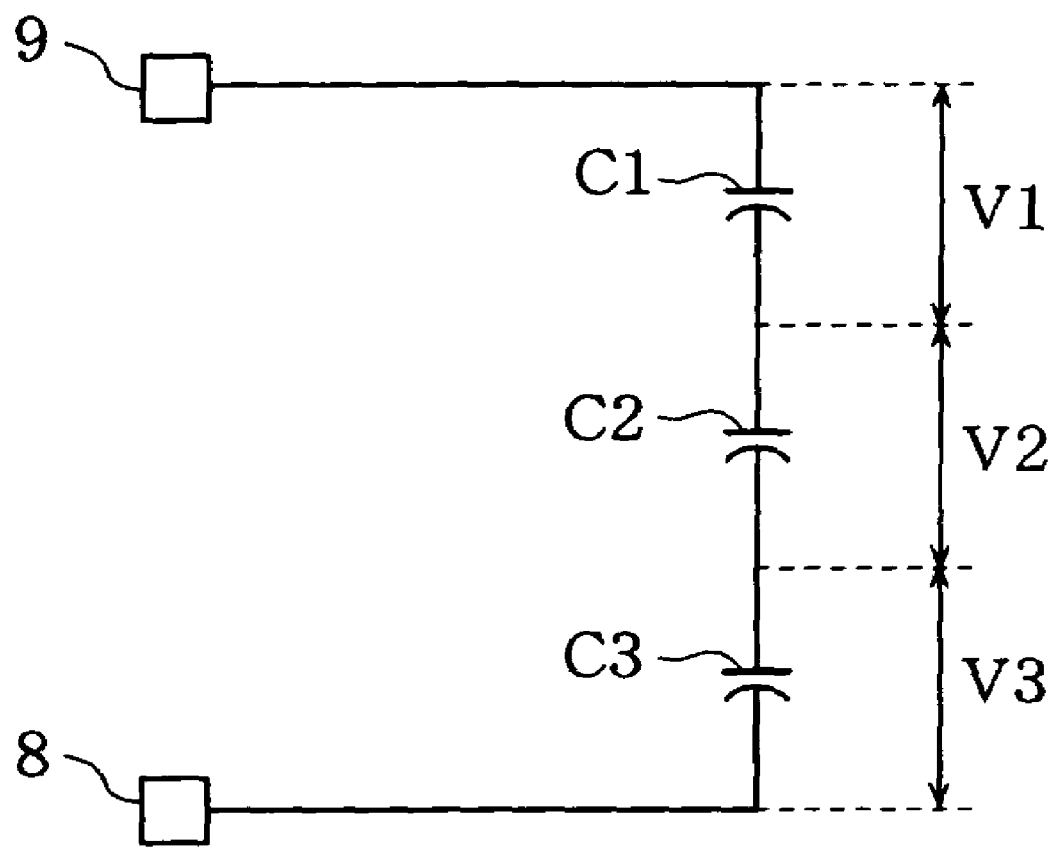
FIG. 3 is a schematically illustrated diagram of capacitive load between a gate line electrode and an opposing electrode in a conventional liquid crystal panel and in some embodiments.

In FIG. 3, capacitive load between the gate line electrode and the opposing electrode of the liquid crystal panel shown in FIG. 2 is schematically illustrated.

In this diagram, 8 denotes the gate line electrode and 9 denotes the opposing electrode. C1 denotes capacitive load of the liquid crystal layer. C2 denotes capacitive load of the insulating layer between the source line electrode and the liquid crystal layer. C3 denotes capacitive load of the insulating layer between the gate line electrode and the a-Si layer.

FIG. 4 (1) shows a plan view of the structure of the liquid crystal panel of this embodiment for each picture element and FIG. 4 (2) shows a sectional view of the same taken along line of A—A.

In this diagram, 8 denotes the gate line electrode. 7 denotes the source line electrode, 3 denotes the pixel electrode, 64 does the channel protecting layer. 65 denotes the a-Si layer, 66 denotes the n+a-Si layer. 86 denotes the first insulating layer between the gate line electrode and the a-Si layer. 762 denotes a second insulating layer between the source line electrode and the liquid crystal layer. 5 denotes a liquid crystal layer, 9 denotes the opposing electrode, 21 denotes the transparent pixel electrode. 862 denotes a second insulating layer between the gate line electrode and the a-Si layer. 761 denotes a first insulating layer between the source line electrode and the a-Si layer.

In the following, operation of this embodiment will be described with reference to these three diagrams.

In FIG. 2, when a voltage V is applied to the gate line electrode 8 and the opposing electrode 9, divided voltages which are determined by a ratio of the capacitive loads among the liquid crystal layer 5, the insulating layer 762 between the source line electrode 7 and the liquid crystal layer, and the insulating layer 86 between the gate line electrode and the a-Si layer are applied to the respective layers. The partial pressures are expressed by V1, V2 and V3. The relation among them is described with reference to FIG. 3.

The capacitive load value C per unit area S is shown by the following equation (1-1), $$C = \epsilon 0 \times \epsilon \times S / l \quad \text{(Eq. 1-1)}$$

where $\epsilon$ is a relative dielectric constant of the layer, 1 is thickness of the layer, and $\epsilon 0$ is a dielectric constant of vacuum.

The partial pressure V1 of the capacitive loads C1, C2 and C3 connected in series is shown by the following equation (1-2), $$V1 = V*C2*C3/(C1*C2+C2*C3+C3*C1) \quad \text{(Eq. 1-2)}.$$

The partial pressure V1 of the equation (1-2) is shown by the following equation (1-3), $$V1 = V*\epsilon 2*\epsilon 3*l1/(\epsilon 1*\epsilon 2*l3+\epsilon 2*\epsilon 3*l1+\epsilon 3*\epsilon 1*l2) \quad \text{(Eq. 1-3)},$$

where $\epsilon 1$, $\epsilon 2$, $\epsilon 3$, l1, l2, and l3 are relative dielectric constants and thickness of the liquid crystal layer 5 and the insulating layers 762 an 86, respectively.

It follows that E1 (electric field intensity)=$V1/l1 = V*\epsilon 2*\epsilon 3/(\epsilon 1*\epsilon 2*l3+\epsilon 2*\epsilon 3*l1+\epsilon 3*\epsilon 1*l2) = V/(l1+l2*\epsilon 1/\epsilon 2+l3*\epsilon 1/\epsilon 3)$ (Eq. 1-4)

In the structure of FIG. 4, the insulating layer between the gate line electrode and the a-Si layer and the insulating layer between the source line electrode and the liquid crystal layer are formed into a bilayer and are patterned, whereby thickness of the insulating layer between the gate line electrode and the liquid crystal layer is reduced, while the insulation between the gate line electrode and the a-Si layer and the insulation between the source line electrode and the liquid crystal layer are kept equivalent to the conventional insulation. With this structure, the denominator in the Eq. 1-4 of the electric field intensity E1 is reduced and, accordingly, the intensity of the electric field applied to the liquid crystal layer is increased, thus enabling the transition of the liquid crystal layer into the bend configuration at a high speed.

Relative dielectric constant of the liquid crystal layer varies to the extent of about 3 to about 8, depending on transmittance of the liquid crystal. When the relative dielectric constants of SiOx, SiNx and TaOx used as the insulating layer are about 3.9, about 6.4 and about 23, respectively, and the variation in relative dielectric constant of the liquid crystals is uniform, the intensity of the electric field applied to the liquid crystal layer of FIG. 13 often becomes higher than the intensity of the electric field (Eq. 1-4) of the conventional structure. To apply a highest possible electric field intensity to the liquid crystal layer is very effective for causing the transition of the liquid crystal layer having the bend configuration from its initial homogeneous state into the bend configuration at high speed. Accordingly, forming the insulating layer to have a reduced thickness as in this embodiment forms a very effective means therefor.

Embodiment 1-2

Shown in FIG. 5 is a schematic diagram of the structure of Embodiment 1-2.

In this diagram, 8 denotes the gate line electrode. 7 denotes the source line electrode, 3 denotes the pixel electrode. 64 denotes the channel protecting layer, 65 denotes the a-Si layer. 66 denotes the n+a-Si layer, 86 denotes the insulating layer between the gate line electrode and the a-Si layer. 76 denotes the insulating layer between the source line electrode and the liquid crystal layer. 5 denotes the liquid crystal layer, 9 denotes the opposing electrode. 21 denotes the transparent pixel electrode. A denotes a line along which the section is taken.

In the 1st embodiment above (Embodiment 1-1 is abbreviated like this, because it is obvious beyond misunderstanding, and the same applies to the following), the insulating layers are formed into the bilayer. Instead of this constitution, the insulating layer between the gate line electrode and the liquid crystal layer may be reduced in thickness by patterning, as shown in FIG. 5, to produce the same effect.

Embodiment 1-3

Shown in FIG. 6 is a schematic diagram of the structure of Embodiment 1-3.

In this diagram also, 8 denotes the gate line electrode. 7 denotes the source line electrode, 3 denotes the pixel electrode. 64 denotes the channel protecting layer, 65 denotes the a-Si layer, 66 denotes the n+a-Si layer. 86 denotes the insulating layer between the gate line electrode and the a-Si layer, 76 denotes the insulating layer between the source line electrode and the liquid crystal layer. 5 denotes the liquid crystal layer, 9 denotes the opposing electrode. 21 denotes the transparent pixel electrode. A denotes the line along which the section is taken.

In this structure, the gate line electrode is formed to have a thickened layer part at a specified part thereof so that the liquid crystal layer on the gate line is reduced in thickness. This produces an increased electric field intensity applied to the liquid crystal layer, so that the transition of the liquid crystal layer to the bend configuration is speeded up.

The gate line electrode usually has a layer thickness of the order of 0.2 μm to about 0.6 μm. When the gate line electrode is thickened about twice, the thickness of the liquid crystal layer can be reduced by the order of 0.5 μm.

Embodiment 1-4

Shown in FIG. 7 is a schematic diagram of the structure of Embodiment 1-4.

In this diagram also, 8 denotes the gate line electrode. 7 denotes the source line electrode, 3 denotes the pixel electrode. 64 denotes the channel protecting layer, 65 does the a-Si layer, 66 denotes the n+a-Si layer. 86 denotes the insulating layer between the gate line electrode and the a-Si layer. 76 denotes the insulating layer between the source line electrode and the liquid crystal layer. 5 denotes the liquid crystal layer, 9 denotes the opposing electrode. 21 denotes the transparent pixel electrode. A denotes the line along which the section is taken. 70 denotes a source line forming metal laminated on the gate line electrode in electrical contact therewith.

In this structure, the source line forming metal is laminated on the gate line forming metal in electrical contact therewith, to form a partially contacting gate line. This structure provides a substantially increased thickness of the gate line electrode to produce a reduced thickness of the liquid crystal layer on the gate line. This produces an increased electric field intensity applied to the liquid crystal layer, so that the transition of the liquid crystal layer to the bend configuration is speeded up.

The source line electrode usually has a layer thickness of the order of 0.2 μm to about 0.6 μm. Accordingly, the thickness of the liquid crystal layer can be reduced to that extent.

Embodiment 1-5

Shown in FIG. 8 is a schematic diagram of the structure of Embodiment 1-5.

In this diagram also, 8 denotes the gate line electrode. 7 denotes the source line electrode, 3 denotes the pixel electrode. 64 denotes the channel protecting layer, 65 denotes the a-Si layer. 66 denotes the n+a-Si layer. 86 denotes the insulating layer between the gate line electrode and the a-Si layer. 76 denotes the insulating layer between the source line electrode and the liquid crystal layer. 5 denotes the liquid crystal layer, 9 denotes the opposing electrode. 21 denotes the transparent pixel electrode. A does the line along which the section is taken. 713 denotes a source line forming metal laminated onto the gate line electrode in non-electrical contact therewith.

In this structure, the source line forming metal is interposed between the gate line electrode and the opposing electrode to provide electrical isolation therebetween, thereby forming a non-contact type gate line. This structure provides a reduced thickness of the liquid crystal layer on the gate line to thereby produce increased electric field intensity applied to the liquid crystal layer, so that the transition of the liquid crystal layer to the bend configuration is speeded up.

Embodiment 1-6

Figure 9:
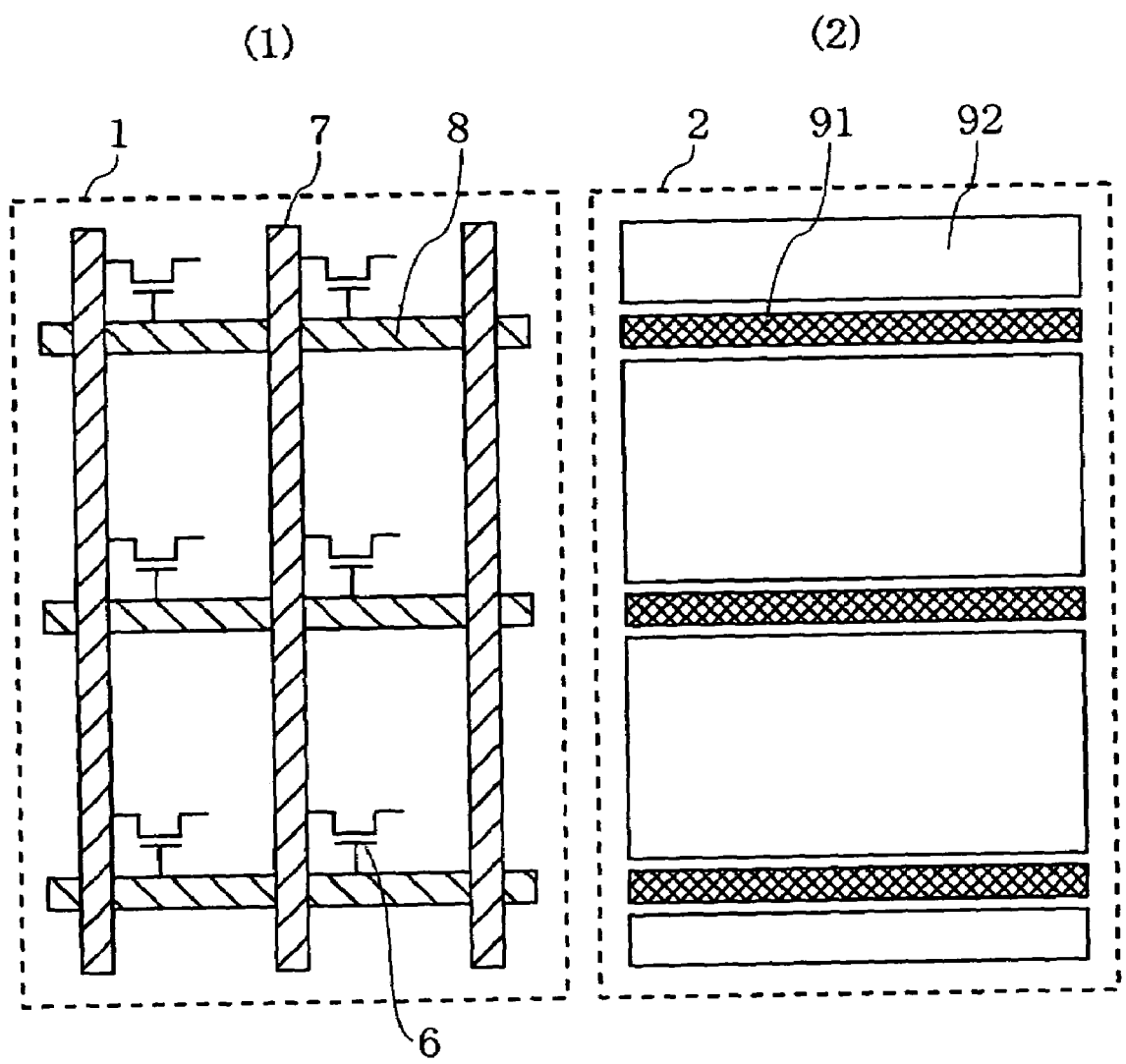
FIG. 9 shows diagrams of a constitution for one picture element of the liquid crystal panel of Embodiment 1-6.

Shown in FIG. 9 is a schematic diagram of the structure of Embodiment 1-6.

In this diagram, 1 denotes a first substrate. 8 denotes the gate line electrode. 7 denotes the source line electrode, 6 denotes a pixel transistor. 2 denotes a second substrate. 91 denotes a first opposing electrode formed at a position to confront the gate line electrode on the first substrate, 92 denotes a second opposing electrode electrically isolated from the first opposing electrode. In this structure of the opposing electrodes being divided, since the first opposing electrode and the second opposing electrode are electrically isolated from each other, the pixel electrode and the pixel transistor are prevented from being affected by voltage variation through the capacitive loads of the liquid crystal layer and the insulating layer, while a given electric field intensity is given to the liquid crystal layer over the gate line electrode. This enables the transition of the liquid crystal layer to the bend configuration to be speeded up. In the normal image display period, the potential of the first opposing electrode and the potential of the second opposing electrode are made equal to each other. This can produce exactly the same image quality as that of the conventional liquid crystal display device having the opposing electrodes to which no patterning is given.

Embodiment 1-7

Figure 10:
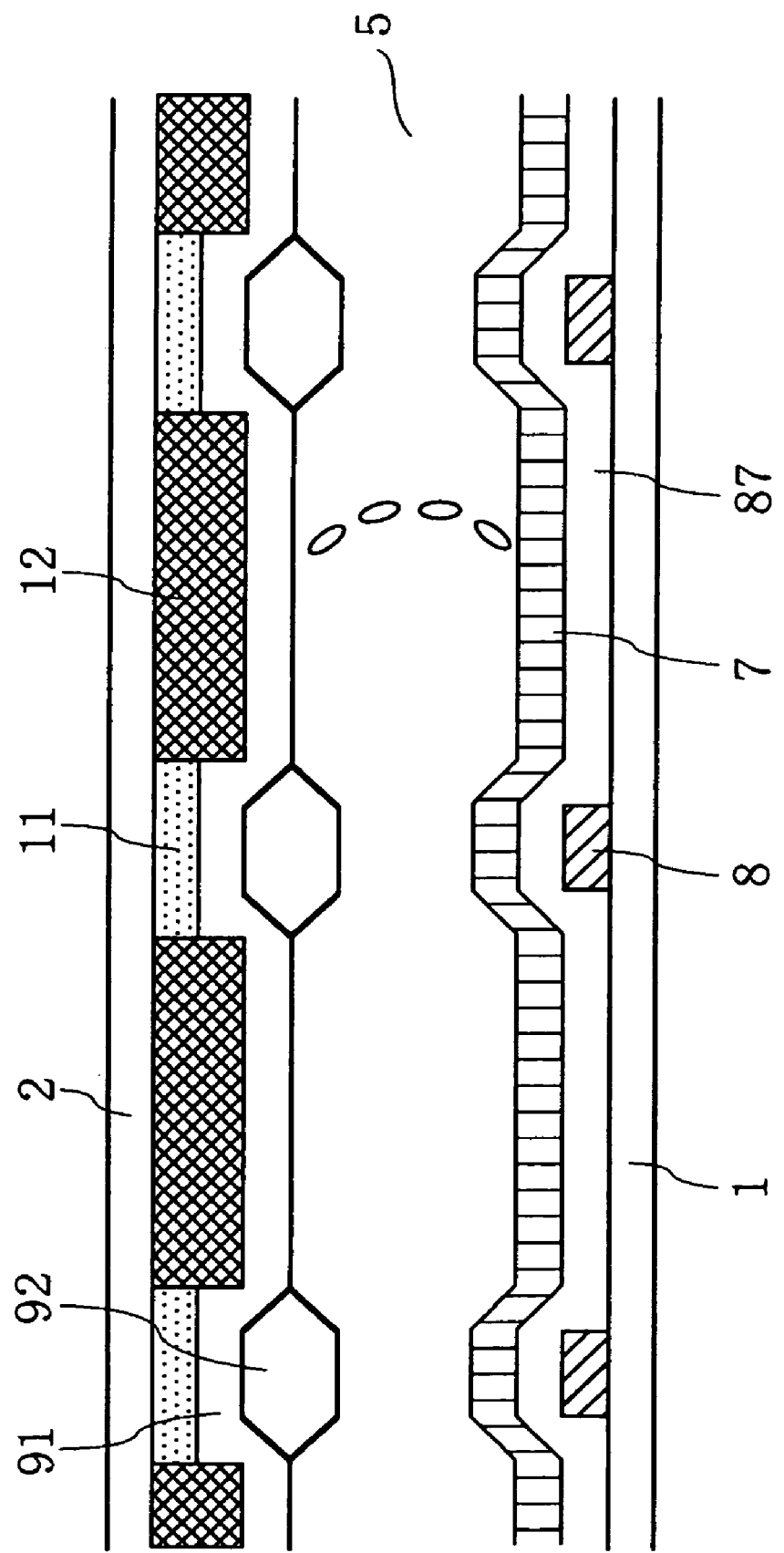
FIG. 10 is a sectional view of a liquid crystal device of Embodiment 1-7.

Shown in FIG. 10 is a sectional view of the liquid crystal display device of Embodiment 1-7.

In this diagram, 1 denotes the first substrate. 8 denotes the gate line electrode, 7 denotes the source line electrode 87 denotes the insulating layer. 2 denotes the second substrate, 11 denotes a black matrix metal formed at a position to confront the gate line electrode on the first substrate. 12 denotes a color filter, 5 denotes the liquid crystal layer. 91 denotes a first-layered opposing electrode substantially uniformly formed over the whole area of the second substrate and 92 a second-layered opposing electrode formed at a position to confront the gate line on the first substrate. In this structure of the opposing electrodes being thickened at the confronting positions, the opposing electrodes confronting each other over the gate line are formed in a two-layer structure to produce a reduced thickness of the liquid crystal layer over the gate line. This produces an increased electric field intensity of the liquid crystal layer, so that the transition of the liquid crystal layer to the bend configuration is speeded up.

Embodiment 1-8

Figure 11:
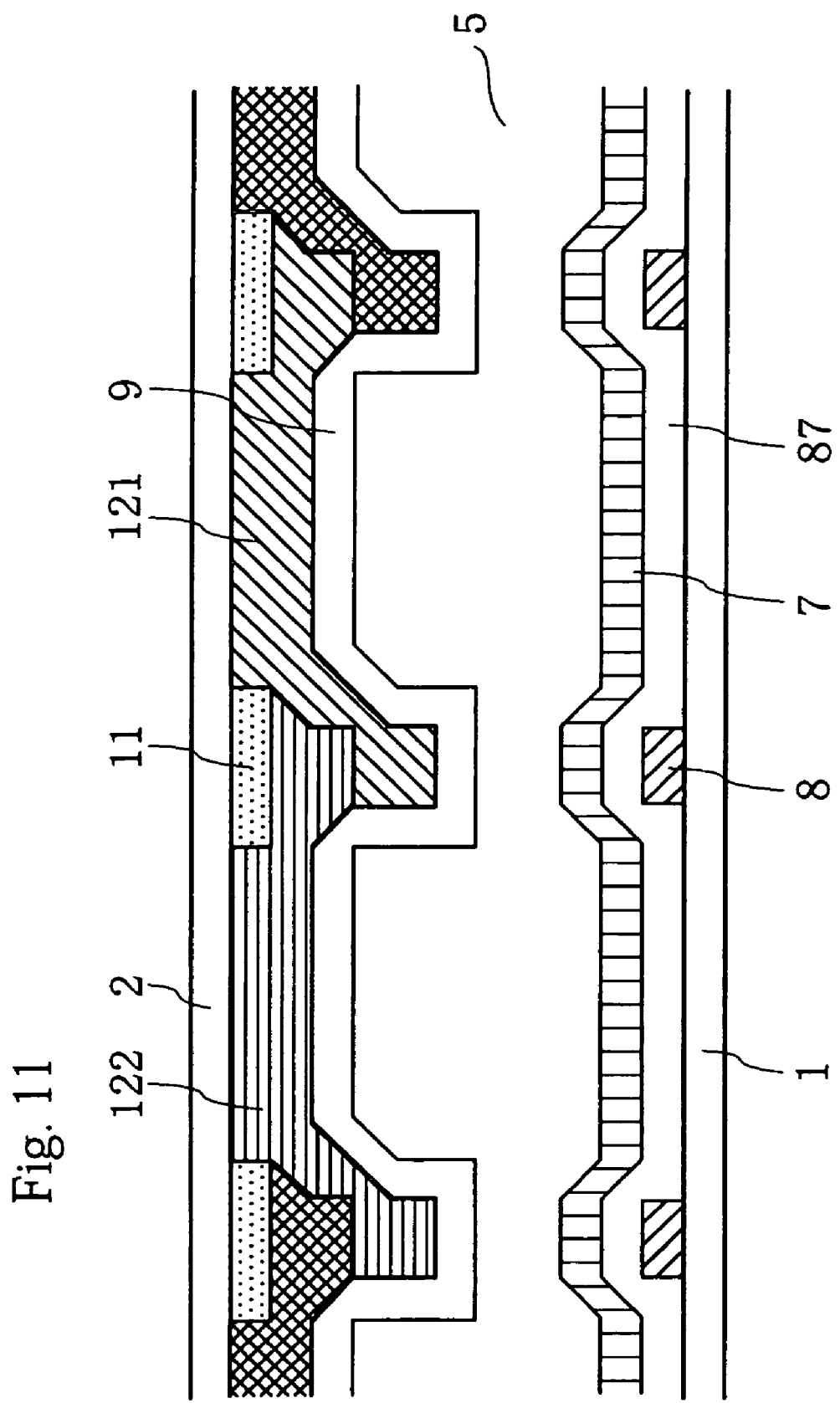
FIG. 11 is a sectional view of a liquid crystal device of Embodiment 1-8.

Shown in FIG. 11 is a sectional view of the liquid crystal display device of Embodiment 1-8.

In this diagram also, 1 denotes the first substrate. 8 denotes the gate line electrode, 7 denotes the source line electrode. 87 denotes the insulating layer. 2 denotes the second substrate, 11 denotes the black matrix metal formed at a position to confront the gate line electrode on the first substrate. 121 denotes a first-color (e.g. red) color filter, 122 denotes a second-color (e.g. blue) color filter. 9 denotes the opposing electrode, 5 does the liquid crystal layer.

In this structure, color filter forming resin is laminated on the second substrate at its portion to confront the gate line electrode on the first substrate, whereby the opposing electrode on that portion is made protuberant to produce a reduced thickness of the liquid crystal layer over the gate line. This produces an increased electric field intensity of the liquid crystal layer, so that the transition of the liquid crystal layer to the bend configuration is speeded up.

Embodiment 1-9

Figure 12:
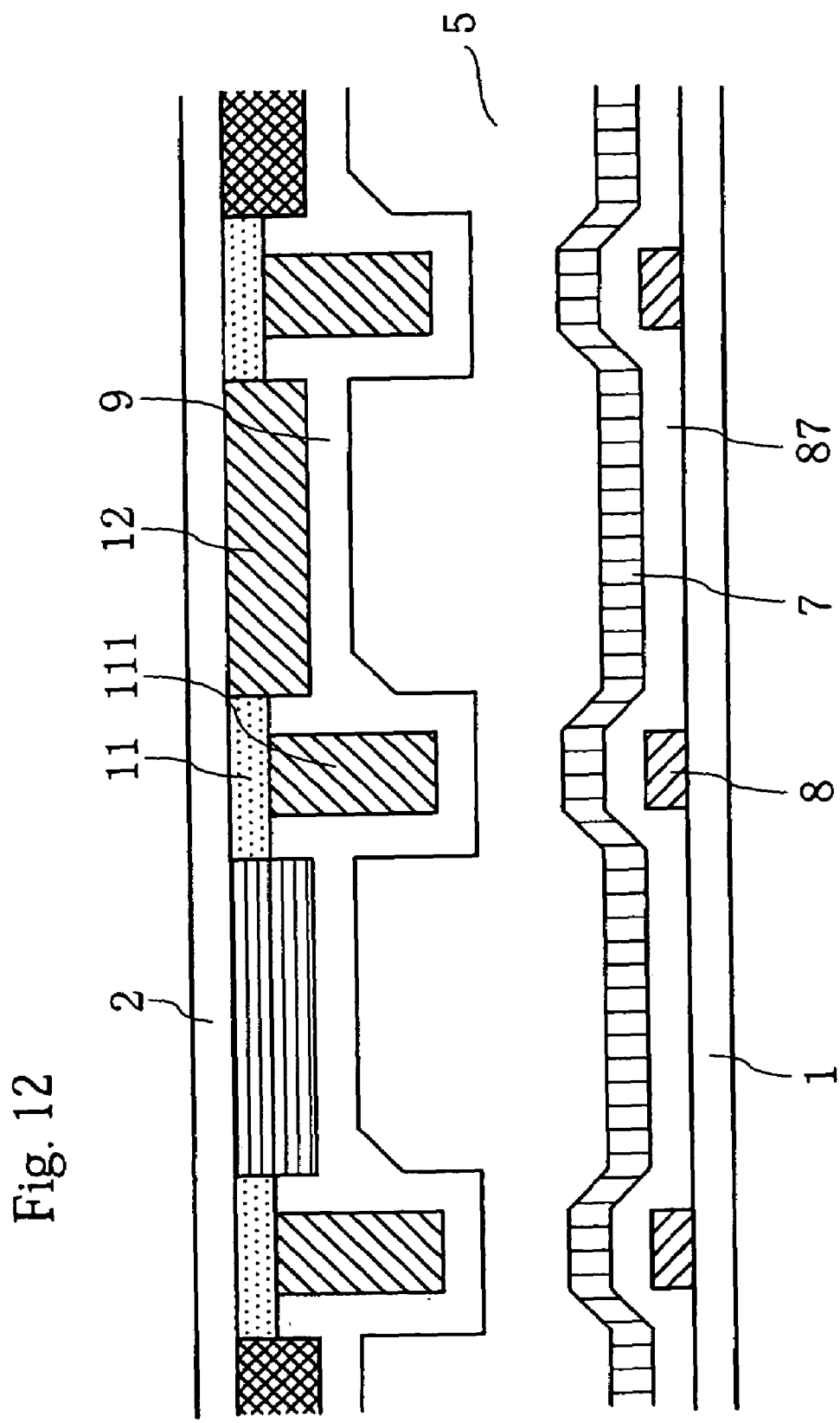
FIG. 12 is a sectional view of a liquid crystal device of Embodiment 1-9.

Shown in FIG. 12 is a sectional view of the liquid crystal display device of Embodiment 1-9.

In this diagram also, 1 denotes the first substrate. 8 denotes the gate line electrode, 7 denotes the source line electrode. 87 denotes the insulating layer; 2 does the second substrate. 11 denotes the black matrix metal formed at a position to confront the gate line electrode on the first substrate, 12 denotes the color filter. 111 denotes a pillar-shaped spacer formed at a position to confront the gate line on the first substrate. 9 denotes the opposing electrode. 5 denotes the liquid crystal layer.

In this structure, the pillar-shaped spacer is formed on the second substrate at its portion to confront the gate line electrode on the first substrate and the opposing electrode is formed between the pillar-shaped spacer and the liquid crystal layer, whereby the liquid crystal layer over the gate line is reduced in thickness. This produces increased electric field intensity of the liquid crystal layer, so that the transition of the liquid crystal layer to the bend configuration is speeded up.

While various structures of the liquid crystal panel have been described above with reference to the nine embodiments from the first embodiment to the ninth embodiment, two or more of the embodiments may be combined to provide a reduced thickness of the liquid crystal layer over the gate line. Using those structures in combination can easily produce the enhanced effect, as compared with using any one embodiment singularly. Additionally, when the opposing electrode is divided and any selected voltage is applied to the electrode confronting the gate line, the effect is further enhanced.

Second Inventive Group

The second inventive group is mainly characterized in that a higher voltage is applied between the pixel electrode and the opposing electrode for the transition of the liquid crystal layer than for the normal image display period or a secondary voltage is applied and further ingenuity is applied to the means therefore and the duty ratio.

Embodiment 2-1

Figure 13:
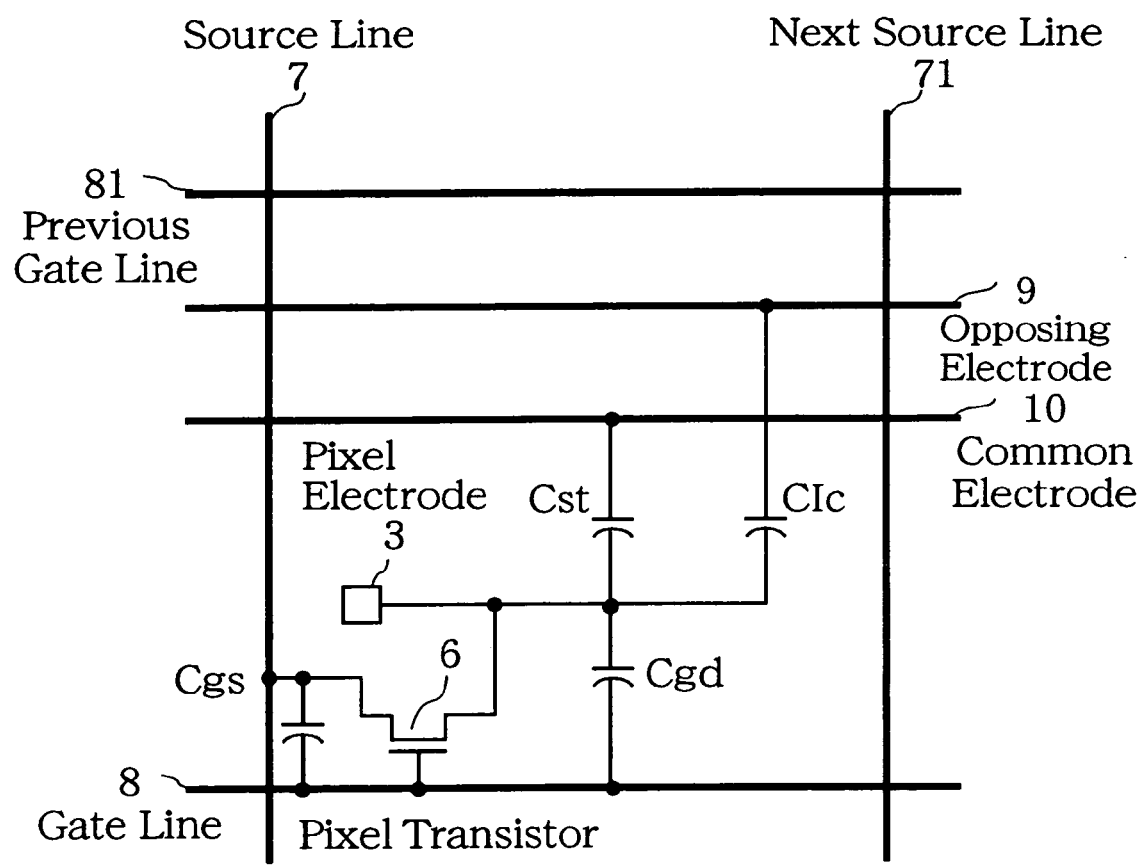
FIG. 13 is a diagram illustrating a circuitry of the picture element of a liquid crystal device of Embodiment 2-1 and equivalent.

FIG. 13 shows a constitution of the liquid crystal device of this embodiment around the circuit of the picture element. In this diagram, 3 denotes the pixel electrode. 6 denotes the pixel transistor. 7 denotes the source line. 71 denotes the next source line. 8 denotes the gate line. 81 denotes the previous gate line. 9 denotes the opposing electrode. 10 is a common electrode connected to the total storage capacity. Cgd denotes a capacity between gate and drain of the pixel transistor. Cst denotes a storage capacity connected to the pixel electrode and formed between the pixel electrode and the common electrode. Clc denotes a capacity of the liquid crystal layer. Cgs is a capacity between gate and source of the pixel transistor.

FIG. 14 schematically shows in plan and section the principal structure of the picture element. In this diagram, 6 denotes the pixel transistor. 21 denotes the transparent pixel electrode. Cst denotes the storage capacity connected to the pixel electrode and formed between the pixel electrode and the common electrode. Clc denotes the capacity of the liquid crystal layer. 7 denotes the source line; 71 denotes the next source line. 8 denotes the gate line, 81 denotes the previous gate line. 9 denotes the opposing electrode. 10 denotes the common electrode connected to the total storage capacity.

Figure 15:
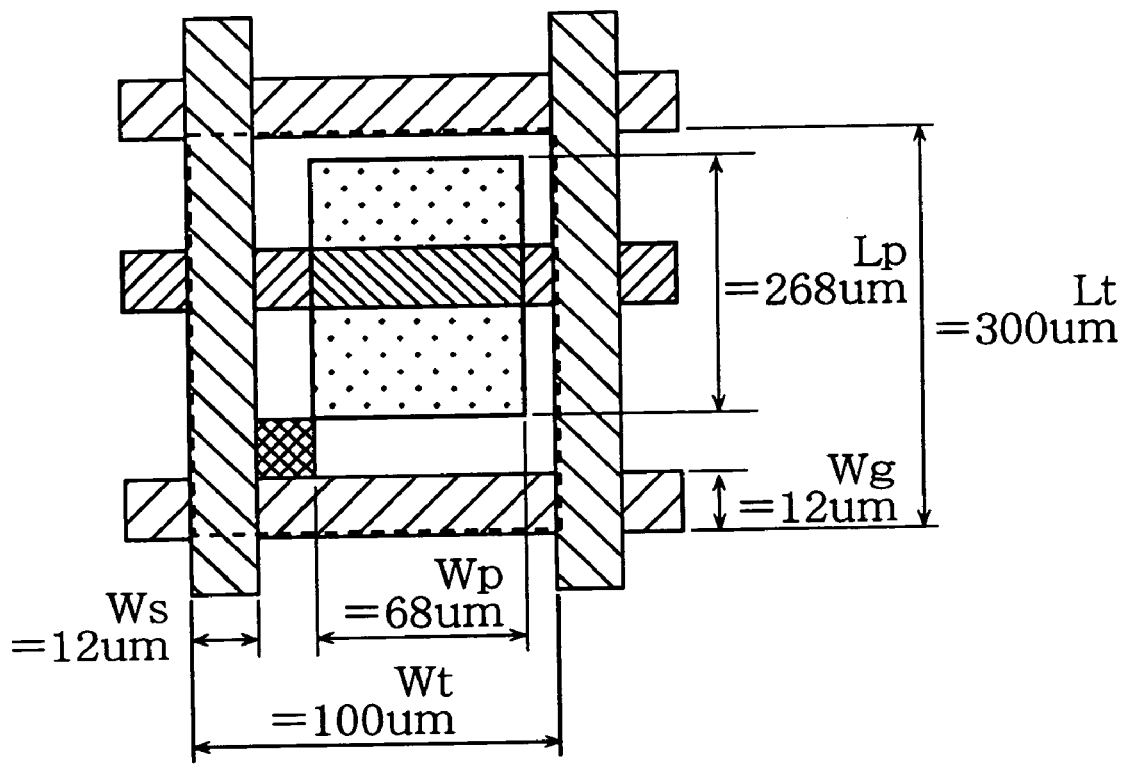
FIG. 15 is a diagram illustrating dimensions of the picture element of the same.

FIG. 15 shows one example of dimensions per picture element. In this diagram, Wt denotes a width of the picture element. Lt denotes a length of the picture element. Wp denotes a width of the pixel electrode. Lp denotes a length of the pixel electrode. Ws denotes a width of the source line. Wg is a width of the gate line. The total area per picture element is 30,000[$\mu m^2$] and the area of the pixel electrode is 18,224 $\mu m^2$ which is 60.7% of the total area of one picture element.

Figure 16:
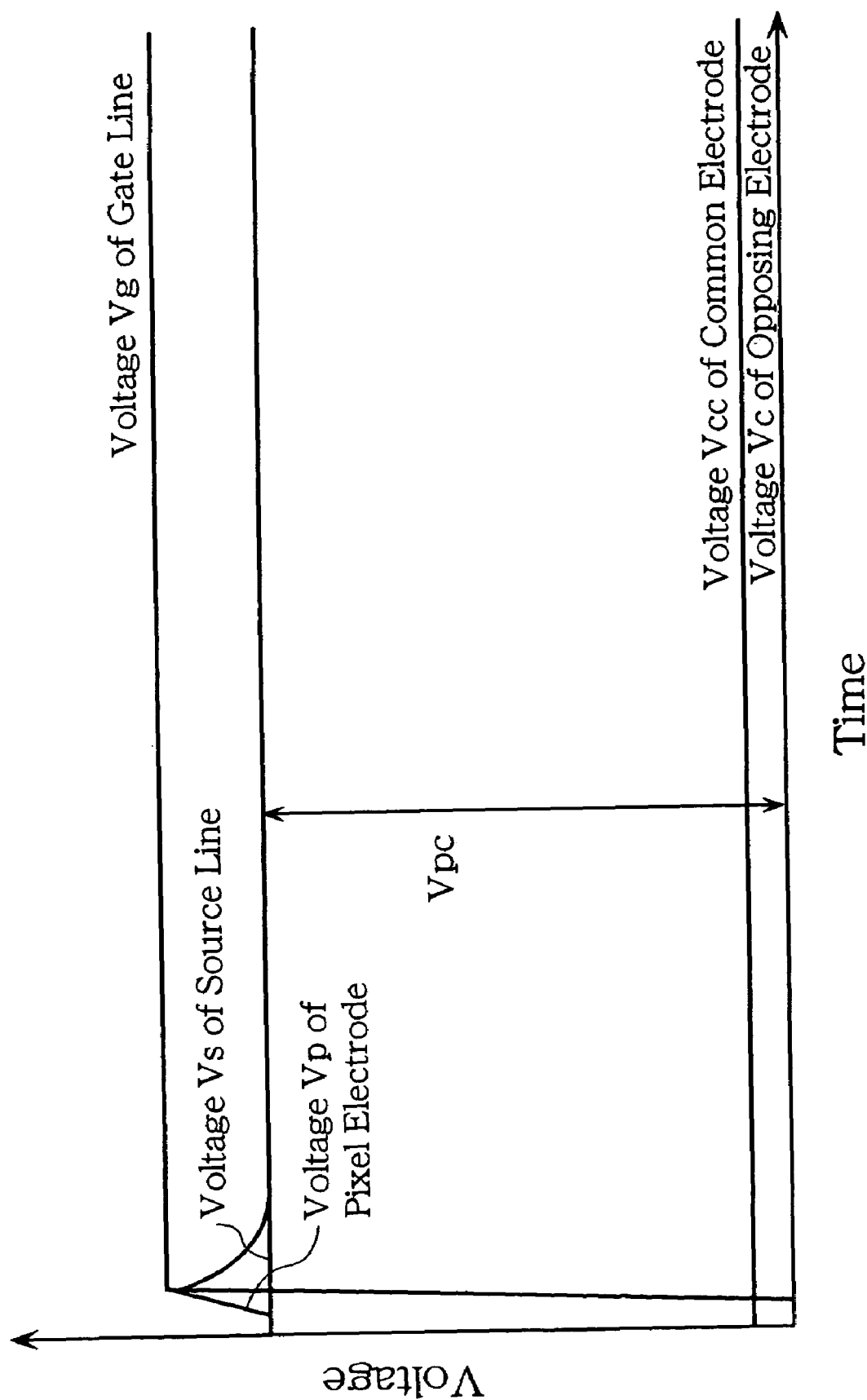
FIG. 16 is a diagram likewise illustrating the condition and operation of a voltage applied or added to the parts between the picture elements.

Operation of the liquid crystal device of this embodiment shown in FIGS. 13, 14 and 15 is illustrated in FIG. 16.

In FIG. 16, Vg denotes a voltage of the gate line. Vs denotes a voltage of the source line. Vp is a voltage of the pixel electrode. Vcc is a voltage of the common electrode. Vc is a voltage of the opposing electrode.

In the normal image display, the voltage Vg of the gate line is modulated until the pixel transistor is put in the ON mode, to charge the pixel electrode 21, the storage capacity Cst and the liquid crystal capacity Clc with the voltage Vs of the source line. The voltage Vp of the pixel electrode comes to be equal to the voltage Vs of the source line.

The voltage Vc of the opposing electrode should preferably be set within a range within which the transmittance of the liquid crystal is allowed to fully vary between the voltage of the opposing electrode and the voltage Vp of the pixel electrode. Usually, the potential difference Vpc between Vc and Vp is set in the range of the order of 0V to 5V. The transition of the liquid crystal layer to the bend configuration requires the different potential difference continuous application step of continuously applying a further higher potential difference to the liquid crystal layer. The potential difference and the time required for the transition of the liquid crystal layer into the bend configuration varies depending on the liquid crystal material used. It is experimentally confirmed that there is some material that enables the transition to be completed within 1 second by applying a potential difference of 6V or more between the pixel electrode and the opposing electrode. A shortest possible transition time is desirable for the transition of the liquid crystal display device. The transition time is desirably within the range of from a few seconds to ten seconds, which however requires the application of a large potential difference (the order of 20V to 30V) or the choice of the liquid crystal material. The potential difference required for the transition of the liquid crystal layer to the bend configuration is desirably applied to a largest possible area thereof, and it is most effective in terms of the availability of area that that potential difference is applied between the pixel electrode and the opposing electrode, as shown in FIG. 15.

Embodiment 2-2

Figure 17:
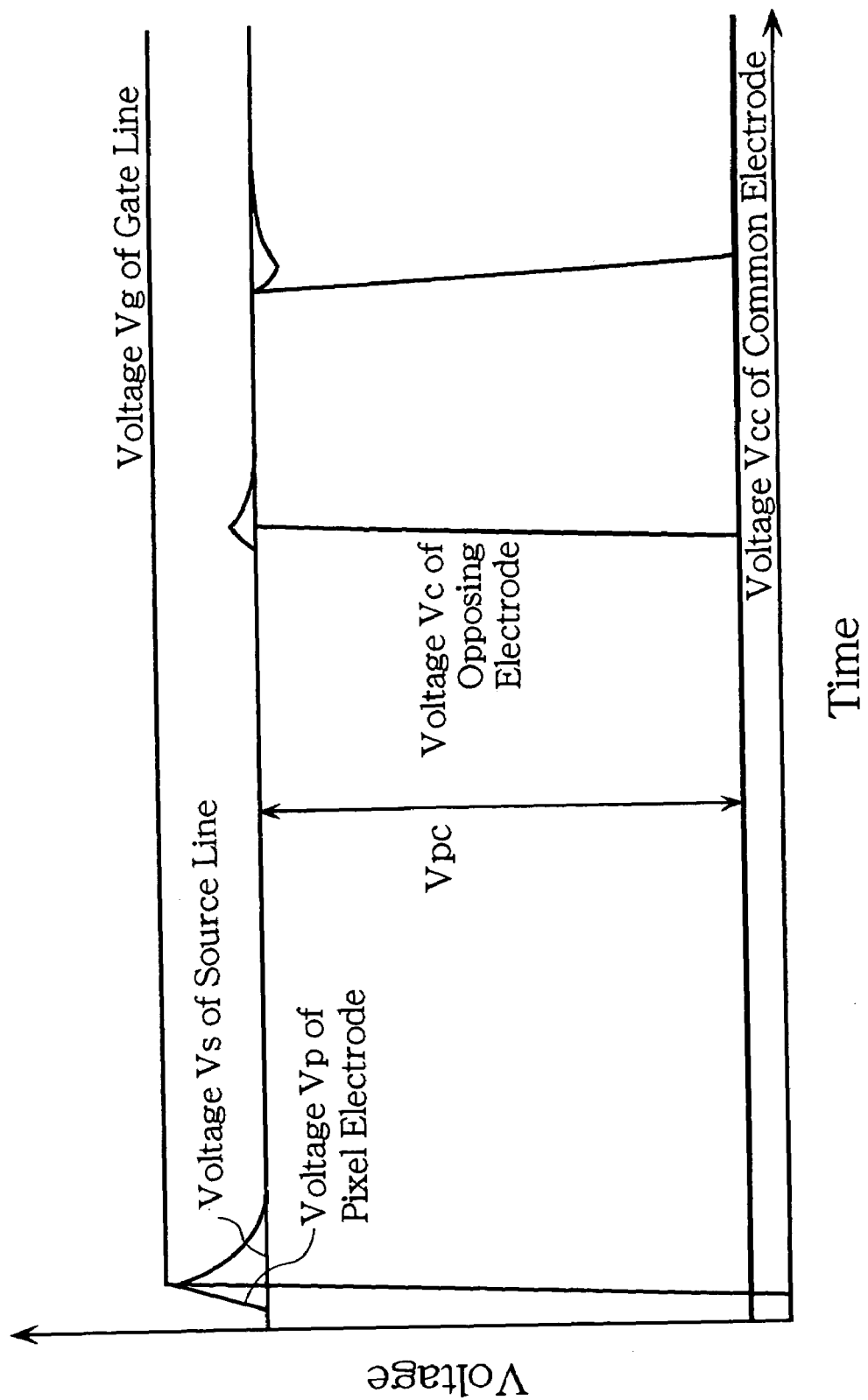
FIG. 17 is a diagram likewise illustrating the condition and operation of a voltage applied of Embodiment 2-2.

Operation of the second embodiment will be illustrated in FIG. 17 by combined use of FIGS. 13, 14 and 15.

In FIG. 17, Vg denotes a voltage of the gate line. Vs denotes a voltage of the source line. Vp is a voltage of the pixel electrode. Vcc is a voltage of the common electrode. Vc is a voltage of the opposing electrode. Operation of the liquid crystal panel having this constitution in the normal image display is the same as the operation of the first embodiment. The potential difference Vpc between Vc and Vp is in the range of 0V to 5V. When a primary potential difference of not less than 6V is continuously applied between the pixel electrode and the opposing electrode in order to cause the transition of the liquid crystal layer to the bend configuration, depending on the structure of the liquid crystal panel or the liquid crystal material, the transition is sometimes partly deadlocked, so that the transition at that part may not be effected even after the passage of 10 seconds or more. In this condition of panel structure or liquid crystal material, the voltage Vc of the opposing electrode is brought close to the voltage Vp of the pixel electrode and thereby the potential difference Vpc applied to the liquid crystal layer is modulated to a secondary small potential difference to return the alignment of the liquid crystal elements to their original state, first, and then the primary high potential difference is applied again to the liquid crystal layer. This produces the result that even if the liquid crystal elements are first returned to their original state and then that potential difference is applied again thereto, since the liquid crystal elements that were originally changed into the bend state are easily changed into the bend state, the transition is effected shortly after the potential difference is applied again, and as such can allow the deadlocked part to be easily changed to the bend state by newly applying the potential difference. Accordingly, the transition to the bend configuration can be effected over the whole area of the panel in a short time.

Figure 18:
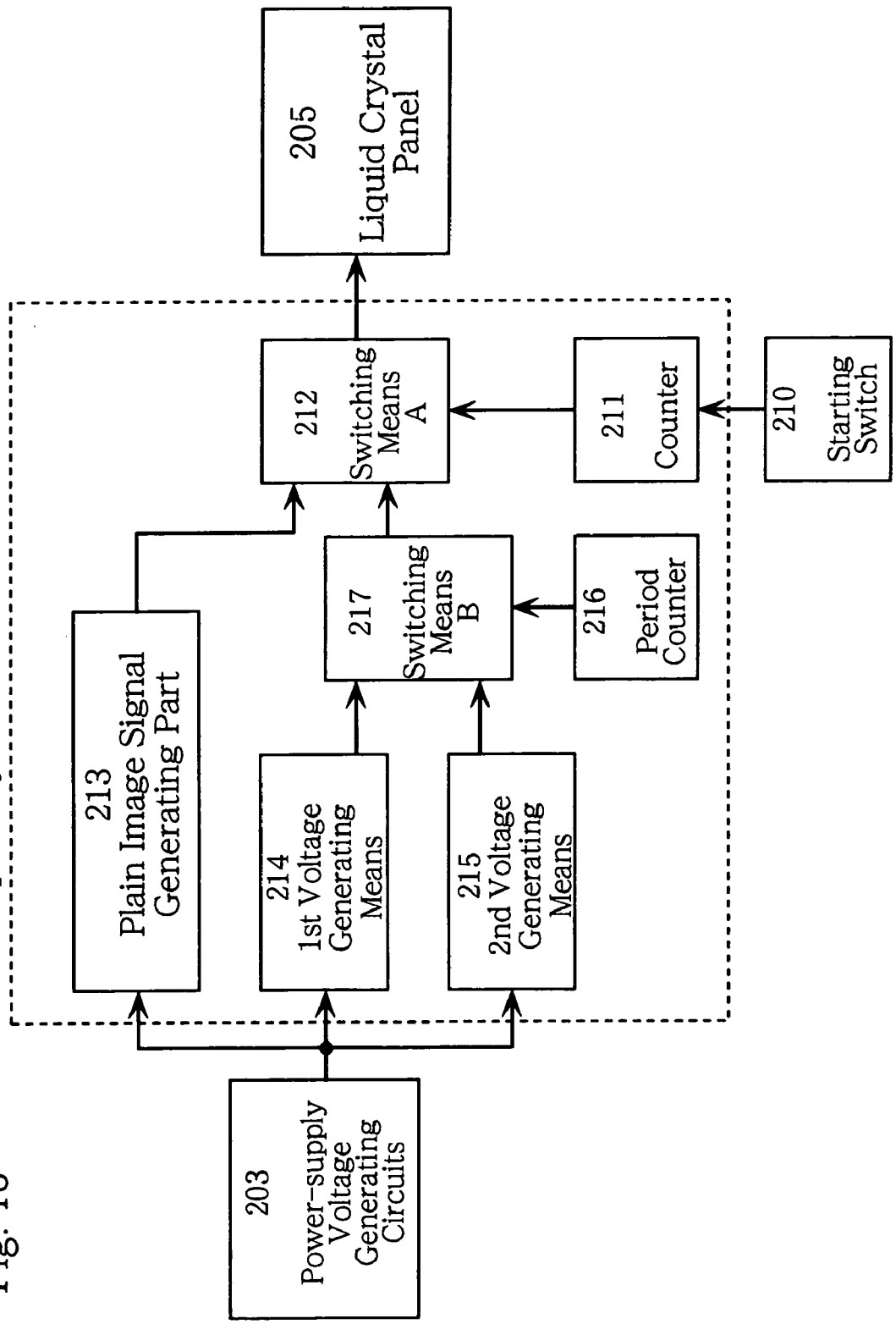
FIG. 18 is a block diagram of control means of a liquid crystal device of the above-mentioned embodiment.

FIG. 18 shows an example of the constitution of control means of the liquid crystal device according to the present invention.

In this diagram, 205 denotes the liquid crystal panel. 204 denotes a liquid crystal panel controller. 203 denotes power-supply voltage generating circuits. A starting switch 210 is connected to the liquid crystal panel controller 204 from outside. The starting switch 210 is connected to a counter 211 and in turn to a switching means A 212 arranged in the interior of the liquid crystal panel controller 204. Immediately after the startup, a predetermined time is counted by the counter and, then, picture signals from a normal image signal generating part 213 are applied to the liquid crystal panel 205. In the counting of the predetermined time, a switching means B denoted by 217 switches between a 1st voltage generating means 214 and a 2nd voltage generating means 215 in a predetermined period preset by the period counter 216. These voltage generating means do not necessarily generate a single voltage. The liquid crystal panel 205 takes an active matrix mode, so that the effective potential difference between the pixel electrode and the opposing electrode applied to the liquid crystals in the panel is the key factor. Therefore, the switching is performed by combining any required voltages selected from not only the voltage of the opposing electrode but also the voltages of the source line, gate line and common electrode of the storage capacity line mentioned later which are critical factors for determining the voltage of the pixel electrode.

The predetermined time immediately after the startup mentioned herein indicates the time of the order of about 0.1 to 10 seconds, and the predetermined period preset by the period counter 216 indicates the time period of the order of about 0.1 to 5 seconds.

Figure 19:
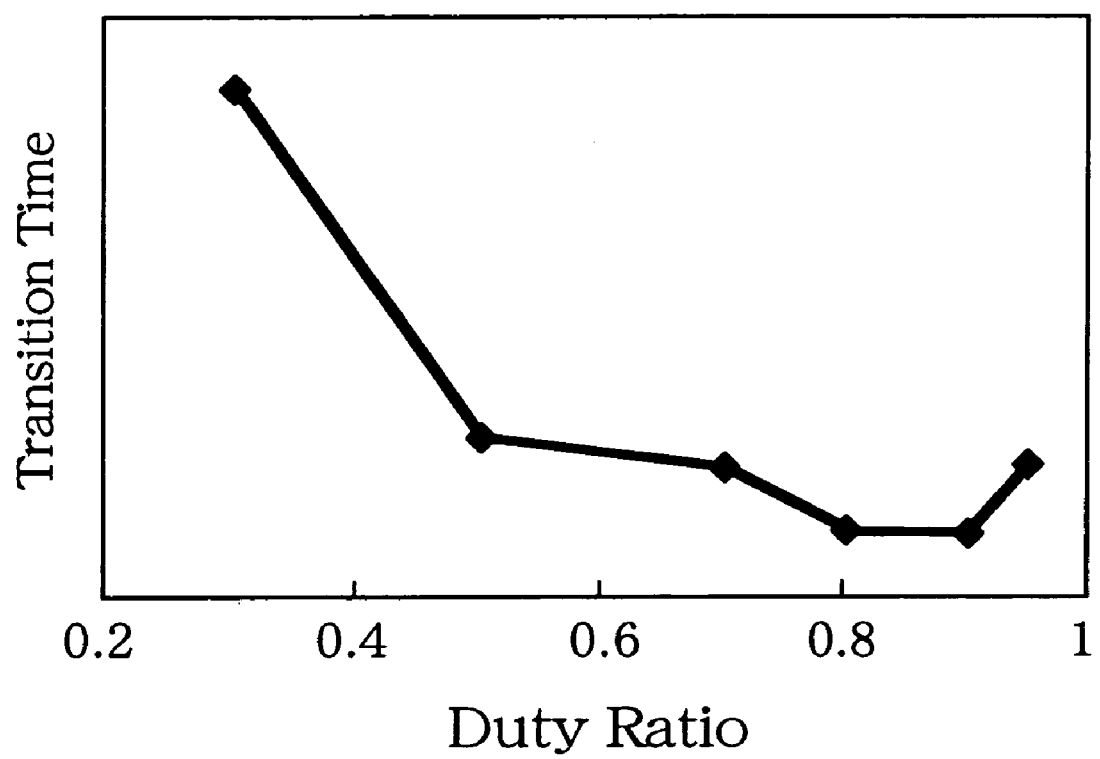
FIG. 19 is a diagram illustrating a correlation between a duty ratio and a transition completion time in the primary potential difference application step in Embodiment 2-2.
Figure 20:
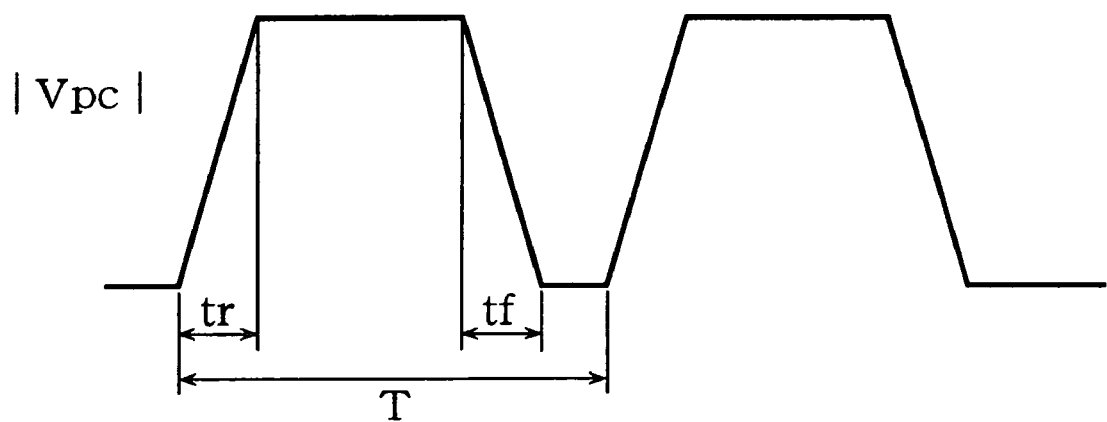
FIG. 20 is a diagram likewise illustrating the time tr and tf required for potential difference Vpc between the pixel electrode and the opposing electrode to be modulated.

In this embodiment, since the time required for the potential difference Vpc between the pixel electrode and the opposing electrode to be modulated to the secondary potential difference is the time required for the transition of the liquid crystal elements to the bend configuration to be returned to their original state, it should be made equal to or shorter than the time for the primary potential difference to be applied between the pixel electrode and the opposing electrode, to complete the transition of the liquid crystal elements to the bend configuration in the entire liquid crystal panel in a short time. As shown in FIG. 19, when the duty ratio exceeds 0.5 in the primary potential difference application step in which the higher primary potential difference is applied to Vpc, the transition time is significantly shortened. It takes about 0.1 second to 3 seconds for the primary potential difference application step. Ups and downs in a through rate of voltage variation of the opposing electrode generated at the time of switching between the primary potential difference application step and the secondary potential difference application step does not directly affect on the to-the-bend configuration transition time. Thus, even when the voltage is gently varied by use of a drive element having only a small current driving capability, to drive a high load electrode such as the opposing electrode, the substantially same effect can be provided. As shown in FIG. 20, when the potential difference Vpc is varied in the period T repeatedly controlling step, prompt transition can be provided until the time tr and tf required for the potential difference to be varied reach 30% of the respective period T.

Figure 21:
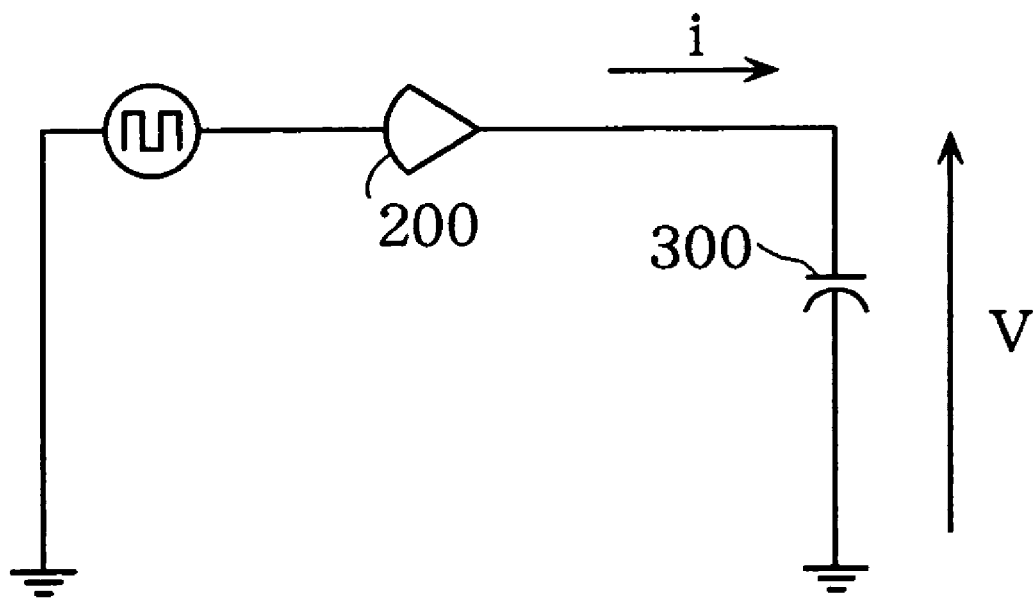
FIG. 21 is a diagram likewise illustrating the embodied circuitry.

The current i [A] required for the capacity C [F] to be modulated to V [V] in t second by use of the circuit as shown in FIG. 21 is given by the following equation:

$$i = C*V/t$$

It follows from this that the current driving capability required for the opposing electrode having the capacity of 10 [uF] to be modulated to 10 [V] in 300 msec. is 0.33 [mA]. Accordingly, the circuit can be formed by a current driving element such as a general operational amplifier or a low power consumption operational amplifier. Though not shown, the capacity element may be driven by a pulsed signal source and serial resistance.

Embodiment 2-3

Figure 22:
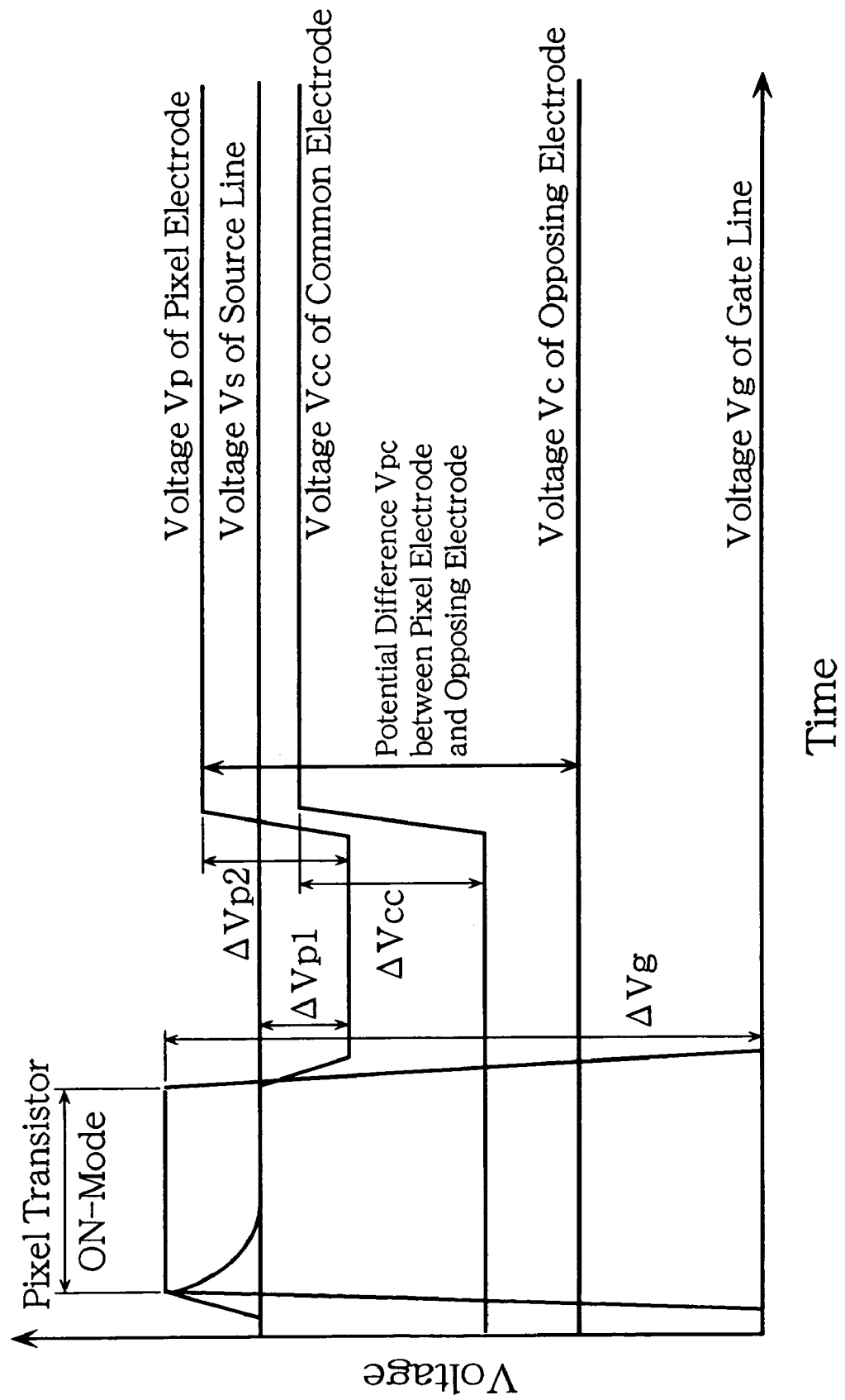
FIG. 22 is a diagram likewise illustrating the condition and operation of a voltage applied of Embodiment 2-3.

Referring to FIGS. 13, 14 and 15, there is shown the common electrode's potential difference variation using mode as the third embodiment in which the primary potential difference is increased by use of the potential variation of the common electrode in the first embodiment, and the operation is illustrated in FIG. 22. This embodiment is identical in constitution to the first embodiment.

In FIG. 22, Vg denotes a voltage of the gate line. Vs denotes a voltage of the source line. Vp denotes a voltage of the pixel electrode. Vcc denotes a voltage of the common electrode. Vc denotes a voltage of the opposing electrode.

During the time during which the pixel transistor is in the ON mode, the potential Vs of the source line is written to the pixel electrode. When the pixel transistor is put in the OFF mode, the potential Vp of the pixel electrode is varied only by the extent of a punch-through voltage ΔVp1 calculated from the following Equation 2-1 in accordance with the voltage variation ΔVg of the gate line. Further, when the potential Vcc of the common electrode which forms the electrode of storage capacity during the time during which the pixel transistor is in the OFF mode is varied only by the extent of ΔVcc, a punch-through voltage ΔVp2 calculated from the following Equation 2-2 is generated in the pixel electrode. For the signal variation illustrated in this diagram, a potential higher than the potential Vs written from the source line can be applied to the pixel electrode by rendering ΔVp2 larger ΔVp1. This allows the potential difference Vpc between the pixel electrode and the opposing electrode to increase further, so that the time required for the transition of the liquid crystal layer into the bend configuration is shortened.

$$\Delta Vp1 = \Delta Vg * Cgd/(Cst+Clc+Cgd) \qquad \text{Eq. 2-1}$$

$$\Delta Vp2 = \Delta Vcc * Cst/(Cst+Clc+Cgd) \qquad \text{Eq. 2-2}$$

Figure 23:
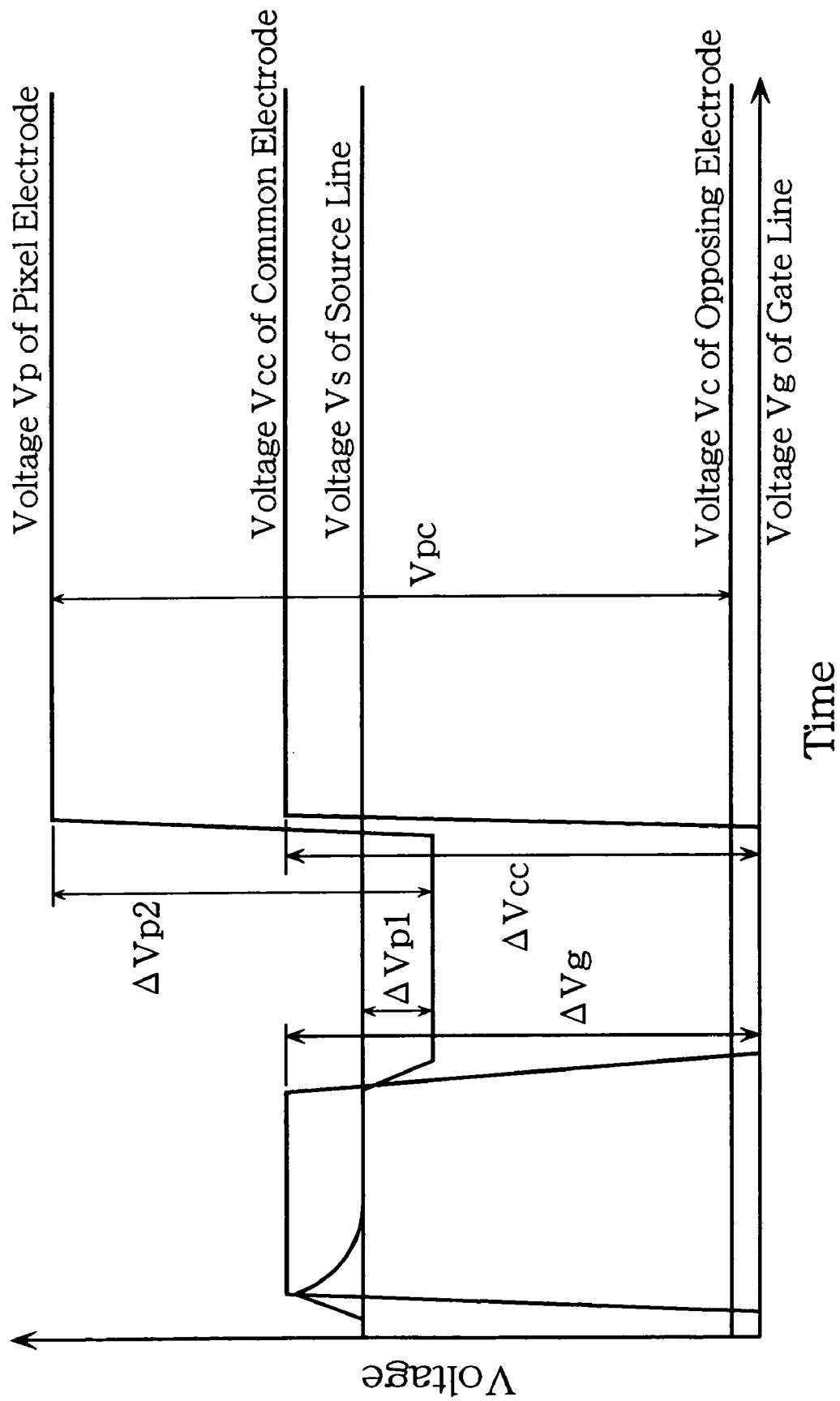
FIG. 23 is a diagram illustrating a variant of the embodiment above.

In this case, even when the voltage of the common electrode is made equal to that of the gate signal, as shown in FIG. 23, Vpc can substantially be increased and also the scale of the power supply circuit can be reduced by common use of the voltage.

Embodiment 2-4

Figure 24:
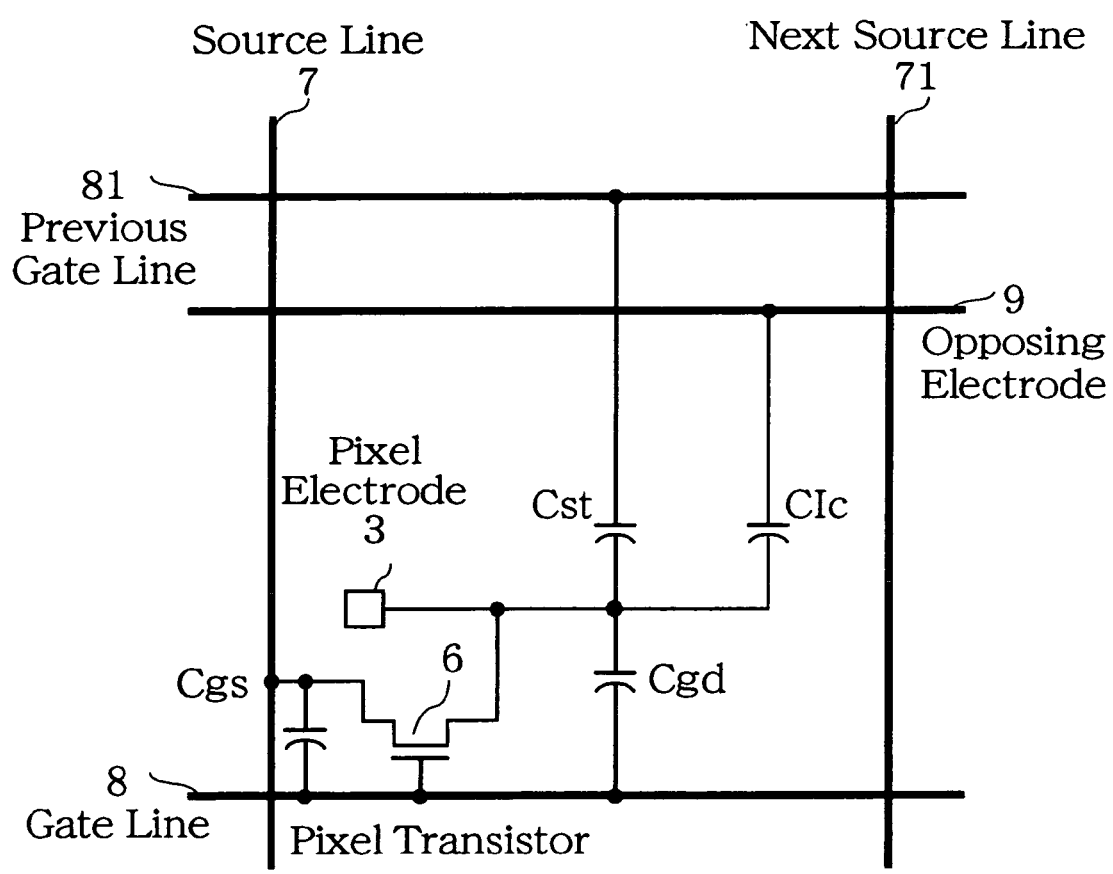
FIG. 24 is a diagram illustrating a circuitry of the picture element of Embodiment 2-4.

FIG. 24 is a diagram illustrating the constitution for one picture element of the liquid crystal panel. In the diagram, 6 denotes the pixel transistor. 3 denotes the pixel electrode, Cgd denotes the capacity between gate and drain of the pixel transistor. Cst denotes storage capacity connected to the pixel electrode and formed between the pixel electrode and the previous gate line, Clc denotes the capacity of the liquid crystal layer. Cgs denotes capacity between gate and source of the pixel transistor. 7 denotes the source line, 71 denotes the next source line. 8 denotes the gate line, 81 denotes the previous gate line. 11 denotes the opposing electrode. The liquid crystal panel of this constitution, which is called the previous gate mode, can eliminate the need of the common electrode to enhance the aperture ratio, as compared with the constitution of FIGS. 13 and 14.

FIG. 25 schematically illustrates in plan and section the pixel structure. 6 denotes the pixel transistor. 21 denotes the transparent pixel electrode. Cst denotes the storage capacity connected to the pixel electrode and formed between the pixel electrode and the previous gate line. Clc denotes the capacity of the liquid crystal layer. 7 denotes the source line, 71 denotes the next source line. 8 denotes the gate line, 81 denotes the previous gate line. 9 denotes the opposing electrode.

Figure 26:
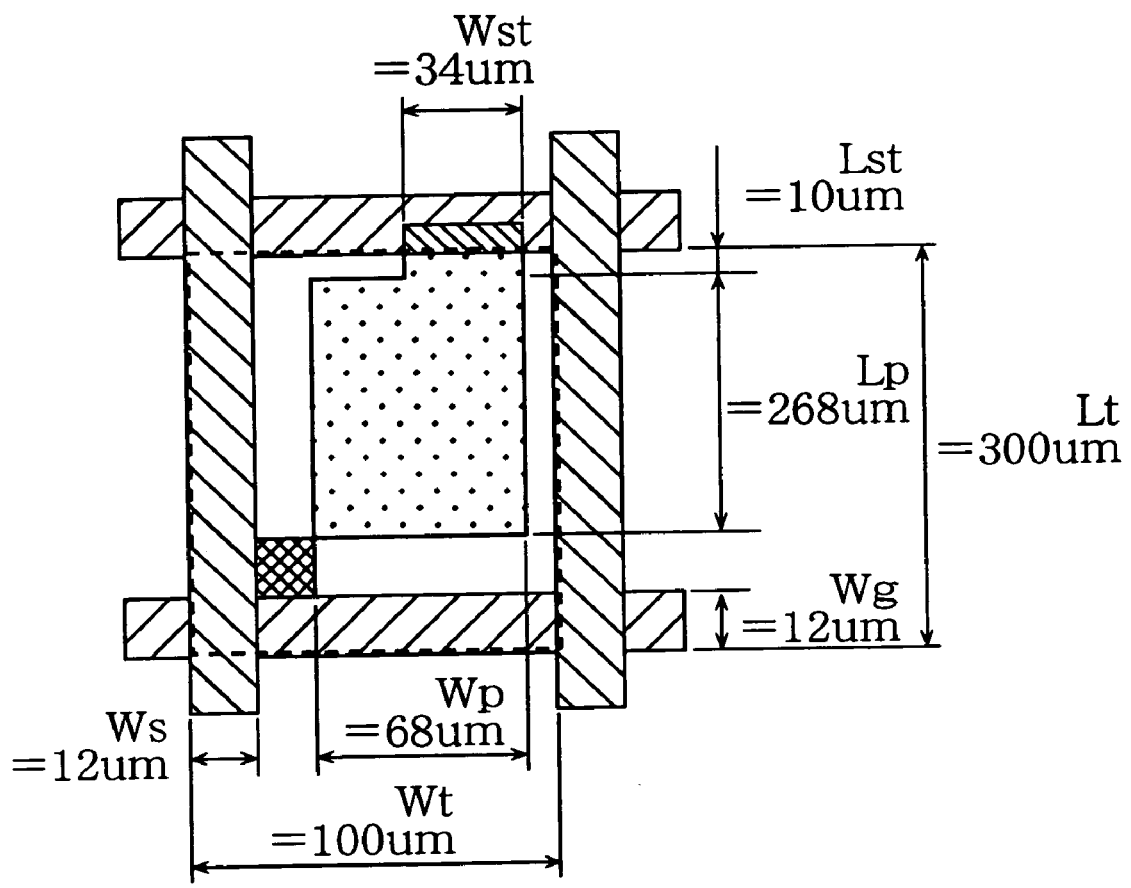
FIG. 26 is a diagram illustrating dimensions of the picture element of the embodiment above.

FIG. 26 shows one example of dimensions per picture element. Wt denotes the width of the picture element. Lt denotes the length of the picture element. Wp denotes the width of the pixel electrode. Lp denotes the length of the pixel electrode. Ws denotes the width of the source line. Wg is the width of the gate line. Wst is a lengthwise side of the storage capacity part. Lst is a gap between the pixel electrode and the gate line. The total area per picture element is 30,000 [$\mu m^2$] and the area of the pixel electrode is 18,564 $\mu m^2$ which is 61.9% of the total area of one picture element.

Figure 27:
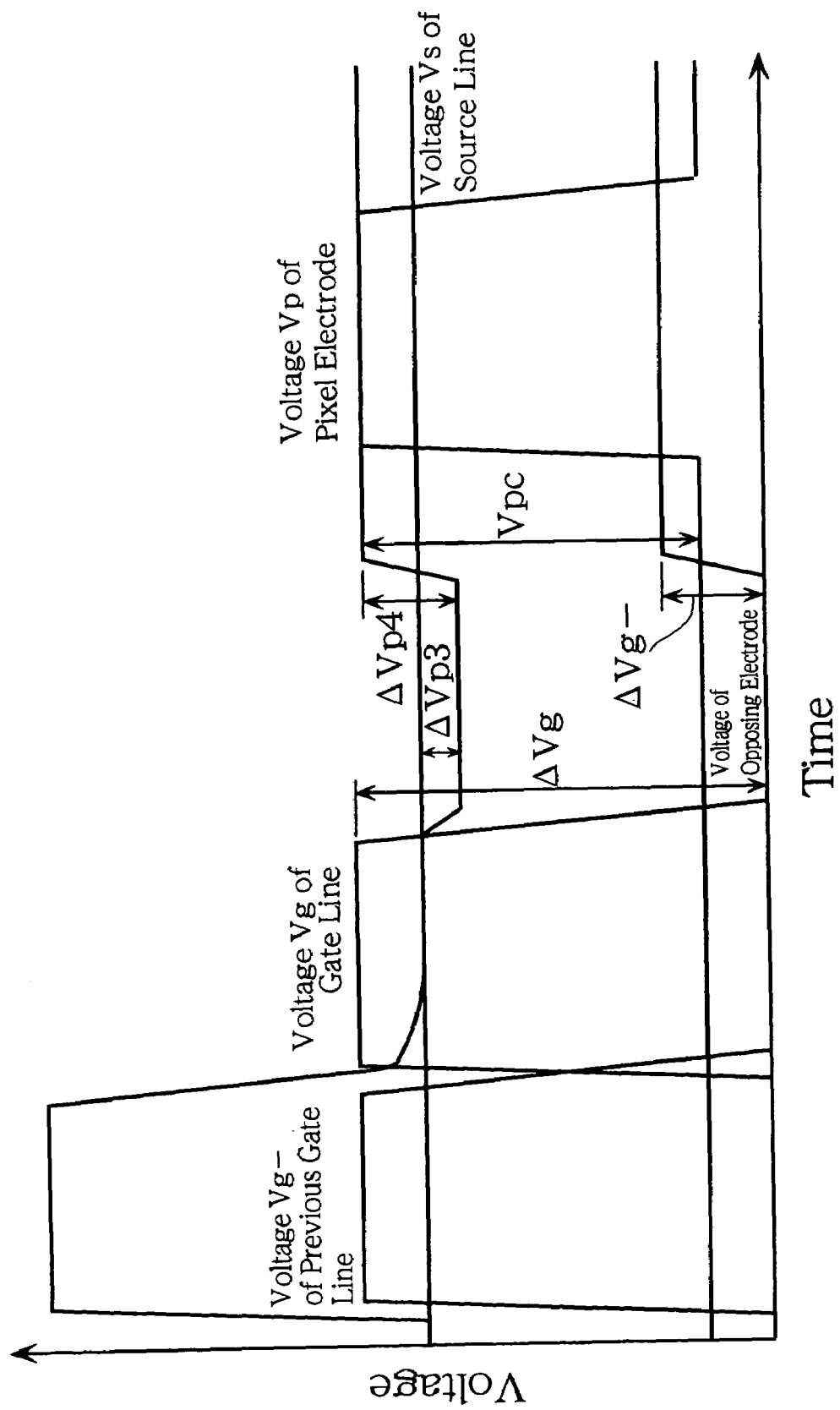
FIG. 27 is a diagram illustrating the operation of Embodiment 2-4.

Referring to FIGS. 24, 25 and 26, there is shown the gate line's potential difference variation using mode as the fourth embodiment in which the primary potential difference is increased by use of the potential variation of the previous gate line in the second embodiment, and the operation is illustrated in FIG. 27.

In this diagram, Vg denotes the voltage of the gate line. Vs denotes the voltage of the source line 7. Vp denotes the voltage of the pixel electrode. Vg⁻ denotes a voltage of the previous gate line 81. Vc denotes the voltage of the opposing electrode.

In the normal image display, the voltage Vg of the gate line is modulated until the pixel transistor is put in the ON mode, to charge the transparent pixel electrode 21, the storage capacity Cst and the liquid crystal capacity Clc with the voltage Vs of the source line. The voltage Vp of the transparent pixel electrode 21 comes to be equal to the voltage Vs of the source line 7.

When the pixel transistor is put into the OFF mode, the potential Vp of the pixel electrode is varied only by the extent of a punch-through voltage ΔVp3 calculated from the following Equation 2-3 in accordance with the voltage variation ΔVg of the gate line. Further, when the potential Vg⁻ of the previous gate line which forms the electrode of storage capacity during the time during which the pixel transistor is in the OFF mode is varied only by the extent of ΔVg⁻, a punch-through voltage ΔVp4 calculated from the following Equation 2-4 is generated in the pixel electrode. For the signal variation illustrated in FIG. 27, a potential higher than the potential Vs written from the source line can be applied to the pixel electrode by rendering ΔVp4 larger ΔVp3. This allows the potential difference Vpc between the pixel electrode and the opposing electrode to increase further, so that the time required for the transition of the liquid crystal layer into the bend configuration is shortened.

$$\Delta Vp3 = \Delta Vg * Cgd/(Cst+Clc+Cgd) \qquad \text{Eq. 2-3}$$

$$\Delta Vp4 = \Delta Vg^- * Cst/(Cst+Clc+Cgd) \qquad \text{Eq. 2-4}$$

As shown in FIG. 26, the proportion of the area of the pixel electrode to the total area of a single picture element is rather large of 61.9%, so that it is very effective to apply a large potential difference between the pixel electrode and the opposing electrode.

In the liquid crystal panel thus constituted, the potential difference Vpc between Vc and Vp in the normal image display is in the range of 0V to 5V. When a potential difference of not less than 6V is applied between the pixel electrode and the opposing electrode by D.C., in order to cause the transition of the liquid crystal layer to the bend configuration, depending on the structure of the liquid crystal panel or the liquid crystal material, the transition is sometimes partly deadlocked, so that the transition of the liquid crystal elements at that part may not be effected even after the passage of 10 seconds or more. In this condition of panel structure or liquid crystal material, the voltage Vc of the opposing electrode is brought close to the voltage Vs of the pixel electrode, so that the potential difference Vpc applied to the liquid crystal layer is modulated to a secondary small potential difference to return the alignment of the liquid crystal elements to their original state and, then, the primary high potential difference is applied again to the liquid crystal layer. This allows the deadlocked part to easily changed to the bend state by newly applying the potential difference and, accordingly, the transition to the bend configuration can be effected over the whole area of the panel in a short time.

While in this embodiment, the storage capacity is provided between the pixel electrode and the previous gate line, the storage capacity may alternatively be provided between the pixel electrode and the next gate line. This alternation can also produce the equivalent effects in the equivalent operation.

Embodiment 2-5

With reference to the time chart of the potential of the pixel electrode shown in FIG. 28 and the electrical schematic diagram shown in FIG. 13, operation of Embodiment 2-5 will be described.

Figure 28:
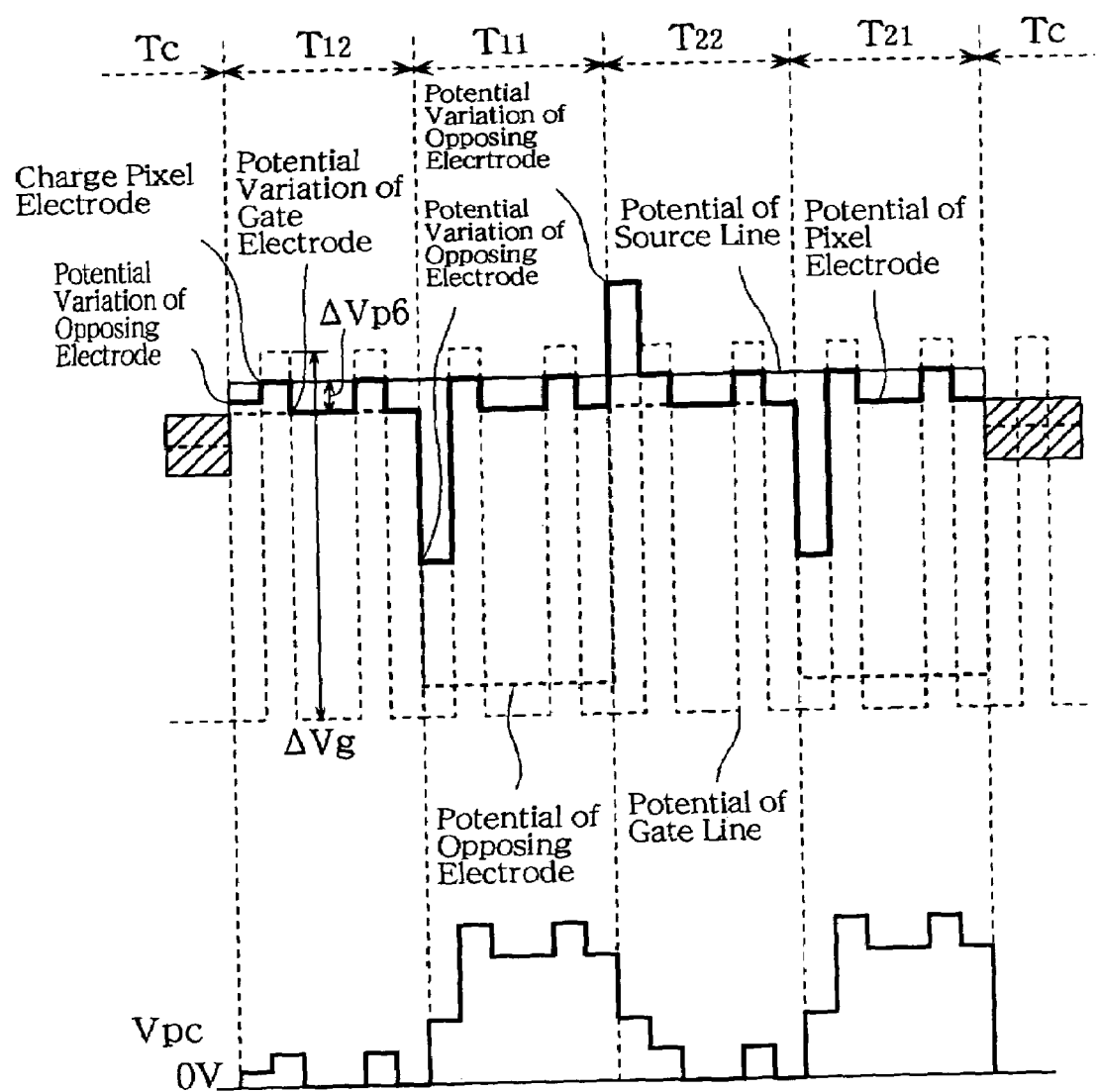
FIG. 28 is a time chart of an electrode potential of the picture element of Embodiment 2-5.

In FIG. 28, the potential of the opposing electrode is depicted by a thick dotted line; the potential of the gate line is depicted by a thin dotted line; the potential of the source line is depicted by a thin solid line; and the potential of the pixel electrode is depicted by a thick solid line. Vpc at the bottom of the diagram denotes variation of potential difference between the pixel electrode and the opposing electrode. Tc denotes a normal image display period. $T_{12}$ denotes a first secondary potential difference application step. $T_{11}$ denotes a first primary potential difference application step. $T_{22}$ denotes a second secondary potential difference application step. $T_{21}$ denotes a second primary potential difference application step. Variation factors of various potentials of the pixel electrode are shown herein.

In this diagram, the steps of $T_{12}$, $T_{11}$, $T_{22}$, and $T_{21}$ are repeated in the repeat control step. When the first secondary potential difference application step $T_{12}$ starts in the first driving period for effecting the transition of liquid crystal layer to the bend configuration, the potential of the opposing electrode is modulated to a second potential, different from that in the normal image display period. The potential of the pixel electrode comes into connection with the opposing electrode through the liquid crystal capacity. At this moment, the pixel transistor is in the OFF mode and no current is supplied thereto. Accordingly, the potential varies only by the extent of ΔVp5 shown in the following Eq. (2-5) with respect to the variation of ΔVcom in the potential of the opposing electrode in the direction in which the potential of the opposing electrode varied, as illustrated at the left side of the period of $T_{12}$ when viewed in the diagram.

$$\Delta Vp5 = \Delta Vcom * Clc/(Clc+Cst+Cgd) \quad \text{(Eq. 2-5)}$$

The potential variation by which the potential variation ΔVg has an influence on the pixel electrode when the gate line switches the pixel transistor from ON to OFF is given as ΔVp6 shown in the following Eq. (2-6).

When the potential of the source line is modulated to be equal to the potential of the opposing electrode increased by ΔVp6 and then the pixel transistor is switched to OFF, the potential of the pixel electrode lowers by the extent of ΔVp6, as illustrated potential variation of the gate electrode in the period $T_{12}$ at the center thereof, so that the potential difference between the pixel electrode and the opposing electrode becomes the secondary potential difference of substantially zero.

$$\Delta Vp6 = \Delta Vg * Cgd/(Clc+Cst+Cgd) \quad \text{(Eq. 2-6)}$$

Subsequently, the secondary potential difference of substantially zero in potential difference between the potential of the pixel electrode and the potential of the opposing electrode is produced in the first secondary potential difference application step $T_{12}$, except during the charging sub-step during which the pixel transistor is in the ON mode to charge the pixel electrode with the potential of the source line.

After the shift from the first secondary potential difference application step $T_{12}$ to the first primary potential difference application step $T_{11}$ takes place, the potential of the opposing electrode is modulated to the first potential, in order to modulate the potential difference between the potential of the pixel electrode and the potential of the opposing electrode to the primary potential difference. Under the influence of this, the potential of the pixel electrode is varied in the direction in which the potential of the opposing electrode was varied, as illustrated potential variation of the opposing electrode at the left side of the period $T_{11}$. When the potential of the source line is modulated to be equal to the potential of the opposing electrode increased by ΔVp6 and then the pixel transistor is switched to ON/OFF once in the charging sub-step, as is the case with the first secondary potential difference application step $T_{12}$, the potential of the pixel electrode lowers down to a potential generally equal to the potential of the opposing electrode in the secondary potential difference application step. In the primary potential difference application step, however, the potential of the opposing electrode is set so that the potential difference between the potential of the pixel electrode and the potential of the opposing electrode can become the primary potential difference which is enough large for the transition of the liquid crystal layer to the bend configuration to be effected.

Subsequently, during the first primary potential difference application step $T_{11}$, the primary potential difference required for the transition of the liquid crystal layer to the bend configuration to be effected is being applied to the potential difference between the pixel electrode and the potential of the opposing electrode.

When the second secondary potential difference application step $T_{22}$ starts, the potential of the opposing electrode varies, under the influence of which the potential of the pixel electrode is varied in the direction in which the potential of the opposing electrode was varied, as illustrated potential variation of the opposing electrode at the left side of the period $T_{22}$. When the pixel transistor is switched to ON/OFF once in the charging sub-step, the pixel transistor is put into the ON mode, as is the case with the first secondary potential difference application step $T_{12}$, so that the potential difference between the pixel electrode and the opposing electrode is modulated to the secondary potential difference of substantially zero, except during the pixel electrode being charged with the potential of the source line.

When the shift from the second secondary potential difference application step $T_{22}$ to the second primary potential difference application step $T_{21}$ takes place, the primary potential difference large enough for the transition of the liquid crystal layer to the bend configuration to be effected is applied to the potential difference between the pixel electrode and the opposing electrode, as is the case with the first primary potential difference application step.

Subsequently, in the repeat control step, the secondary potential difference application step and the primary potential difference application step are alternately taken until the completion of the transition of the liquid crystal layer into the bend configuration. In the secondary potential difference application step, the potential difference between the pixel electrode and the opposing electrode is modulated to the secondary potential difference of substantially zero, except in the period from after the start of the period till the first pixel transistor being turned on and in the period in which the pixel transistor is in the on mode in the charging sub-step. In the primary potential difference application step, the primary potential difference large enough for the transition of the liquid crystal layer into the bend configuration to be effected is applied between the pixel electrode and the opposing electrode, except in the period from after the start of the period till the pixel transistor being first turned on.

Thus, the transition of the liquid crystal layer to the bend configuration can be effected over whole area of the panel at high speed by alternately controlling the primary potential difference application step in which the potential difference between the pixel electrode and the opposing electrode is increased to generate the nucleus for the bend configuration and enlarge the bend area and the secondary potential difference application step in which the potential difference between the pixel electrode and the opposing electrode is decreased so that the part of the liquid crystal layer where the nucleus for the bend configuration was not generated or the bend area was not enlarged can be aligned again.

Figure 29:
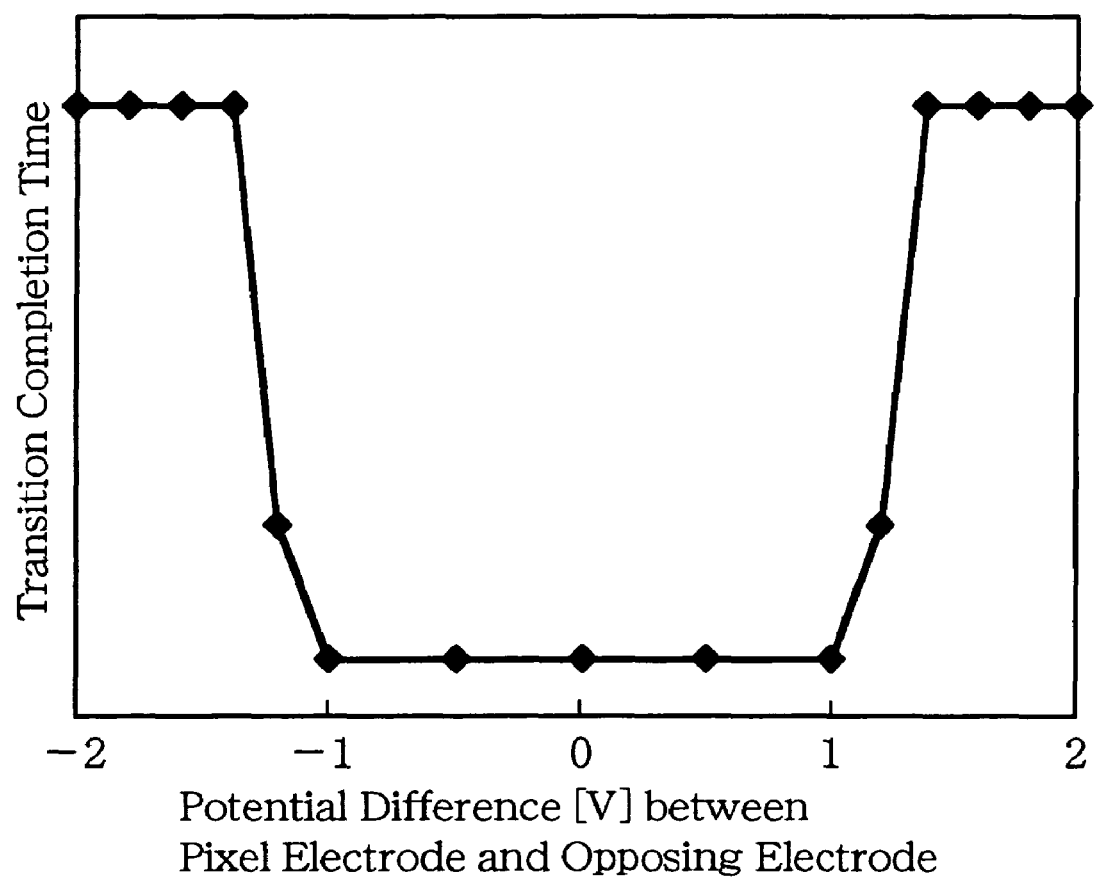
FIG. 29 is a diagram showing a measurement result of the relation between a potential difference and a transition completion time when the potential difference between the pixel electrode and the opposing electrode is modulated.

It is desirable that the secondary potential difference between the pixel electrode and the opposing electrode is substantially zero in the secondary potential difference application step. If it falls within the range of ±1 V, then there is presented little influence on the in-plane transition completion time, as shown in FIG. 29. There are variations in storage capacity Cst, liquid crystal capacity Clc and gate-drain capacity Cgd in the interior of the panel as well as between the panels, depending on their thickness and material. Because of this, variation can be caused in the potential variation of $\Delta$Vp6 in the pixel electrode which is affected by the potential variation of the gate line. However, when the variation falls within the range of ±1 V, the potential of the source line in the secondary potential difference application step need not be modulated for each panel and thus the driving method using a fixed potential of the source line can be determined.

Embodiment 2-6

Figure 30:
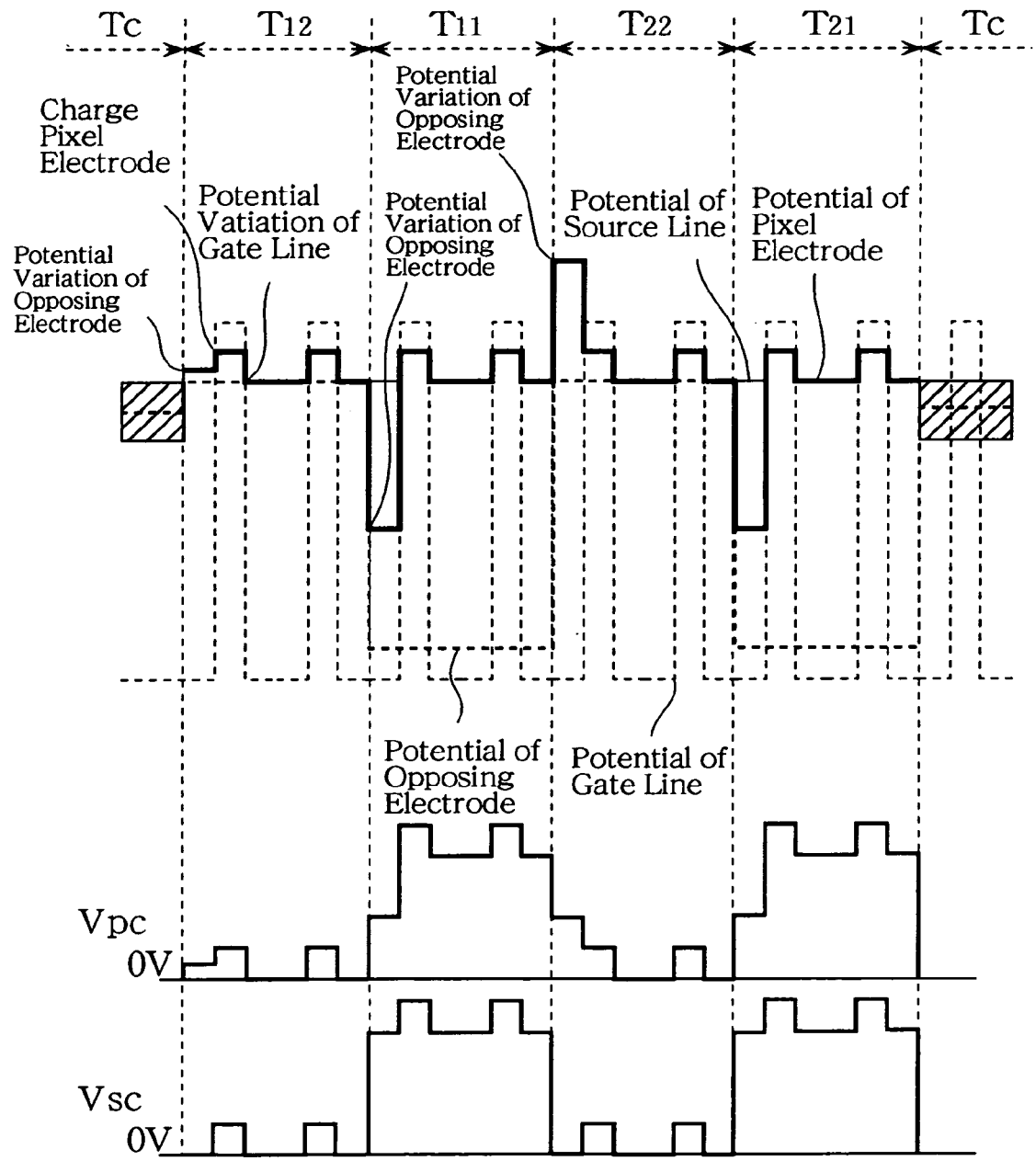
FIG. 30 is a time chart of the electrode potential of the picture element of Embodiment 2-6.

Referring to FIGS. 30 and 13, operation of the sixth embodiment will be described in which the potential of the source line is modulated in accordance with the ON/OFF timing of the pixel transistor in the secondary potential difference application step of the fifth embodiment.

Shown in FIG. 30 is the time chart of the potential of the pixel electrode shown in FIG. 13.

In the diagram, the potential of the opposing electrode is depicted by the thick dotted line; the potential of the gate line is depicted by the thin dotted line; the potential of the source line is depicted by the thin solid line; and the potential of the pixel electrode is depicted by the thick solid line. Vpc at the bottom of the diagram denotes a potential difference between the pixel electrode and the opposing electrode. Vsc denotes a potential difference between the source line and the opposing electrode. Tc denotes the normal image display period. $T_{12}$ denotes the first secondary potential difference application step. $T_{11}$ denotes the first primary potential difference application step. $T_{22}$ denotes the second secondary potential difference application step. $T_{21}$ denotes the second primary potential difference application step. Variation factors of various potentials of the pixel electrode are shown herein.

In this diagram, when the first secondary potential difference application step $T_{12}$ starts in the driving period for effecting the transition of liquid crystal layer to the bend configuration, the potential of the opposing electrode is modulated to the second potential, different from that in the normal image display period. The potential of the pixel electrode varies only by the extent of $\Delta$Vp5 shown in the Eq. (2-5) with respect to the variation of $\Delta$Vcom in the potential of the opposing electrode in the direction in which the potential of the opposing electrode varied, as illustrated potential variation of the opposing electrode. When the potential of the source line is modulated to be equal to the potential of the opposing electrode increased by $\Delta$Vp6 and then the pixel transistor is once switched to ON/OFF in the charging sub-step, the potential of the pixel electrode lowers by the extent of $\Delta$Vp6, as shown by the potential variation of the gate electrode, so that the potential difference between the pixel electrode and the opposing electrode becomes the secondary potential difference of substantially zero. While the pixel transistor is in the OFF mode, the potential of the source line is set at a potential substantially equal to the potential of the opposing electrode and is varied in accordance with the ON/OFF timing of the pixel transistor in the charging sub-step, like Vsc.

Subsequently, in the first secondary potential difference application step $T_{12}$, the pixel transistor is switched ON and OFF at the same timing as the normal image display period, in each time of which the potential of the source line is varied, so that when the pixel transistor is in the OFF mode, the potential differences between the potential of the pixel electrode and the potential of the opposing electrode and between the potential of the pixel electrode and the potential of the source line become the secondary potential difference of substantially zero.

If the potential difference between the potential of the source line and the potential of the opposing electrode falls within the range of ±1 V when the pixel transistor is in the OFF mode, then there is no difference in the in-plane transition completion time. This is the same as the case of the fifth embodiment in which if the potential difference between the potential of the pixel electrode and the potential of the opposing electrode falls within ±1 V, then there is presented little influence on the in-plane transition completion time, as mentioned with reference to FIG. 29.

After the shift from the first secondary potential difference application step $T_{12}$ to the first primary potential difference application step $T_{11}$ takes place, the potential of the opposing electrode is modulated to the first potential, in order to modulate the potential difference between the pixel electrode and the opposing electrode to the primary potential difference. Under the influence of this, the potential of the pixel electrode is varied only by the extent of $\Delta$Vp5 in the direction in which the potential of the opposing electrode varied, as the potential variation of the opposing electrode shown at the left side of the period $T_{11}$ in the diagram. When the potential of the source line is modulated to be equal to the potential of the opposing electrode increased by $\Delta$Vp6 and then the pixel transistor is switched to ON/OFF once in the charging sub-step, as is the case with the first secondary potential difference application step $T_{12}$, the potential of the pixel electrode becomes generally equal to the potential of the opposing electrode in the secondary potential difference application step.

In this primary potential difference application step as well, the potential of the source line is varied at the ON/OFF timing of the pixel transistor. In the primary potential difference application step, the potential differences between the pixel electrode and the opposing electrode and between the source line and the opposing electrode are substantially equal to the potential difference between the potential of the opposing electrode in the secondary potential difference application step and the potential of the opposing electrode in the primary potential difference application step. Consequently, the potential of the opposing electrode in each period is so set that the potential difference between the potential of the opposing electrode in the primary potential difference application step and the potential of the opposing electrode in the secondary potential application step can be modulated to the primary potential difference required for the transition of the liquid crystal layer.

When the second secondary potential difference application step $T_{22}$ starts, the potential of the opposing electrode varies, under the influence of which the potential of the pixel electrode is varied in the direction in which the potential of the opposing electrode was varied, as illustrated potential variation of the opposing electrode at the left side of the period $T_{22}$. The sequent charging operation effected by the pixel transistor causes the potential of the pixel electrode to vary in the same fashion as in the first secondary potential difference application step, so that the potential of the pixel electrode becomes substantially equal to the potential of the opposing electrode.

When the shift from the second secondary potential difference application step $T_{22}$ to the second primary potential difference application step $T_{21}$ takes place, the potential of the opposing electrode varies in the same fashion as in the first primary potential difference application step. In this period as well, the primary potential difference which is the same as that in the first primary potential difference application step $T_{11}$ is applied between the pixel electrode and the opposing electrode by the charging operation of the pixel electrode effected by the pixel transistor.

Subsequently, in the repeat control step, the secondary potential difference application step and the primary potential difference application step are alternately taken until the completion of the transition of the liquid crystal layer into the bend configuration. In the secondary potential difference application step, the potential difference between the pixel electrode and the opposing electrode and the potential difference between the source line and the opposing electrode become the secondary potential difference of substantially zero. In the primary potential difference application step, the primary potential difference large enough for the transition of the liquid crystal layer into the bend configuration is applied between the pixel electrode and the opposing electrode.

In this example, in addition to the operation mentioned in the fifth embodiment, the potential difference among the pixel electrode, the source line and the opposing electrode, which form a greater part of the in-plane area, is modulated to be substantially zero in the secondary potential difference application step. Consequently, the transition of the liquid crystal layer into the bend configuration can be further speeded up than in the fifth embodiment, though there is complication to modulate the potential of the source line.

Embodiment 2-7

Figure 31:
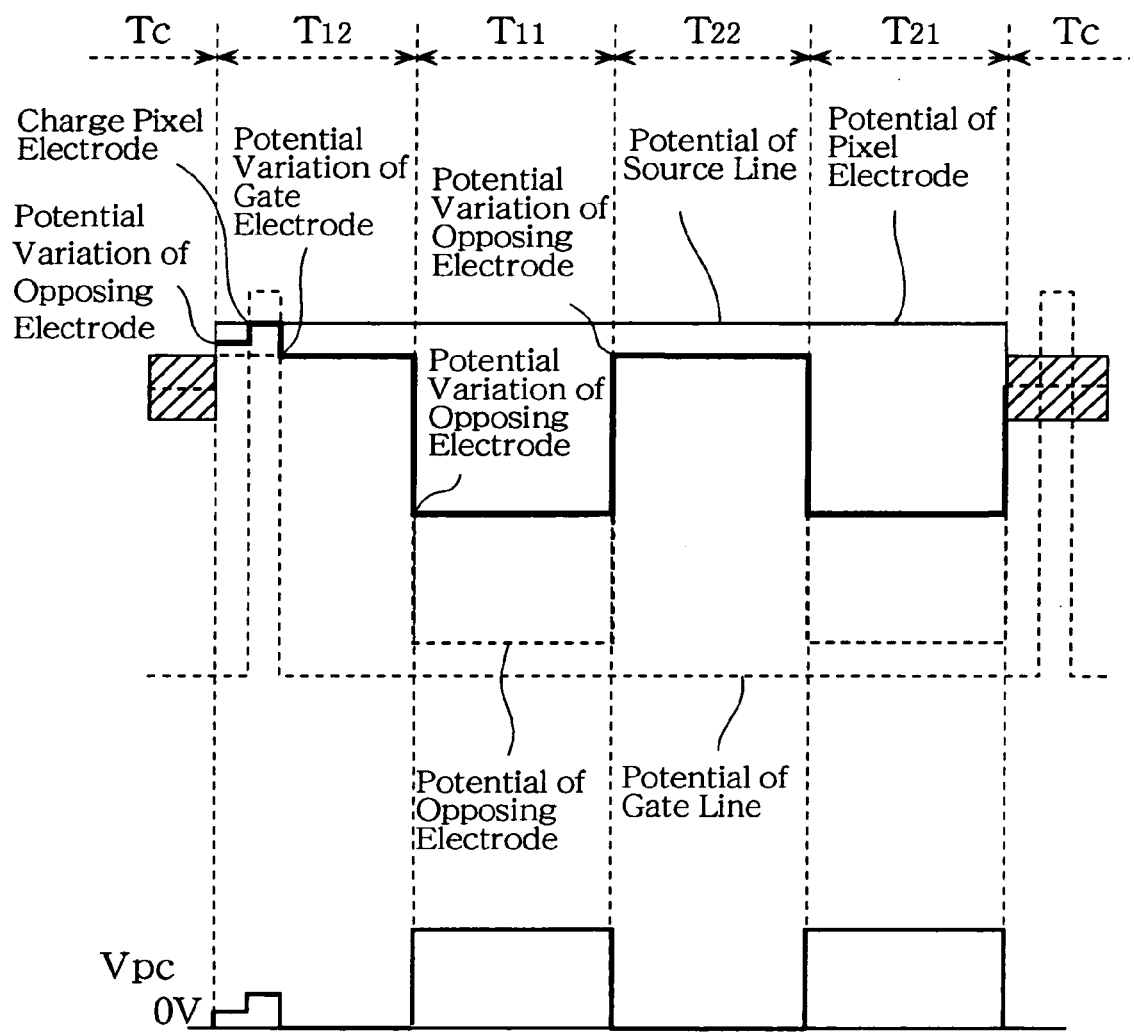
FIG. 31 is a time chart of the electrode potential of the picture element of Embodiment 2-7.

Referring to FIGS. 31 and 13, operation of the Embodiment 2-7 will be described in which the charge of the pixel electrode effected by ON control of the pixel transistor of the fifth embodiment is performed once at an initial stage of the driving period for effecting the transition of the liquid crystal layer to the bend configuration.

Shown in FIG. 31 is the time chart of the potential of the pixel electrode shown in FIG. 13.

In FIG. 31, the potential of the opposing electrode is depicted by the thick dotted line; the potential of the gate line is depicted by the thin dotted line; the potential of the source line is depicted by the thin solid line; and the potential of the pixel electrode is depicted by the thick solid line. Vpc at the bottom of the diagram denotes a potential difference between the pixel electrode and the opposing electrode. Tc denotes the normal image display period. $T_{12}$ denotes the first secondary potential difference application step. $T_{11}$, denotes the first primary potential difference application step. $T_{22}$ denotes the second secondary potential difference application step. $T_{21}$ denotes the second primary potential difference application step. Variation factors of various potentials of the pixel electrode are shown herein.

In this diagram, when the first secondary potential difference application step $T_{12}$ starts in the driving period for effecting the transition of liquid crystal layer to the bend configuration, the potential of the opposing electrode is modulated to the second potential, different from that in the normal image display period. Under the influence of the potential variation of the opposing electrode, the potential of the pixel electrode varies only by the extent of $\Delta Vp5$ in the direction in which the potential of the opposing electrode varied, as illustrated in the potential variation of the opposing electrode in the period $T_{12}$ shown in the diagram. When the potential of the source line is modulated to be equal to the potential of the opposing electrode increased by $\Delta Vp6$ and then the pixel transistor is once switched to ON/OFF, the potential of the pixel electrode lowers only by the extent of $\Delta Vp6$, as shown by the potential variation of the gate electrode, so that it becomes substantially equal to the potential of the opposing electrode. Subsequently, in the first secondary potential difference application step $T_{12}$, the potential of the gate line stays unchanged and the potential difference between the potential of the pixel electrode and the potential of the opposing electrode 1 remains in the secondary potential difference of substantially zero.

After the shift from the first secondary potential difference application step $T_{12}$ to the first primary potential difference application step $T_{12}$ takes place, the potential of the opposing electrode is modulated to the first potential, in order to modulate the potential difference between the pixel electrode and the opposing electrode to the primary potential difference. Under the influence of this, the potential of the pixel electrode is varied only by the extent of $\Delta Vp5$ in the direction in which the potential of the opposing electrode varied, as the potential variation of the opposing electrode shown at the left side of the period $T_{12}$ in the diagram. Even when the shift to the primary potential difference application step takes place, since the charge of the pixel electrode effected by ON control of the pixel transistor is not performed, the potential of the pixel electrode keeps the potential affected by the potential variation of the opposing electrode. Thus, the potential of the opposing electrode is set so that the potential difference between the pixel electrode and the opposing electrode can be modulated to the primary potential difference which is large enough for the transition of the liquid crystal layer to the bend configuration to be effected.

When the second secondary potential difference application step $T_{22}$ starts, the potential of the opposing electrode is modulated to the second potential. Under the influence of this, the potential of the pixel electrode is varied in the direction in which the potential of the opposing electrode was varied, as illustrated potential variation of the opposing electrode at the shifting part from the period $T_{12}$ to the period $T_{22}$. The potential of the pixel electrode is then equal to the potential of the pixel electrode in the potential variation of the gate electrode in the first secondary potential difference application step $T_{12}$, so that the potential difference between the potential of the pixel electrode and the potential of the opposing electrode becomes the secondary potential difference of substantially zero.

When the shift from the second secondary potential difference application step $T_{22}$ to the second primary potential difference application step $T_{21}$ takes place, the potential of the opposing electrode is modulated to the first potential in the same fashion as in the first primary potential difference application step. In this period as well, the charge of the pixel electrode is not performed. Consequently, the primary potential difference which is the same as that in the first primary potential difference application step is applied between the pixel electrode and the opposing electrode.

Subsequently, in the repeat control step, the secondary potential difference application step and the primary potential difference application step are alternately taken until the completion of the transition of the liquid crystal layer into the bend configuration. In the secondary potential difference application step, the potential difference between the pixel electrode and the opposing electrode becomes the secondary potential difference of substantially zero. In the primary potential difference application step, the primary potential difference large enough for the transition of the liquid crystal layer into the bend configuration is applied between the pixel electrode and the opposing electrode.

Although this example involves complication that the ON/OFF timing of the pixel transistor is varied from that in the normal image display period, since the number of charges of the pixel electrode effected by ON control of the pixel transistor in the secondary potential difference application step are reduced, as compared with in the usual timing, the time during which the potential difference between the pixel electrode and the opposing electrode is zero increases in the secondary potential difference application step. Consequently, the transition of the liquid crystal layer into the bend configuration can be further speeded up than in the fifth embodiment.

It should be noted that if the sufficient charge of the pixel electrode is not obtained by the first ON control of the pixel transistor or if the driving period for effecting the transition of the liquid crystal layer to the bend configuration starts asynchronously with respect to the normal image display period, so that the number-of-times margin is required for the reliable ON control of pixel transistor, even when the charge of the pixel electrode effected by the first ON control of the pixel transistor in the driving period for effecting the transition of the liquid crystal layer to the bend configuration is performed two times or more, rather than one time, that would not then have a substantial influence on the effect.

The first ON control of the pixel transistor is performed within a single field period (16.7 msec. in general) after completion of the switching to the drive for effecting the transition of the liquid crystal layer into the bend configuration from the normal image display timing.

Embodiment 2-8

Figure 32:
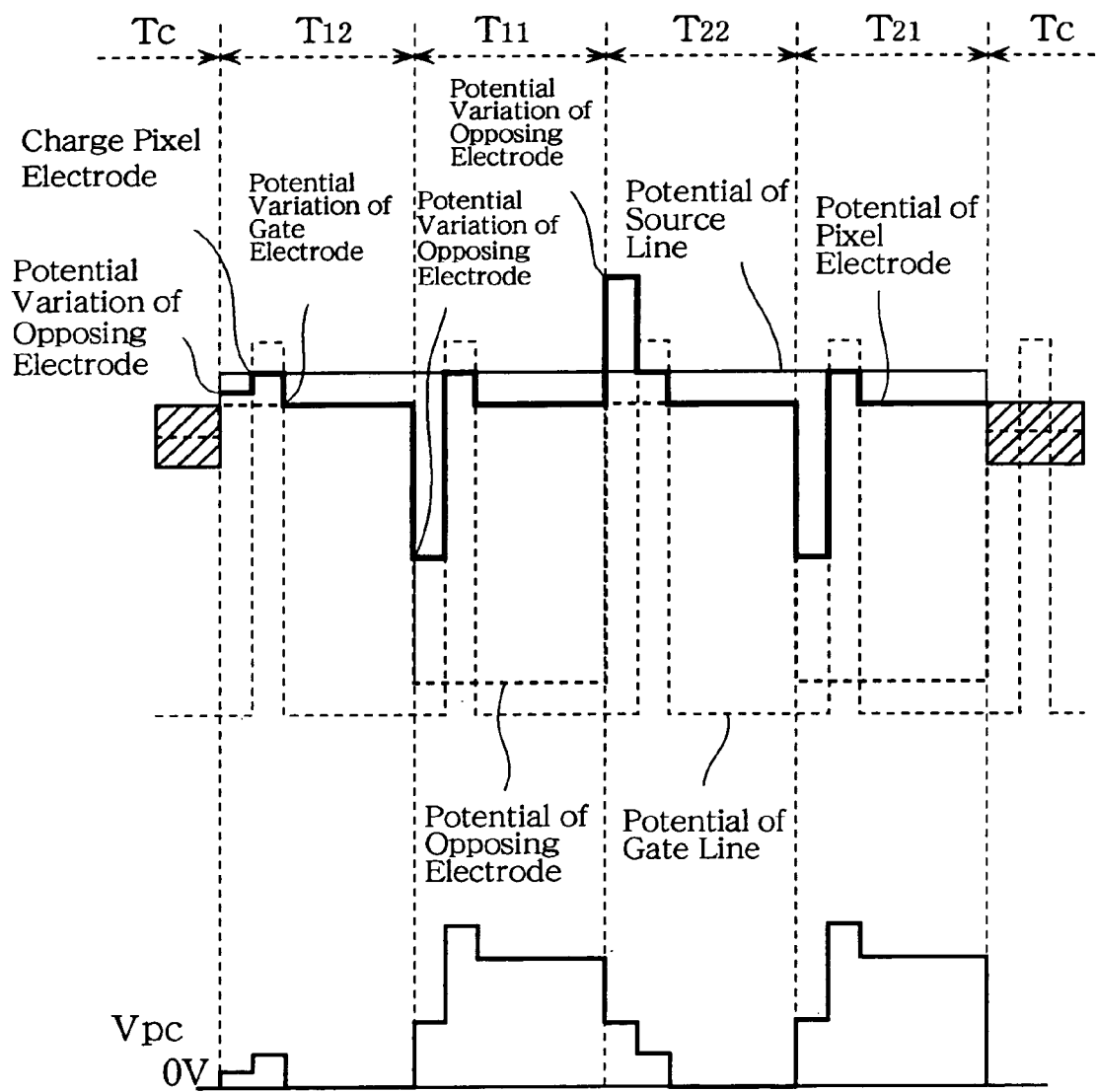
FIG. 32 is a time chart of the electrode potential of the picture element of Embodiment 2-8.

Referring to FIGS. 32 and 13, operation of the eighth embodiment will be described in which the charge of the pixel electrode effected by ON control of the pixel transistor in the charging sub-step of the fifth embodiment is performed once at an initial stage of each of the primary potential difference application step and the secondary potential difference application step within the driving period for effecting the transition of the liquid crystal layer to the bend configuration.

Shown in FIG. 32 is the time chart of the potential of the pixel electrode shown in FIG. 13.

In this diagram, the potential of the opposing electrode is depicted by the thick dotted line; the potential of the gate line is depicted by the thin dotted line; the potential of the source line is depicted by the thin solid line; and the potential of the pixel electrode is depicted by the thick solid line. Vpc at the bottom of the diagram denotes a potential difference between the pixel electrode and the opposing electrode. Tc denotes the normal image display period. $T_{12}$ denotes the first secondary potential difference application step. $T_{11}$ denotes the first primary potential difference application step. $T_{22}$ denotes the second secondary potential difference application step. $T_{21}$ denotes the second primary potential difference application step. Variation factors of various potentials of the pixel electrode are shown herein.

In FIG. 32, when the first secondary potential difference application step $T_{12}$ starts in the driving period for effecting the transition of liquid crystal layer to the bend configuration, the potential of the opposing electrode is modulated to the second potential, different from that in the normal image display period. Under the influence of the potential variation of the opposing electrode, the potential of the pixel electrode varies only by the extent of $\Delta Vp5$ in the direction in which the potential of the opposing electrode varied, as illustrated in the potential variation of the opposing electrode in the period $T_{12}$ at the left side thereof shown in the diagram. When the potential of the source line is modulated to be equal to the potential of the opposing electrode increased by $\Delta Vp6$ and then the pixel transistor is once switched to ON/OFF in the charging sub-step, the potential of the pixel electrode lowers only by the extent of $\Delta Vp6$, as illustrated potential variation of the gate electrode in the period $T_{12}$ at the center thereof, so that it becomes substantially equal to the potential of the opposing electrode. Subsequently, in the first secondary potential difference application step $T_{12}$, the potential of the gate line stays unchanged and the potential difference between the pixel electrode and the opposing electrode remains in the secondary potential difference of substantially zero.

After the shift from the first secondary potential difference application step $T_{12}$ to the first primary potential difference application step $T_{11}$ takes place, the potential of the opposing electrode is modulated to the first potential, in order to modulate the potential difference between the pixel electrode and the opposing electrode to the primary potential difference. Under the influence of this, the potential of the pixel electrode is varied only by the extent of $\Delta Vp5$ in the direction in which the potential of the opposing electrode varied, as the potential variation of the opposing electrode shown at the left side of the period $T_{11}$ in the diagram. When the potential of the source line is modulated to be equal to the potential of the opposing electrode increased by $\Delta Vp6$ and then the pixel transistor is once switched to ON/OFF in the charge sub-step, as is the case of the first secondary potential difference application step $T_{12}$, the potential of the pixel electrode becomes substantially equal to the potential of the opposing electrode in the secondary potential difference application step, as is the case with the potential variation of the gate electrode. Subsequently, in the first primary potential difference application step $T_{11}$, the charge of the pixel electrode effected by the ON control of the pixel transistor is not performed, so that the potential of the pixel electrode stays unchanged.

Thus, in the primary potential difference applying step, the potential difference between the pixel electrode and the opposing electrode is substantially equal to the potential difference between the potential of the opposing electrode in the secondary potential difference application step and the potential of the opposing electrode in the primary potential difference application step. Consequently, the potential of the opposing electrode in each period is set so that the potential difference between the potential of the opposing electrode in the primary potential difference application step and the potential of the opposing electrode in the secondary potential difference application step can be modulated to the potential difference required for the transition of the liquid crystal layer to the bend configuration to be effected.

When the second secondary potential difference application step $T_{22}$ starts, the potential of the opposing electrode is modulated and, under the influence of this, the potential of the pixel electrode is varied in the direction in which the potential of the opposing electrode was varied, as illustrated potential variation of the opposing electrode at the boundary between the period $T_{12}$ and the period $T_{22}$. The potential of the pixel electrode is then modulated to the potential of the pixel electrode in the first secondary potential difference application step through the charging operation of the pixel electrode effected by the sequent ON control of the pixel transistor, so that the potential difference between the potential of the pixel electrode and the potential of the opposing electrode becomes the secondary potential difference of substantially zero.

When the shift from the second secondary potential difference application step $T_{22}$ to the second primary potential difference application step $T_{21}$ takes place, the potential of the opposing electrode is modulated in the same fashion as in the first primary potential difference application step. In this period as well, through the initial ON control of the pixel transistor, the primary potential difference which is the same as that in the first primary potential difference application step is applied between the pixel electrode and the opposing electrode.

Subsequently, in the repeat control step, the secondary potential difference application step and the primary potential difference application step are alternately taken until the completion of the transition of the liquid crystal layer into the bend configuration. In the secondary potential difference application step, the potential difference between the pixel electrode and the opposing electrode becomes the secondary potential difference of substantially zero. In the primary potential difference application step, the primary potential difference large enough for the transition of the liquid crystal layer into the bend configuration is applied to the potential difference between the pixel electrode and the opposing electrode.

In this embodiment, since the pixel electrode is charged with the potential of the source line only once at the initial state of each period, the control of the ON/OFF timing of the pixel transistor is further complicated, as compared with that of the seventh embodiment. However, in the secondary potential difference application step, the pixel transistor is put into the ON mode to diminish the time for the potential difference between the pixel electrode and the opposing electrode not to vanish, while also the potential of the pixel electrode is defined at the initial stage of the each period to eliminate the influence of the potential variation of the opposing electrode. Consequently, the transition of the liquid crystal layer into the bend configuration over the whole area of the panel can be further speeded up than in the fifth and seventh embodiments.

As is the case with the seventh embodiment, if the sufficient charge of the pixel electrode is not obtained by the first ON control of the pixel transistor or if the driving period for effecting the transition of the liquid crystal layer to the bend configuration starts asynchronously with respect to the normal image display period, so that the number-of-times margin is required for the reliable ON control of pixel transistor, even when the charge of the pixel electrode effected by the ON control of the pixel transistor in the initial stage of each period is performed two times or more, rather than one time, that would not then have a substantial influence on the effect.

Embodiment 2-9

Figure 33:
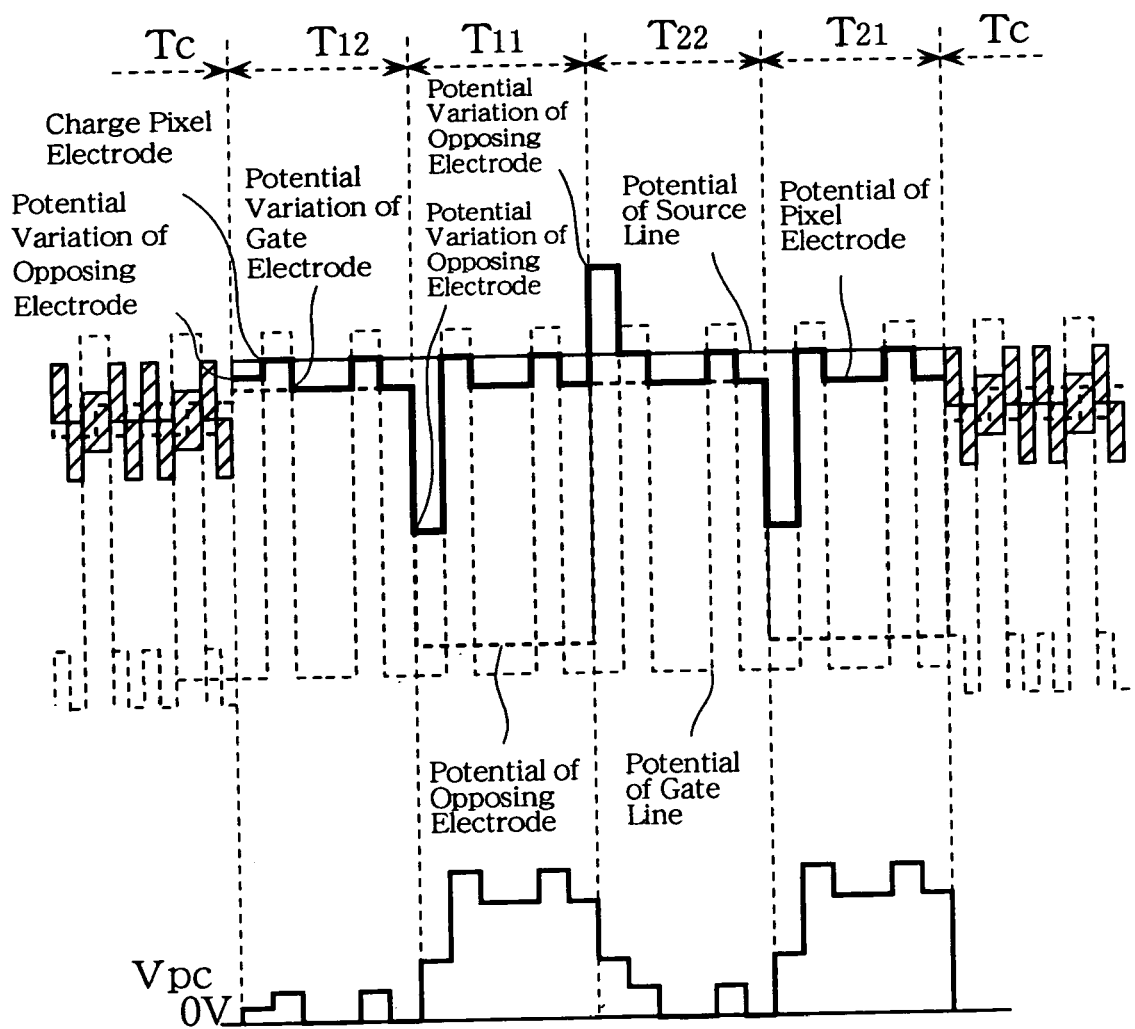
FIG. 33 is a time chart of the electrode potential of the picture element of Embodiment 2-9.

Referring to FIGS. 33 and 24, operation of the ninth embodiment will be described in which the OFF voltage of the gate line is converted into direct current during the driving period for the transition of the liquid crystal layer of the fifth embodiment to the bend configuration to be effected.

Shown in FIG. 33 is the time chart of the potential of the pixel electrode shown in FIG. 24.

In the diagram, the electrical operation timing of the driving period for effecting the transition of the liquid crystal layer to the bend configuration is the same as that in the fifth embodiment. In the liquid crystal panel with the structure of FIG. 24, the storage capacity Cst is formed between the previous gate line 81 and the transparent pixel electrode 21, and the potential of the previous gate line and the potential of the opposing electrode are modulated in the same direction, in order to apply the potential difference across adjoining columns of the picture elements during the normal image display period. This operation is kept all the time when the gate line selects the potential for the pixel transistor to be switched OFF, in other words, the OFF voltage. If this operation is kept in the driving period for the transition of the liquid crystal layer to the bend configuration, then the potential of the pixel electrode is caused to vary by the $\Delta Vp6$ of Eq. (6) by the variation of the OFF voltage of the previous gate line, so that the potential difference of some volts is caused, despite of the potential difference between the pixel electrode and the opposing electrode being desired to be modulated to the secondary potential difference of substantially zero in the secondary potential difference application step, in particular. When the potential difference between the pixel electrode and the opposing electrode exceeds 1 volt in the secondary potential difference application step, the transition completion time is elongated, as shown in FIG. 29.

Accordingly, during the driving period for effecting the transition of the liquid crystal layer to the bend configuration, as shown in FIG. 33, the OFF voltage of the gate line is converted to D.C. (direct current) in the gate line's D.C. converted OFF voltage holding step. This can allow the potential variation of the pixel electrode to be avoided in the secondary potential difference application step, so that the transition of the liquid crystal layer into the bend configuration over the whole area of the panel is speeded up.

Embodiment 2-10

Figure 34:
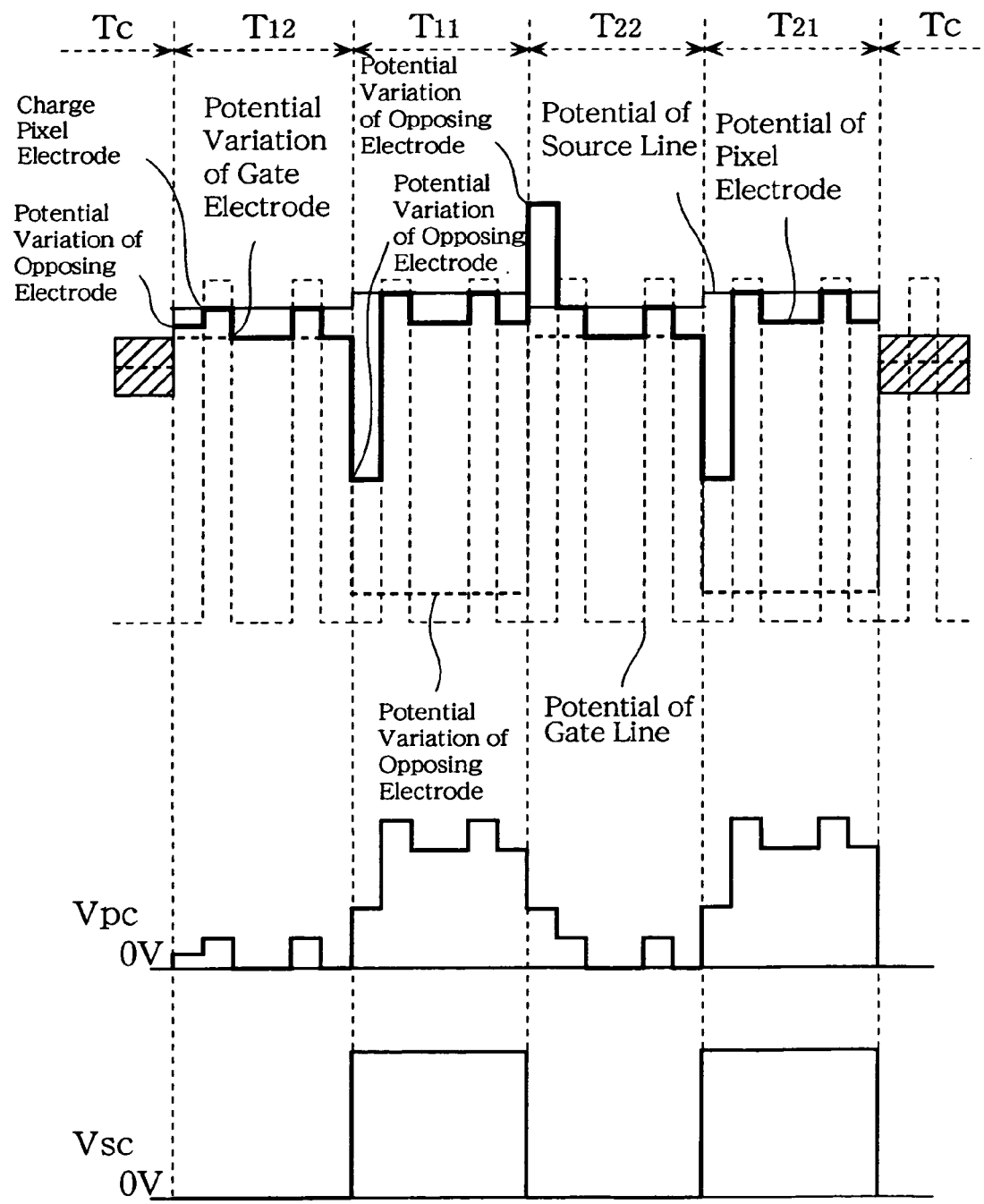
FIG. 34 is a time chart of the electrode potential of the picture element of Embodiment 2-10.

Referring to FIGS. 34 and 13, operation of the tenth embodiment will be described.

Shown in FIG. 34 is the time chart of the potential of the pixel electrode shown in FIG. 13.

In the diagram, the potential of the opposing electrode is depicted by the thick dotted line; the potential of the gate line is depicted by the thin dotted line; the potential of the source line is depicted by the thin solid line; and the potential of the pixel electrode is depicted by the thick solid line. Vpc at the bottom of the diagram denotes a potential difference between the pixel electrode and the opposing electrode. Vsc denotes a potential difference between the source line and the opposing electrode. Tc denotes the normal image display period. $T_{12}$ denotes the first secondary potential difference application step. $T_{11}$ denotes the first primary potential difference application step. $T_{22}$ denotes the second secondary potential difference application step. $T_{21}$ denotes the second primary potential difference application step. Variation factors of various potentials of the pixel electrode are shown herein.

In FIG. 34, when the first secondary potential difference application step $T_{12}$ starts in the driving period for effecting the transition of liquid crystal layer to the bend configuration, the potential of the opposing electrode is modulated to the second potential, different from that in the normal image display period. The potential 4 of the pixel electrode comes into connection with the opposing electrode through the liquid crystal capacity Clc. At this moment, the pixel transistor is in the OFF mode and no current is supplied thereto. Accordingly, the potential varies only by the extent of $\Delta Vp5$ of the Eq. (5) with respect to the variation of $\Delta Vcom$ in the potential of the opposing electrode in the direction in which the opposing electrode varied, as illustrated potential variation of the opposing electrode at the left side of the period of $T_{12}$. When the potential of the source line is modulated to be equal to the potential of the opposing electrode increased by $\Delta Vp6$ and then the pixel transistor is switched to ON/OFF once in the charging sub-step, the potential of the pixel electrode lowers by the extent of $\Delta Vp6$, as illustrated potential variation of the gate electrode in the period $T_{12}$ at the center thereof, so that it comes to be substantially equal to the potential of the opposing electrode.

After the shift from the first secondary potential difference application step $T_{12}$ to the first primary potential difference application step $T_{11}$ takes place, the potential of the opposing electrode is modulated to the first potential, in order to modulate the potential difference between the pixel electrode and the opposing electrode to the primary potential difference. Under the influence of this, the potential of the pixel electrode is varied only by the extent of $\Delta Vp5$ in the direction in which the potential of the opposing electrode was varied, as illustrated potential variation of the opposing electrode at the boundary between the period $T_{11}$ and the period $T_{12}$. When the potential of the source line is modulated to be equal to the potential of the opposing electrode increased by $\Delta Vp6$ and then the pixel transistor is switched to ON/OFF once in the charging sub-step, as is the case with the first secondary potential difference application step $T_{12}$, the potential of the pixel electrode lowers under the influence of the potential variation of the potential of the gate line, as is the case with the potential variation of the gate electrode in the period $T_{11}$.

In the primary potential difference application step, with increased potential difference between the potential of the pixel electrode and the opposing electrode, the transition of the liquid crystal layer to the bend configuration can increasingly be speeded up. Consequently, the potential of the source line is varied in the direction opposite to the direction in which the potential of the opposing electrode is varied from the secondary potential difference application step to the primary potential difference application step. The potential of the opposing electrode is so set that the potential difference between the potential of the opposing electrode and the potential of the pixel electrode can become the primary potential difference required for the transition of the liquid crystal layer to the bend configuration.

When the second secondary potential difference application step $T_{22}$ starts, the potential of the opposing electrode varies. Under the influence of this, the potential of the pixel electrode is varied in the direction in which the potential of the opposing electrode was varied, as illustrated potential variation of the opposing electrode at the boundary between the period $T_{12}$ and the period $T_{22}$. The sequent charging operation of the pixel electrode effected by the ON control of the pixel transistor allows the potential of the pixel electrode to be modulated to the potential of the pixel electrode in the first secondary potential difference application step. As a result of this, the potential difference between the potential of the pixel electrode and the potential of the opposing electrode becomes the secondary potential difference of substantially zero.

When the shift from the second secondary potential difference application step $T_{22}$ to the second primary potential difference application step $T_{21}$ takes place, the potential of the opposing electrode varies in the same fashion as in the first primary potential difference application step. In this period as well, the primary potential difference which is the same as that in the first primary potential difference application step is applied between the pixel electrode and the opposing electrode by the charge of the pixel electrode effected by the ON control of the pixel transistor.

Subsequently, in the repeat control step, the secondary potential difference application step and the primary potential difference application step are alternately taken until the completion of the transition of the liquid crystal layer into the bend configuration. In the secondary potential difference application step, the potential difference between the pixel electrode and the opposing electrode becomes the secondary potential difference of substantially zero, except during the time from the start of the period till the first ON control of the pixel transistor and during the time during which the pixel transistor is put into the ON mode to charge the pixel electrode in the charging sub-step. In the primary potential difference application step, the primary potential difference large enough for the transition of the liquid crystal layer into the bend configuration is applied between the pixel electrode and the opposing electrode, except during the time from the start of the period till the first ON control of the pixel transistor.

The potential of the source line is varied in the secondary potential difference application step as well as in the primary potential difference application step, so that the primary potential difference between the pixel electrode and the opposing electrode is increased in the primary potential difference application step, and as such can allow the transition of the liquid crystal layer to the bend configuration to be speeded up.

Figure 35:
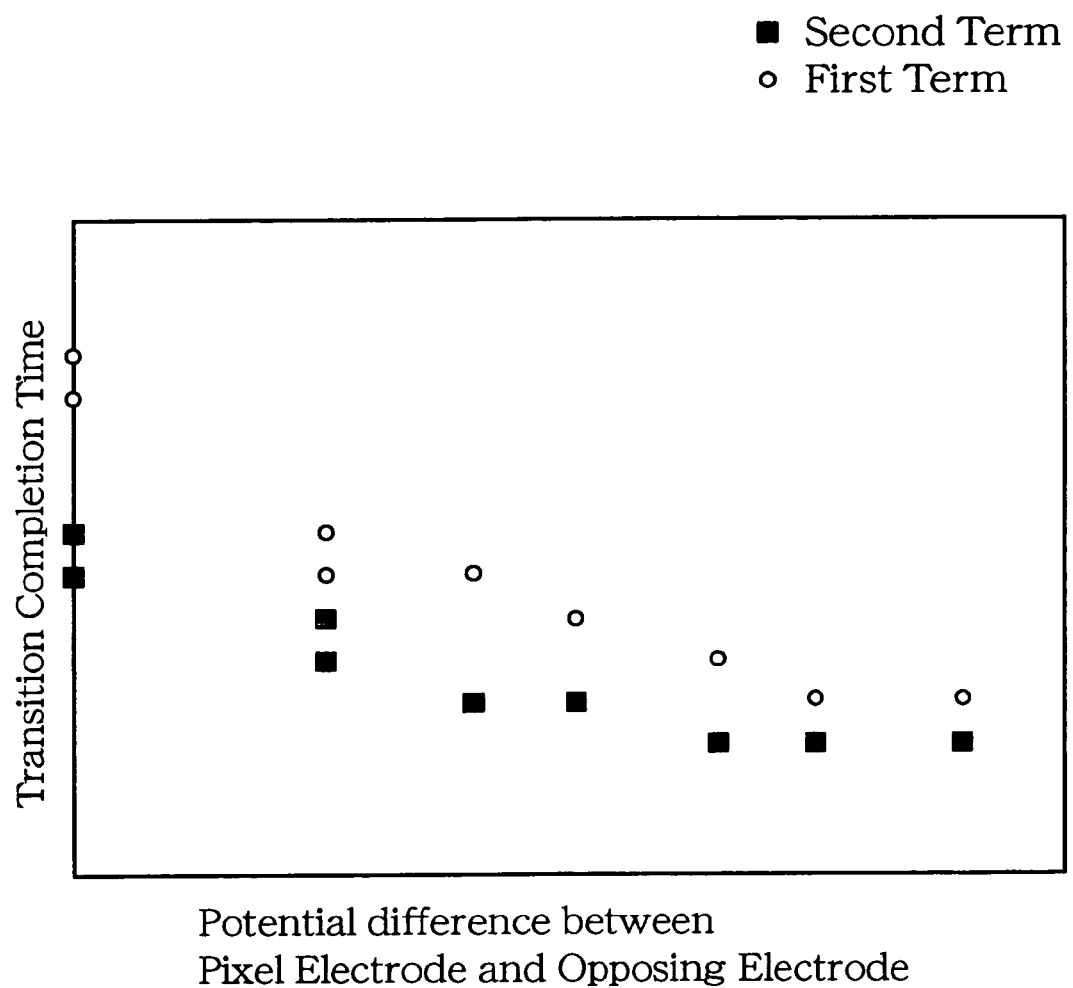
FIG. 35 is a diagram illustrating the measurement values of transition completion time in Embodiment 2-5 to Embodiment 2-11 when the driving time required for the transition of the liquid crystal layer into the bend configuration is measured from the primary potential difference application step and when the driving time is measured from the secondary potential difference application step.

Shown in FIG. 35 is the measurement result of the time required for the completion of the transition which was obtained when the driving period for the transition of the liquid crystal layer to the bend configuration to be effected was initiated from the primary potential difference application step and from the secondary potential difference application step in the fifth embodiment and the sixth embodiment.

The primary potential difference between the pixel electrode and the opposing electrode in the primary potential difference application step is plotted in abscissa. As the potential difference increases, the transition completion time shortens and, in any level of the potential difference, the transition to the bend configuration is completed earlier when the driving period is started from the secondary potential difference application step.

Embodiment 2-11

Figure 36:
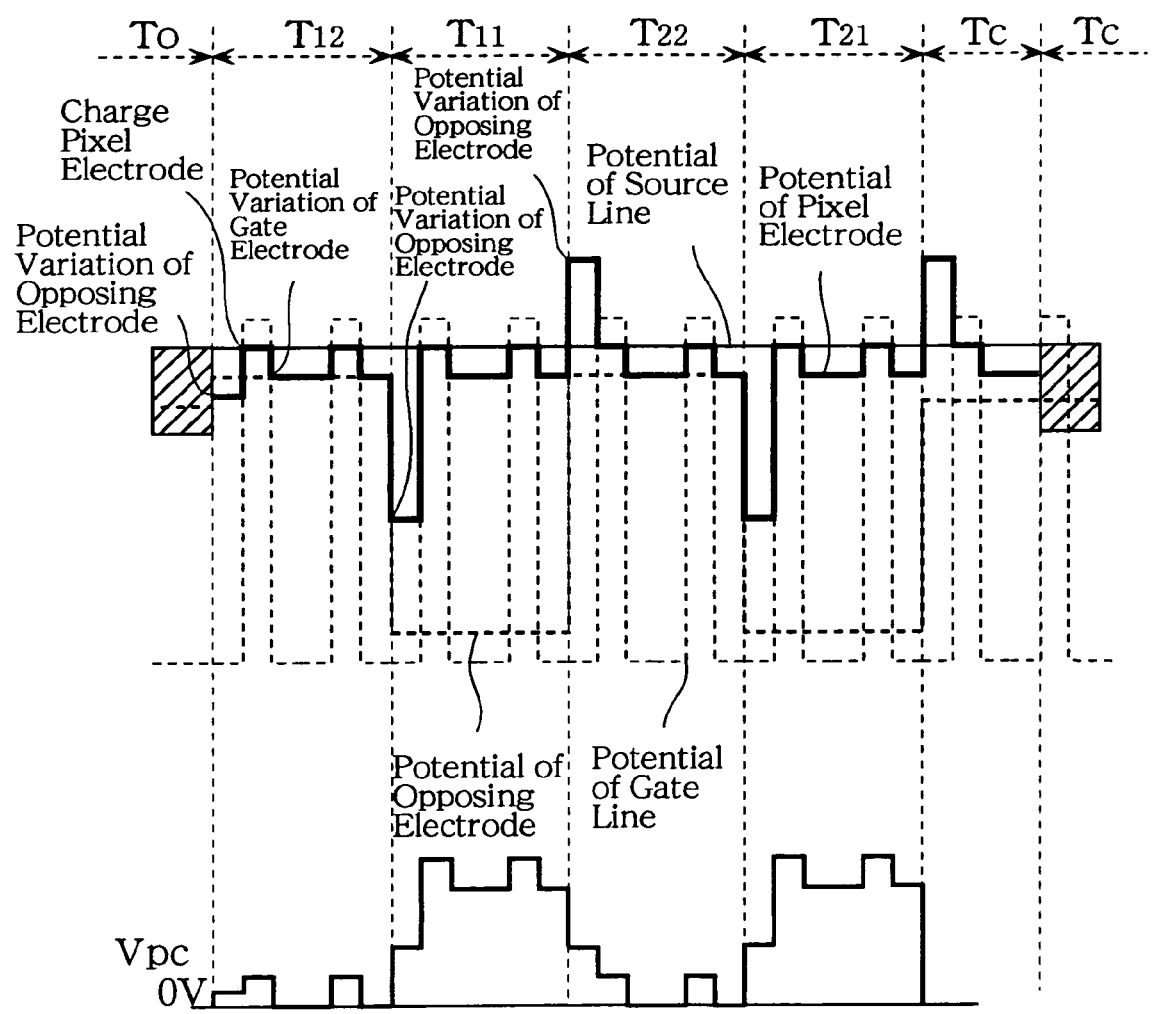
FIG. 36 is a time chart of the electrode potential of the picture element of Embodiment 2-11.

Referring to FIGS. 36 and 13, operation of the 11th embodiment will be described.

In FIG. 36, the potential of the opposing electrode is depicted by the thick dotted line; the potential of the gate line is depicted by the thin dotted line; the potential of the source line is depicted by the thin solid line; and the potential of the pixel electrode is depicted by the thick dotted line. Vpc denotes a potential difference between the pixel electrode and the opposing electrode. Three Tcs denote the normal image display periods, respectively. $T_{12}$ denotes the first secondary potential difference application step. $T_{11}$ denotes the first primary potential difference application step. $T_{22}$ denotes the second secondary potential difference application step. $T_{21}$ denotes the second primary potential difference application step. Variation factors of various potentials of the pixel electrode are shown herein.

In the diagram, when the first secondary potential difference application step $T_{12}$ starts in the driving period for effecting the transition of liquid crystal layer to the bend configuration, the potential of the opposing electrode is modulated to the second potential, different from that in the normal image display period. The potential of the pixel electrode comes into connection with the opposing electrode through the liquid crystal capacity Clc. At this moment, the pixel transistor is in the OFF mode and no current is supplied thereto. Accordingly, the potential varies only by the extent of $\Delta Vp5$ with respect to the variation of $\Delta Vcom$ in the potential of the opposing electrode in the direction in which the potential of the opposing electrode varied, as illustrated at the left side of the period of $T_{12}$. When the potential of the source line is modulated to be equal to the potential of the opposing electrode increased by $\Delta Vp6$ and then the pixel transistor is switched to ON/OFF once in the charging sub-step, the potential of the pixel electrode lowers by the extent of $\Delta Vp6$, as illustrated in the center of the period $T_{12}$, so that it comes to be substantially equal to the potential of the opposing electrode.

Subsequently, in the first secondary potential difference application step, the pixel transistor is put into the ON mode in the charging sub-step, so that the potential difference between the potential of the pixel electrode and the potential of the opposing electrode becomes the secondary potential difference of substantially zero, except in the process in which the pixel electrode is charged with the potential of the source line.

After the shift from the first secondary potential difference application step $T_{12}$ to the first primary potential difference application step $T_{11}$ takes place, the potential of the opposing electrode is modulated to the first potential, in order to modulate the potential difference between the potential of the pixel electrode and the potential of the opposing electrode to the primary potential difference. Under the influence of this, the potential of the pixel electrode is varied only by the extent of $\Delta Vp5$ in the direction in which the potential of the opposing electrode was varied. When the potential of the source line is modulated to be equal to the potential of the opposing electrode increased by $\Delta Vp6$ and then the pixel transistor is switched to ON/OFF once in the charging sub-step, as is the case with the first secondary potential difference application step $T_{12}$, the potential of the pixel electrode lowers down to the potential substantially equal to the potential of the opposing electrode in the secondary potential difference application step under the influence of the potential variation of the potential of the gate line. In the primary potential difference application step, the potential of the opposing electrode is so set that the potential difference between the potential of the pixel electrode and the potential of the opposing electrode can become the primary potential difference of large enough for effecting the transition of the liquid crystal layer to the bend configuration. Subsequently, in the first primary potential difference application step $T_{11}$, the primary potential difference required for effecting the transition of the liquid crystal layer to the bend configuration is applied to the potential difference between the potential of the pixel electrode and the potential of the opposing electrode.

When the second secondary potential difference application step $T_{22}$ starts, the potential of the opposing electrode varies, under the influence of which the potential of the pixel electrode is varied in the direction in which the potential of the opposing electrode was varied, as first illustrated potential variation of the opposing electrode in $T_{22}$. However, when the pixel transistor is switched to ON/OFF once, the potential difference between the pixel electrode and the opposing electrode becomes the secondary potential difference of substantially zero, except in the process in which the pixel transistor is put in the ON mode, so that the pixel electrode is charged with the potential of the source line, as is the case of the first secondary potential difference application step $T_{12}$.

When the shift from the second secondary potential difference application step $T_{22}$ to the second primary potential difference application step $T_{21}$ takes place, the potential of the opposing electrode varies in the same fashion as in the first primary potential difference application step. However, not only when the pixel transistor is put in the ON mode and the pixel electrode is charged with the potential of the source line, but also when the pixel transistor is in the OFF mode, the primary potential difference required for effecting the transition of the liquid crystal layer to the bend configuration is applied to the potential difference between the potential of the pixel electrode and the potential of the opposing electrode.

Subsequently, in the repeat control step, the secondary potential difference application step and the primary potential difference application step are alternately taken until the completion of the transition of the liquid crystal layer. In the secondary potential difference application step, the potential difference between the pixel electrode and the opposing electrode becomes the secondary potential difference of substantially zero, except during the time from the start of the period till the first ON control of the pixel transistor and during the time during which the pixel transistor is put into the ON mode. In the primary potential difference application step, the primary potential difference large enough for the transition of the liquid crystal into the bend configuration is applied between the pixel electrode and the opposing electrode, except during the time from the start of the period till the first ON control of the pixel transistor.

When image information large in potential difference between the pixel electrode and the opposing electrode is displayed (display of black or white, in general) one field in a high-potential-difference-for-transition application step at a point of time when the transition of the liquid crystal layer to the bend configuration is nearly completed and prior to the shift to the normal image display period Tc, enlargement of a bend configuration region of the liquid crystal layer is completed, then moving to the next normal image display period for displaying an intended input image information.

In general, the primary potential difference application step and the secondary potential difference application step often takes at least some fields, or at least some hundreds of milliseconds in terms of time. When an additional primary potential difference application step or an additional secondary potential difference application step is taken for the purpose of completing the transition of the liquid crystal layer to the bend configuration, the transition completion time increases by some hundreds of milliseconds. There is no need to generate any additional bend nuclei. For the case that the transition is completed by simply enlarging the bend region, addition of some tens of milliseconds is just required by displaying the image information large in potential difference between the pixel electrode and the opposing electrode, and as such can allow the transition completion time to be shortened.

Third Inventive Group

This inventive group relates to the control of activating the respective parts at power-on.

In the following, the third inventive group will be described with reference to the embodiment.

Figure 37:
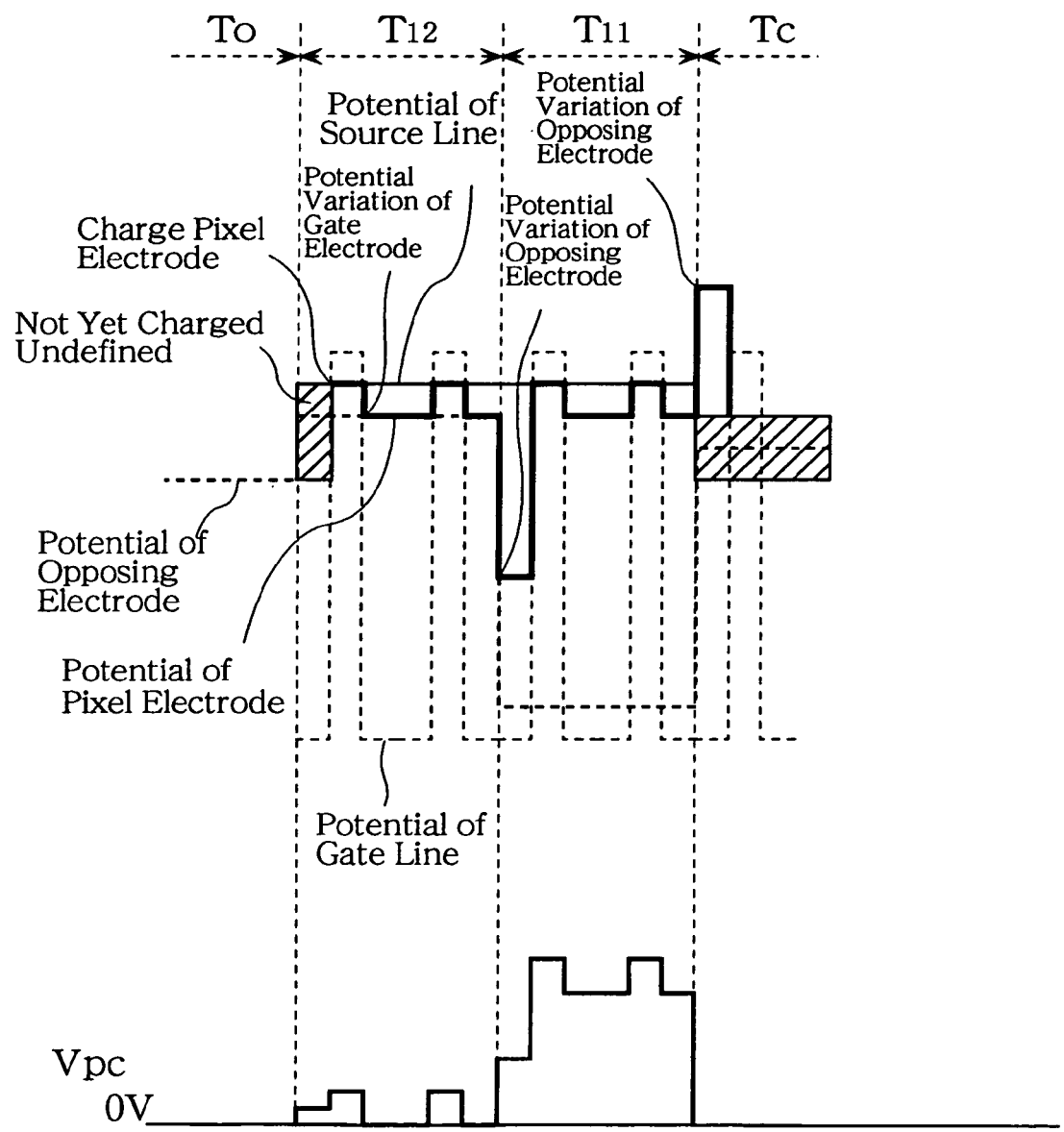
FIG. 37 is a time chart of Embodiment 3-1.
Figure 38:
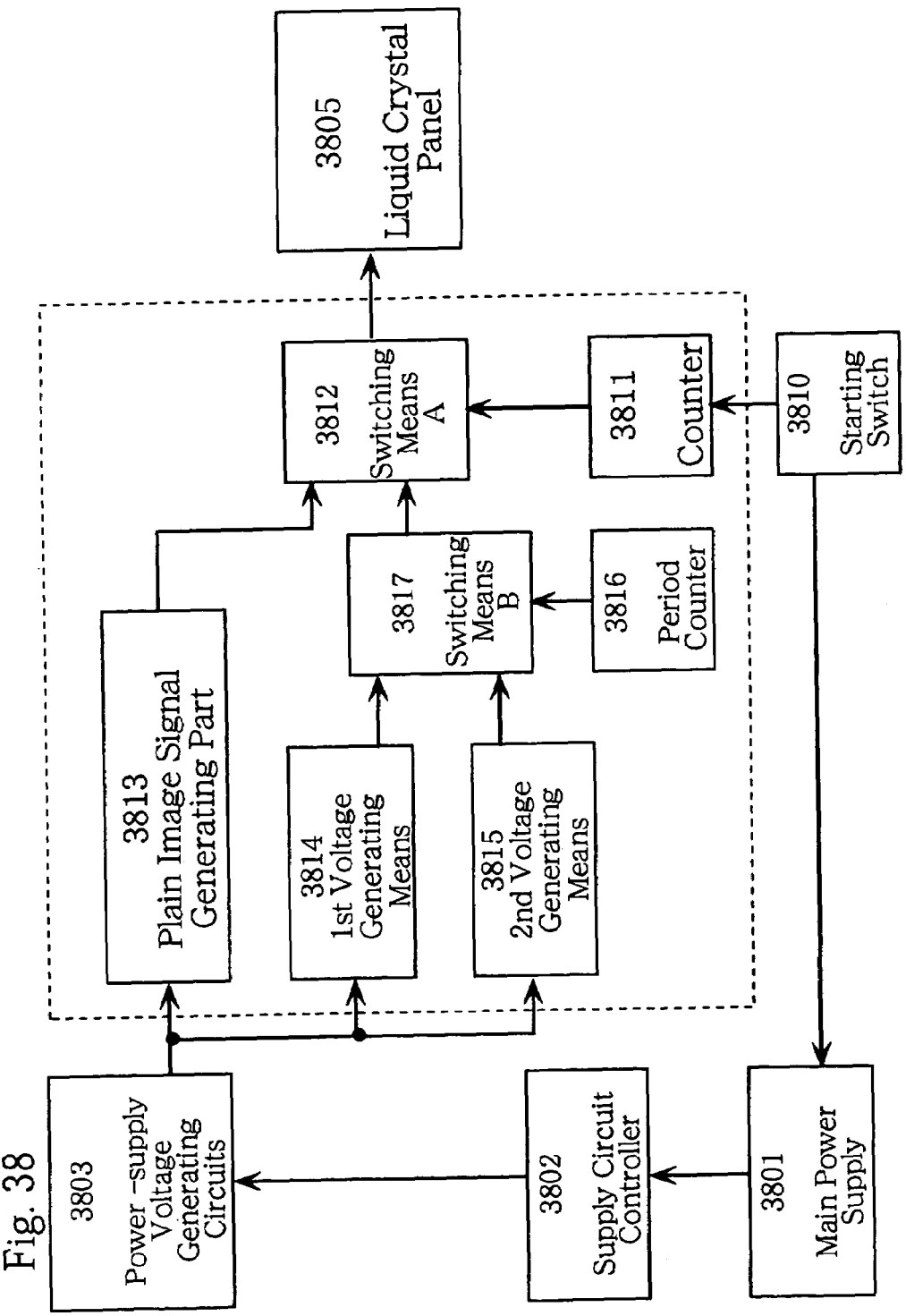
FIG. 38 is a diagram illustrating the circuitry of the embodiment above.

Referring to FIGS. 37 and 38, the embodiment of this inventive will be described below. This inventive group covers one embodiment.

In FIG. 37, Vg denotes the potential of the gate line. Vs denotes the potential of the source line. Vp is the potential of the pixel electrode. Vpc is the potential difference between the pixel electrode and the opposing electrode. To denotes power-off period. $T_{12}$ denotes the first secondary potential difference application step. $T_{11}$ denotes the first primary potential difference application step. Tc is the normal image display period. Variation factors of various potentials of the pixel electrode are shown herein.

In FIG. 38, 3801 denotes a main power supply. 3802 denotes a supply circuit controller, 3803 denotes various power supply voltage generating circuits. 3804 denotes a liquid crystal panel controller, 3805 denotes a liquid crystal panel. A starting switch 3810 is connected to the main power supply 3801 and the liquid crystal panel controller 3804 from outside. The starting switch 3810 is connected to a counter 3811 and in turn to a switching means A 3812 arranged in the interior of the liquid crystal panel controller 3804. After the startup, after the power is supplied to the liquid crystal panel controller 3804, a predetermined time is counted by the counter and, then, picture signals from a normal image signal generating part 3813 are applied to the liquid crystal panel 3805. In the counting of the predetermined time, a switching means B denoted by 3817 switches between a 1st voltage generating means 3814 and a 2nd voltage generating means 3815 in a predetermined period preset by the period counter 3816.

In the circuit of FIG. 38, the signals input to the liquid crystal panel are all undefined in the power-off period To. When the power is turned on by switching on the starting switch 3810, the power is supplied to the power circuit controller 3802 only, first. Then, the controller 3802 controls the various power supply voltage generating circuits in order, to initiate the operations of the liquid crystal panel controller. The circuit constitution having this liquid-crystal-layer-stably-held activating control step can provide the result that immediately after power-on, the signals input to the liquid crystal panel can be converted to the voltage set in the secondary potential difference application step, so that the period for the transition of the liquid crystal layer to the bend configuration is initiated without disarranging the alignment of the liquid crystal layer to which no voltage is applied and, thus, the transition completion time after the power-on is shortened.

When no voltage is applied to the liquid crystal layer, the liquid crystal layer is in the splay configuration, aligning along the rubbing groove of the substrate. When some unintended potential difference is applied thereto, the transition of the liquid crystal elements is initiated in the order from those liable to transition to the bend configuration. In the case where the liquid crystal elements that remain in the splay configuration and those that are going to initiate the transition to the bend configuration are randomly mixed in the in-plane of the liquid crystal panel, even when large potential difference is simultaneously applied to those liquid crystal elements, smooth transition to the bend configuration may not be produced. The embodiment is designed with the aim to prevent generation of the liquid crystal elements that can initiate the transition to the bend configuration when unintended potential difference is applied thereto immediately after the power-on of the liquid crystal device, thereby allowing the liquid crystal elements that are wholly in the splay configuration to initiate the drive for the transition to the bend configuration.

One example of the experimental result obtained by the driving mode of the embodiment is shown in TABLE 1 below.

TABLE 1

| | | State of transition | |
|---|---|---|---|
| Second period [s] | First period [s] | Driving mode of Embodiment | Plain image display period is presented before Second period |
| 0.017 | 1 | x | x |
| 0.17 | 1 | ▲ | x |
| 0.25 | 1 | Δ | ▲ |
| 0.33 | 1 | Δ | Δ |
| 0.5 | 1 | ○ | Δ |
| 0.75 | 1 | ○ | ○ |
| 1 | 1 | ○ | ○ |

The driving mode of the embodiment is intended to cover the driving mode in which the potential of the opposing electrode, the potential of the gate line and the potential of the source line, which are inputted to the liquid crystal panel after the power-on, are all allowed to output voltage to be output in the secondary potential difference application step. On the other hand, in the conventional driving mode in which the normal image display period is presented before the secondary potential difference application step, after the power-on, the power-supply voltage generating circuits are activated without any restriction and, as a result, the same voltages as those in the normal image display period are output to the potential of opposing electrode, the potential of the gate line, and the potential of the source line, before the secondary potential difference application step. When these two modes were examined for observing the state of transition at the completion, with varied time required for the secondary potential difference application step, it was found that the driving mode of the embodiment could complete the transition in a shorter time.

In the embodiments of the second inventive group and the third inventive group, the potential of the source line need not be modulated in the same way in the primary potential difference application step and the secondary potential difference application step. It is permissible that the potential of the source line is modulated in different timing and with different potential for each period.

While the present invention has been described above with reference to the several embodiments, the present invention is not limited to any of them, of course. Modification may be made in the present invention as follows, for example.
1) Instead of the liquid crystal display device, a liquid crystal plasma display, an organic EL, and the like are used as the liquid crystal device;
2) A reflective liquid crystal display device or the so-called ROCB, and the like are used as the liquid crystal display device; and
3) An optical switch, a light logic device and the like are used as the liquid crystal device.

INDUSTRIAL APPLICABILITY

As seen from the description above, according to the present invention, the primary potential difference higher than that in the normal image display period is applied between the pixel electrode and the opposing electrode which occupy a large space in the liquid crystal panel, to thereby produce the nucleus for the transition of the liquid crystal layer to the bend configuration and an enlarged bend region. This enables the transition of the liquid crystal layer to the bend configuration to be caused over the whole area of the panel in a short time, to thereby provide a high-response and wide-viewing-angle liquid crystal panel.

Also, the primary potential difference application step for applying the primary potential difference higher than that in the normal image display period between the pixel electrode and the opposing electrode of the liquid crystal panel and the secondary potential difference application step for applying the secondary potential difference smaller than the primary potential difference between them are alternately arranged, to thereby alternately produce the nucleus for the transition of the liquid crystal layer to the bend configuration and the enlarged bend region, and the re-alignment of the liquid crystal layer. This enables the transition of the liquid crystal layer to the bend configuration to be caused over the whole area of the panel in a short time, to thereby provide a high-response and wide-viewing-angle liquid crystal panel.

Also, the potential of the common electrode forming the storage capacity between the common electrode and the pixel electrode is modulated to vary the potential of the pixel electrode so that the potential difference between the pixel electrode and the opposing electrode can be made further larger than the potential applied from the source line, so as to apply the high potential difference to the liquid crystal layer. This enables the transition of the liquid crystal layer to the bend configuration to be caused over the whole area of the panel in a short time, to thereby provide a high-response and wide-viewing-angle liquid crystal panel.

Also, the potential of the previous gate line forming the storage capacity between the precious gate line and the pixel electrode is modulated to vary the potential of the pixel electrode so that the potential difference between the pixel electrode and the opposing electrode can be made further larger than the potential applied from the source line, so as to apply the high potential difference to the liquid crystal layer. This enables the transition of the liquid crystal layer to the bend configuration to be caused over the whole area of the panel in a short time, to thereby provide a high-response and wide-viewing-angle liquid crystal panel.

Also, allowing for some variation in the potential of the source line that is caused in the pixel electrode when the pixel transistor is turned off, enables the primary potential difference and the secondary potential difference effective for the transition of the liquid crystal layer to the bend configuration to be applied between the pixel electrode and the opposing electrode, without changing the on-off timing of the gate line from that in the normal image display period. This can produce an accelerated transition of the liquid crystal layer to the bend configuration over the whole area of the panel.

Also, when the pixel transistor is in the OFF mode, the potential of the source line is further modulated, with the on-off timing of the gate line kept unchanged from that in the normal image display period, to apply the secondary potential difference effective for the transition of the liquid crystal layer to the bend configuration between the source line and the opposing electrode. This can produce an accelerated transition to the bend configuration over the whole area of the panel.

The charge of the pixel electrode effected by the ON control of the pixel transistor is performed at least once at the initial stage of the driving period for the transition of the liquid crystal layer to the bend configuration. Although this is cumbersome in that the on-off timing of the pixel transistor is changed from that in the normal image display period, since the pixel electrode needs fewer charge in the secondary potential difference application step than usual, the time during which the potential difference between the pixel electrode and the opposing electrode is zero is increased in the secondary potential difference application step. This can produce an accelerated transition to the bend configuration over the whole area of the panel.

Also, the charge of the pixel electrode effected by the ON control of the pixel transistor is performed at least once at the initial stage of each of the primary potential difference application step and the secondary potential difference application step for the transition of the liquid crystal layer to the bend configuration. Although the control of the on-off timing of the pixel transistor is further complicated, since the potential of the pixel electrode is established at the initial stage of the each period, the primary potential difference and the secondary potential difference can be applied without any influence from the potential variation of the opposing electrode. This can produce an accelerated transition to the bend configuration over the whole area of the panel.

The OFF voltage of the gate line is converted into direct current in the driving period for the transition of the liquid crystal layer to the bend configuration, whereby the pixel electrode is prevented from being affected by the potential variation of the gate line particularly in the secondary potential difference application step. This can produce an accelerated transition to the bend configuration over the whole area of the panel.

The potential of the source line is varied between the primary potential difference application step and the secondary potential difference application step so that the potential difference between the pixel electrode and the opposing electrode can be further increased in the primary potential difference application step. This can produce an accelerated transition to the bend configuration over the whole area of the panel.

Image information large in potential difference between the pixel electrode and the opposing electrode is displayed one field at a point of time when the driving period for the transition of the liquid crystal layer to the bend configuration is ended and prior to the shift to the normal image display period. This can allow the transition to the bend configuration to be completed by addition of one field or some tens of milliseconds in terms of time, without any addition of the primary potential difference application step or the secondary potential difference application step for the transition to the bend configuration to spend time as more as some hundreds of milliseconds for completion of the transition. This can shorten the time for completion of the transition to the bend configuration over the whole area of the panel.

The secondary potential difference application step is initiated without disarranging the state of the liquid crystal layer at the time of power-on to an excessive degree from the state before the power-on. This can bring the liquid crystal layer into alignment in a short time, thus accelerating the transition to the bend configuration over the whole area of the panel.

The insulating layer between the gate line electrode and the opposing electrode is reduced in thickness to produce an increased intensity of electric field between the gate line electrode and the opposing electrode. This can produce an increased number of nuclei for the transition of the liquid crystal layer to the bend configuration and an accelerated production of nuclei, and as such can produce accelerated transition of the liquid crystal layer to the bend configuration over the whole area of the panel.

The insulating layer between the gate line electrode and the opposing electrode is reduced in thickness by patterning. This can produce an increased number of nuclei for the transition of the liquid crystal layer to the bend configuration and an accelerated production of nuclei, and as such can produce accelerated transition to the bend configuration over the whole area of the panel.

The gate line electrode is increased in thickness to produce a reduced thickness of the liquid crystal layer on the gate line to thereby produce an increased intensity of the electric field applied to the liquid crystal layer. This can produce an increased number of nuclei for the transition of the liquid crystal layer to the bend configuration and accelerated production of the nuclei, thus producing accelerated transition to the bend configuration over the whole area of the panel.

The source line forming metal is laminated on the gate line forming metal in electric contact therewith, to substantially produce an increased layer thickness of the gate line electrode and a reduced layer thickness of the liquid crystal layer on the gate line. This can produce an increased intensity of the electric field applied to the liquid crystal layer and thus produce accelerated transition to the bend configuration.

The source line forming metal is interposed between the gate line electrode and the opposing electrode to provide electric isolation therebetween, whereby the thickness of the liquid crystal layer on the gate line is reduced. This can produce an increased intensity of the electric field applied to the liquid crystal layer and thus produce accelerated transition to the bend configuration.

The opposing electrode is composed of the first patterned opposing electrode and the second patterned opposing electrode that are electrically isolated from each other. This enables any selected field intensity to be applied to the liquid crystal layer on the gate line electrode, while preventing the pixel electrode and the pixel transistor from being affected by the voltage variation through the capacitive load of the liquid crystal layer and the insulating layer. This can produce an accelerated transition to the bend configuration. In the normal image display period, the first opposing electrode and the second opposing electrode are made to have equal potential, whereby the image quality exactly identical to that of the conventional liquid crystal display device having the non-patterned opposing electrode can be produced.

The opposing electrode confronting the gate line is double-layered, whereby the thickness of the liquid crystal layer on the gate line is reduced to thereby produce an increased intensity of the electric field. This can produce accelerated transition to the bend configuration.

The color filter forming resin is laminated on the second substrate at its portion to confront the gate line electrode on the first substrate, whereby the opposing electrode on that portion is made protuberant to produce a reduced thickness of the liquid crystal layer over the gate line. This can produce an increased electric field intensity of the liquid crystal layer and thus produce accelerated transition to the bend configuration.

The pillar-shaped spacer is formed on the second substrate at its portion to confront the gate line electrode on the first substrate and the opposing electrode is formed between the pillar-shaped spacer and the liquid crystal layer, whereby the liquid crystal layer over the gate line is reduced in thickness. This can produce increased electric field intensity of the liquid crystal layer and thus produce accelerated transition to the bend configuration.

What is claimed is:

1. A method for driving a liquid crystal device to cause transition from a splay configuration to a bend configuration of a liquid crystal layer, located between a first substrate on which thin film transistors, gate lines and pixel electrodes are located in a matrix and a second substrate on which an opposing electrode is located, the method comprising:
    applying a primary potential difference, different from a potential difference in a normal image display period, between the pixel electrode on the first substrate and the opposing electrode on the second substrate;
    applying a secondary potential difference smaller than the primary potential difference; and
    alternately applying a primary potential difference and applying a secondary potential difference at least one time each during a repeatable cycle period, the length of a primary potential difference application period being from at least 50% to no more than 95% of the length of one repeatable cycle period.

2. The method for driving a liquid crystal device according to claim 1, further comprising controlling the time required for switching the potential difference to be no more than 30% of a single repeatable cycle period when the primary potential difference and the secondary potential difference are alternately applied at least one time during said single period.

3. A method for driving a liquid crystal device, wherein applying a primary potential difference according to claim 1 comprises varying a common electrode potential by continuously applying a primary potential difference, wherein storage capacities connected to the pixel electrodes are located between the pixel electrodes and common electrodes having potentials common to all the pixel electrodes, so that, by means of a ratio between pixel electrode capacities including the storage capacities and parasitic capacities between gate lines of the thin-film transistors and the pixel electrodes, potential variation of the pixel electrodes accompanied by potential variation of the common electrodes results in the potential difference.

4. The method for driving a liquid crystal device according to claim 3, varying a common electrode potential comprises making voltage applied to the common electrodes equal to voltage used for gate signals.

5. A method for driving a liquid crystal device, wherein applying a primary potential difference according to claim 1 comprises varying a gate line potential by continuously applying a primary potential difference, wherein storage capacities connected to the pixel electrodes are located between the pixel electrodes and the gate lines one line front or behind, so that, by means of a ratio between pixel electrode capacities including the storage capacities and parasitic capacities between gate lines of the thin-film transistors and the pixel electrodes, potential variation of the pixel electrodes accompanied by potential variation of the gate lines one line front or behind results in the potential difference.

6. A driving circuit of a liquid crystal device to cause transition from a splay configuration to a bend configuration of a liquid crystal layer, located between a first substrate on which thin film transistors, gate lines and pixel electrodes are located in a matrix and a second substrate on which an opposing electrode is located, the driving circuit comprising:
primary potential difference application means for applying a primary potential difference, different from a potential difference in a normal image display period, between the pixel electrode on the first substrate and the opposing electrode on the second substrate;
secondary potential difference application means for applying a secondary potential difference smaller than the primary potential difference; and
repeat control means for alternately executing the primary potential difference application means and the secondary potential difference application means at least one time each during a repeated period, the length of a primary potential difference application period being in the range of from at least 50% to no more than 95% of a length of one repeated period.

7. The driving circuit of the liquid crystal device according to claim 6, further comprising period switching control means for controlling a time required for switching between the potential difference in a primary potential difference application period and the potential difference in a secondary potential difference application period to be no more than 30% of a single period of one repeated period when the primary potential difference and the secondary potential difference are alternately applied in the repeat control means.

8. A driving circuit of a liquid crystal device, wherein the primary potential difference application means according to claim 6 comprises means for varying a common electrode potential by using means for continuously applying a primary potential difference, wherein storage capacities connected to the pixel electrodes are located between the pixel electrodes and common electrodes having potentials common to all the pixel electrodes, so that, by means of a ratio between pixel electrode capacities including the storage capacities and parasitic capacities between gate lines of the thin-film transistors and the pixel electrodes, potential variation of the pixel electrodes accompanied by potential variation of the common electrodes is used to obtain the potential difference.

9. The driving circuit of the liquid crystal device according to claim 8, wherein the means for varying common electrode potential by using means for continuously applying a primary potential difference comprises means for making voltage applied to the common electrodes equal to voltage used for gate signals.

10. A driving circuit of a liquid crystal device, wherein the primary potential difference application means according to claim 6 comprises means for varying a gate line potential by using means for continuously applying a primary potential difference, wherein storage capacities connected to the pixel electrodes are located between the pixel electrodes and the gate lines one line front or behind, so that, by means of a ratio between pixel electrode capacities including the storage capacities and parasitic capacities between gate lines of the thin-film transistors and the pixel electrodes, potential variation of the pixel electrodes accompanied by potential variation of the gate lines one line front or behind results in the potential difference.

11. A method for driving a liquid crystal device to cause transition from a splay configuration to a bend configuration of a liquid crystal layer, located between a first substrate on which thin film transistors, gate lines and pixel electrodes are located in a matrix and a second substrate on which an opposing electrode is located, the method comprising:
applying a primary potential difference, different from a potential difference in a normal image display period, between the pixel electrode and the opposing electrode;
applying a secondary potential difference smaller than the primary potential difference;
alternately executing applying a primary potential difference and applying a secondary potential difference at least one time each; and
applying to source lines a potential in which a pixel electrode potential variation is reflected in an opposing electrode potential, the pixel electrode potential variation being induced by potential variation of the gate lines when the pixel transistor is switched to OFF from ON in applying a secondary potential difference, to charge the pixel electrodes.

12. The method for driving the liquid crystal device according to claim 11, wherein applying a secondary potential difference sets the secondary potential difference within a range of ±1 V.

13. The method for driving the liquid crystal device according to claim 11, wherein applying a secondary potential difference applies a potential equal to a potential of the opposing electrode to the source lines when the pixel transistors are OFF in a period during which the secondary potential difference is applied.

14. The method for driving the liquid crystal device according to claim 11, wherein applying a potential to source lines is performed at least once in an initial stage of a driving period for transition of the liquid crystal layer to the bend configuration.

15. The method for driving the liquid crystal device according to claim 1, wherein applying a potential to source lines is performed at least once in an initial stage of a driving period for transition of the liquid crystal layer to the bend configuration, in an initial stage during which applying a primary potential difference and applying a secondary potential difference are initiated.

16. The method for driving the liquid crystal device according to claim 1, further comprising holding a direct current off-voltage in the gate line.

17. A driving circuit of a liquid crystal device to cause transition from a splay configuration to a bend configuration of a liquid crystal layer, located between a first substrate on which thin film transistors, gate lines and pixel electrodes are located in a matrix and a second substrate on which an opposing electrode is located, the driving circuit comprising:
primary potential difference application means for applying a primary potential difference, different from a potential difference in a normal image display period, between the pixel electrode and the opposing electrode;
secondary potential difference application means for applying a secondary potential difference smaller than the primary potential difference;

repeat control means for alternately operating the primary potential difference application means and the secondary potential difference application means at least one time each; and charging means for applying to source lines a potential in which a pixel electrode potential variation is reflected in an opposing electrode potential, the pixel electrode potential variation being induced by potential variation of the gate lines when the pixel transistor is switched to OFF from ON in a secondary potential difference application period, to charge the pixel electrodes.

18. The driving circuit of the liquid crystal device according to claim 17, wherein the secondary potential difference application means is for applying the secondary potential difference within a range of ±1 V.

19. The driving circuit of the liquid crystal device according to claim 17, wherein the secondary potential difference application means is for applying a potential equal to a potential of the opposing electrode to the source lines when the pixel transistors are OFF in a period during which the secondary potential difference is applied.

20. The driving circuit of the liquid crystal device according to claim 17, further comprising means for operating the charging means at least once in an initial stage of a driving period for transition of the liquid crystal layer to the bend configuration.

21. The driving circuit of the liquid crystal device according to claim 17, further comprising means for operating the charging means at least once in an initial stage of a driving period for transition of the liquid crystal layer to the bend configuration, in an initial stage during which the primary potential difference application means and the secondary potential difference application means are initiated.

22. The driving circuit of the liquid crystal device according to claim 17, further comprising gate line off-voltage direct current holding means for holding a direct current off-voltage in the gate line.

23. A method for driving a liquid crystal device to cause transition from a splay configuration to a bend configuration of a liquid crystal layer, located between a first substrate on which thin film transistors, gate lines and pixel electrodes are located in a matrix and a second substrate on which an opposing electrode is located, the method comprising:

applying a primary potential difference, different from a potential difference in a normal image display period, between the pixel electrode and the opposing electrode;

applying a secondary potential difference smaller than the primary potential difference;

alternately executing applying a primary potential difference and applying a secondary potential difference at least one time each; and applying to source lines a potential in which a pixel electrode potential variation is reflected in the opposing electrode potential, the pixel electrode potential variation being induced by a potential variation of the gate lines when the pixel transistor is switched to OFF from ON while applying a secondary potential difference, to charge the pixel electrodes, wherein the potential of the source lines is modulated to a potential different from a potential difference in a period during which the secondary potential difference is applied so that the primary potential difference can be further increased in a period during which the primary potential difference is applied.

24. The method for driving the liquid crystal device according to claim 23, wherein applying a secondary potential difference applies the secondary potential difference within the range of ±1 V.

25. The method for driving the liquid crystal device according to claim 23, wherein applying a secondary potential difference applies a potential equal to a potential of the opposing electrode to the source lines when the pixel transistors are OFF in a period during which the secondary potential difference is applied.

26. The method for driving the liquid crystal device according to claim 23, comprising applying a potential to source lines at least once in an initial stage of a driving period for transition of the liquid crystal layer to the bend configuration.

27. The method for driving the liquid crystal device according to claim 23, comprising applying a potential to source lines at least once in an initial stage of a driving period for transition of the liquid crystal layer to the bend configuration, in the initial stage of which applying a primary potential difference and applying a secondary potential difference are initiated.

28. The method for driving the liquid crystal device according to claim 23, which comprises holding a direct current off-voltage of the gate line.

29. A driving circuit of a liquid crystal device to cause transition from a splay configuration to a bend configuration of a liquid crystal layer, located between a first substrate on which thin film transistors, gate lines and pixel electrodes are located in a matrix and a second substrate on which an opposing electrode is located, the driving circuit comprising:

primary potential difference application means for applying a primary potential difference, different from a potential difference in a normal image display period, between the pixel electrode and the opposing electrode;

secondary potential difference application means for applying a secondary potential difference smaller than the primary potential difference;

repeat control means for alternately operating the primary potential difference application means and the secondary potential difference application means at least one time each; and charging means for applying to source lines a potential in which a pixel electrode potential variation is reflected in the opposing electrode potential, the pixel electrode potential variation being induced by a potential variation of the gate lines when the pixel transistor is switched to OFF from ON in the secondary potential difference application period, to charge the pixel electrodes, wherein the potential of the source lines is modulated to a potential different from a potential difference in a period during which the secondary potential difference is applied so that the primary potential difference can be further increased in a period during which the primary potential difference is applied.

30. The driving circuit of the liquid crystal device according to claim 29, wherein the secondary potential difference application means is for applying the secondary potential difference within the range of ±1 V.

31. The driving circuit of the liquid crystal device according to claim 29, wherein the secondary potential difference application means is for applying a potential equal to a potential of the opposing electrode to the source lines when the pixel transistors are OFF in the period during which the secondary potential difference is applied.

32. The driving circuit of the liquid crystal device according to claim 29, wherein the charging means is for operating at least once in an initial stage of a driving period for transition of the liquid crystal layer to the bend configuration.

33. The driving circuit of the liquid crystal device according to claim 29, wherein the charging means is for operating at least once in an initial stage of a driving period for transition of the liquid crystal layer to the bend configuration, in an initial stage of which the primary potential difference application means and the secondary potential difference application means are initiated.

34. The driving circuit of the liquid crystal device according to claim 29, which comprises gate line off-voltage direct current holding means for holding a direct current off-voltage of the gate line.

35. A method for driving a liquid crystal device to cause transition from a splay configuration to a bend configuration of a liquid crystal layer, located between a first substrate on which thin film transistors and pixel electrodes are located in a matrix and a second substrate on which an opposing electrode is located, the method comprising:
  applying a primary potential difference, different from a potential difference in a normal image display period, between the pixel electrode on the first substrate and the opposing electrode on the second substrate; and
  applying a secondary potential difference smaller than the primary potential difference;
  alternately controlling applying a primary potential difference and applying a secondary potential difference at least one time each,
  wherein during alternately controlling applying a primary potential difference and applying a secondary potential difference, applying a secondary potential difference is performed first.

36. A driving circuit of a liquid crystal device to cause transition from a splay configuration to a bend configuration of a liquid crystal layer, located between a first substrate on which thin film transistors and pixel electrodes are located in a matrix and a second substrate on which an opposing electrode is located, the driving circuit comprising:
  primary potential difference application means for applying a primary potential difference, different from a potential difference in a normal image display period, between the pixel electrode on the first substrate and the opposing electrode on the second substrate;
  secondary potential difference application means for applying a secondary potential difference smaller than the primary potential difference; and
  repeat control means for allowing the secondary potential difference application means to operate first and allowing the primary potential difference application means and the secondary potential difference application means to alternately operate at least one time each.

37. A method for driving a liquid crystal device to cause transition from a splay configuration to a bend configuration of a liquid crystal layer, located between a first substrate on which thin film transistors and pixel electrodes are located in a matrix and a second substrate on which an opposing electrode is located, the method comprising:
  applying a primary potential difference, different from a potential difference in a normal image display period, between the pixel electrode on the first substrate and the opposing electrode on the second substrate;
  applying a secondary potential difference smaller than the primary potential difference;
  alternately executing applying a primary potential difference and applying a secondary potential difference at least one time each; and
  applying a larger potential difference, of the potential differences applied to the liquid crystal layer in the normal image information display period, to the liquid crystal layer at least one field during a period from after completion of alternate execution of applying a primary potential difference and the applying a secondary potential difference at least one time each until the shift to the normal image information display period is achieved.

38. A driving circuit of a liquid crystal device to cause transition from a splay configuration to a bend configuration of a liquid crystal layer, located between a first substrate on which thin film transistors and pixel electrodes are located in a matrix and a second substrate on which an opposing electrode is located, the driving circuit comprising:
  primary potential difference application means for applying a primary potential difference, different from a potential difference in a normal image display period, between the pixel electrode on the first substrate and the opposing electrode on the second substrate; and
  secondary potential difference application means for applying a secondary potential difference smaller than the primary potential difference;
  means for alternately controlling the primary potential difference application means and the secondary potential difference application means at least one time each, and
  high-potential-difference-for-transition application means for applying a relatively larger potential difference of the potential differences applied to the liquid crystal layer in the normal image information display period, to at least one field of the liquid crystal layer during a period from after completion of alternately executing of said means for applying a primary potential difference and said means for applying a secondary potential difference at least one time each until the shift to the normal image information display period is achieved.

39. A method for driving a liquid crystal device to cause transition from a splay configuration to a bend configuration of a liquid crystal layer, located between a first substrate on which thin film transistors and pixel electrodes are located in a matrix and a second substrate on which an opposing electrode is located, the method comprising:
  applying a primary potential difference, different from a potential difference in a normal image display period, between the pixel electrode on the first substrate and the opposing electrode on the second substrate;
  applying a secondary potential difference smaller than the primary potential difference;
  allowing applying a secondary potential difference application to be initiated first, and alternately operating applying a primary potential difference and applying a secondary potential difference at least one time each, and
  controlling activation of parts of the liquid crystal device in advance, to keep the aligned state of the liquid crystal layer from being disarranged to an excessive degree after power is turned on.

40. A driving circuit of a liquid crystal device to cause transition from a splay configuration to a bend configuration of a liquid crystal layer, located between a first substrate on which thin film transistors and pixel electrodes are located in a matrix and a second substrate on which an opposing electrode is located, the driving circuit comprising:

primary potential difference application means for applying a primary potential difference, different from a potential difference in a normal image display period, between the pixel electrode on the first substrate and the opposing electrode on the second substrate;

secondary potential difference application means for applying a secondary potential difference smaller than the primary potential difference;

repeat control means for allowing the means for secondary potential difference to be initiated first, and alternately operating the means for primary potential difference and the means for secondary potential difference at least one time each, and activation controlling means for controlling activation of parts of the liquid crystal device in advance, to keep an aligned state of the liquid crystal layer from being disarranged to an excessive degree after power is turned on.

41. A method for driving a liquid crystal device to cause transition from a splay configuration to a bend configuration of a liquid crystal layer, located between a first substrate on which thin film transistors and pixel electrodes are located in a matrix and a second substrate on which an opposing electrode is located, the method comprising:

continuously applying a potential difference, different from a potential difference in a normal image display period, between the pixel electrode on the first substrate and the opposing electrode on the second substrate, wherein, storage capacities connected to the pixel electrodes are formed between the pixel electrodes and common electrodes having potentials common to all the pixel electrodes, so that, by means of a ratio between pixel electrode capacities including the storage capacities and parasitic capacities between gate lines of the thin film transistors and the pixel electrodes, potential variation of the pixel electrodes accompanied by potential variation of the common electrodes results in a potential difference.

42. A method for driving a liquid crystal device to cause transition from a splay configuration to a bend configuration of a liquid crystal layer, located between a first substrate on which thin film transistors and pixel electrodes are located in a matrix and a second substrate on which an opposing electrode is located, the method comprising:

continuously applying a potential difference, different from a potential difference in a normal image display period, between the pixel electrode on the first substrate and the opposing electrode on the second substrate, wherein, storage capacities connected to the pixel electrodes are formed between the pixel electrodes and the gate lines one line front or behind, so that, by means of a ratio between pixel electrode capacities including the storage capacities and capacities between parasitic gate lines of the thin-film transistors and the pixel electrodes, potential variation of the pixel electrodes accompanied by potential variation of the gate lines one line front or behind results in the potential difference.

43. A liquid crystal device having a driving circuit to cause transition from a splay configuration to a bend configuration of a liquid crystal layer, located between a first substrate on which thin film transistors and pixel electrodes are located in a matrix and a second substrate on which an opposing electrode is located, to a bend configuration, the liquid crystal device comprising:

different potential continuous application means for continuously applying a potential difference, different from a potential difference in a normal image display period, between the pixel electrode on the first substrate and the opposing electrode on the second substrate, wherein the different potential difference continuous application means comprises means for varying a common electrode potential by using means for continuously applying a different potential difference, wherein storage capacities connected to the pixel electrodes are formed between the pixel electrodes and common electrodes having potentials common to all the pixel electrodes, so that, by means of a ratio between pixel electrode capacities including the storage capacities and parasitic capacities between gate lines of the thin-film transistors and the pixel electrodes, potential variation of the pixel electrodes accompanied by potential variation of the common electrodes results in a potential difference.

44. A liquid crystal device having a driving circuit to cause transition from a splay configuration to a bend configuration of a liquid crystal layer, located between a first substrate on which thin film transistors and pixel electrodes are formed in a matrix and a second substrate on which an opposing electrode is located, the liquid crystal device comprising:

different potential difference continuous application means for continuously applying a potential difference, different from a potential difference in a normal image display period, between the pixel electrode on the first substrate and the opposing electrode on the second substrate, wherein, the different potential difference continuous application means comprises means for varying a gate line potential by using means for continuously applying a different potential difference, wherein storage capacities connected to the pixel electrodes are formed between the pixel electrodes and the gate lines one line front or behind, so that, by means of a ratio between pixel electrode capacities including the storage capacities and parasitic capacities between gate lines of the thin-film transistors and the pixel electrodes, potential variation of the pixel electrodes accompanied by the potential variation of the gate lines one line front or behind results in a potential difference.

45. The method of driving a liquid crystal according to claim 41, wherein continuously varying a common electrode potential by continuously applying a different potential difference comprises making voltage applied to the common electrodes equal to voltage used for gate signals.

46. The method of driving a liquid crystal according to claim 42, wherein continuously varying a common electrode potential by continuously applying a different potential difference comprises making voltage applied to the common electrodes equal to voltage used for gate signals.

47. The driving circuit of the liquid crystal device according to claim 43, wherein the means for varying a common electrode potential by using means for continuously applying a different potential difference comprises means for making voltage applied to the common electrodes equal to voltage used for gate signals.

* * * * *

UNITED STATES PATENT AND TRADEMARK OFFICE
CERTIFICATE OF CORRECTION

| | |
|---|---|
| PATENT NO. | : 7,023,416 B1 |
| APPLICATION NO. | : 09/868184 |
| DATED | : April 4, 2006 |
| INVENTOR(S) | : Mika Nakamura et al. |

It is certified that error appears in the above-identified patent and that said Letters Patent is hereby corrected as shown below:

Claim 15 at column 38, line 46, replace "claim 1" with --claim 11--;

Claim 16 at column 38, line 53, replace "claim 1" with --claim 11--.

Signed and Sealed this

First Day of May, 2007

JON W. DUDAS
*Director of the United States Patent and Trademark Office*